(12) United States Patent
Zhao et al.

(10) Patent No.: US 10,395,390 B2
(45) Date of Patent: Aug. 27, 2019

(54) SENSOR FUSION USING INERTIAL AND IMAGE SENSORS

(71) Applicant: SZ DJI TECHNOLOGY Co., LTD, Shenzhen (CN)

(72) Inventors: Kaiyong Zhao, Shenzhen (CN); Shaojie Shen, Shenzhen (CN); Yi Lin, Shenzhen (CN); Tianbo Liu, Shenzhen (CN); Yonggen Ling, Shenzhen (CN); Zhenfei Yang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 86 days.

(21) Appl. No.: 15/289,354

(22) Filed: Oct. 10, 2016

(65) Prior Publication Data

US 2017/0301111 A1    Oct. 19, 2017

Related U.S. Application Data

(63) Continuation of application No. PCT/CN2015/079639, filed on May 23, 2015.

(51) Int. Cl.
*G06T 7/80* (2017.01)
*G01C 25/00* (2006.01)
(Continued)

(52) U.S. Cl.
CPC .............. *G06T 7/80* (2017.01); *B64C 39/024* (2013.01); *G01C 25/005* (2013.01); *H04N 5/247* (2013.01);
(Continued)

(58) Field of Classification Search
CPC ...................................................... G06T 7/80
See application file for complete search history.

(56) References Cited

U.S. PATENT DOCUMENTS 6,594,600 B1    7/2003  Arnoul et al.
8,001,860 B1 *  8/2011  Preston et al.
(Continued)

FOREIGN PATENT DOCUMENTS

CN    1711516 A    12/2005
CN    101598556 A    12/2009
(Continued)

OTHER PUBLICATIONS

Google Project Tango. 2015. https://www.google.com/atap/projecttango/#project.
(Continued)

*Primary Examiner* — Hussein Elchanti
*Assistant Examiner* — Michael A Berns
(74) *Attorney, Agent, or Firm* — Anova Law Group, PLLC

(57) ABSTRACT

Systems, methods, and devices are provided for controlling a movable object using multiple sensors. In one aspect, a method for calibrating one or more extrinsic parameters of a movable object having a plurality of sensors in an initial configuration is provided. The method can comprise: detecting that the initial configuration of the plurality of sensors has been modified; receiving inertial data from at least one inertial sensor during operation of the movable object; receiving image data from at least two image sensors during the operation of the movable object; and estimating the one or more extrinsic parameters based on the inertial data and the image data in response to detecting that the initial configuration has been modified, wherein the one or more extrinsic parameters comprise spatial relationships between the plurality of sensors in the modified configuration.

16 Claims, 21 Drawing Sheets

(51) Int. Cl.
*B64C 39/02* (2006.01)
*H04N 5/247* (2006.01)
*H04N 17/00* (2006.01)

(52) U.S. Cl.
CPC ..... *H04N 17/002* (2013.01); *B64C 2201/127* (2013.01)

(56) References Cited

U.S. PATENT DOCUMENTS

| | | | |
|---|---|---|---|
| 9,031,809 B1 | 5/2015 | Kumar et al. | |
| 9,719,787 B2* | 8/2017 | Georgy | G01C 21/165 |
| 2003/0182076 A1 | 9/2003 | Udomkesmalee | |
| 2004/0257441 A1 | 12/2004 | Pevear et al. | |
| 2008/0195316 A1 | 8/2008 | Krishnaswamy | |
| 2010/0010741 A1 | 1/2010 | Tener et al. | |
| 2011/0141485 A1 | 6/2011 | Lee et al. | |
| 2011/0172918 A1 | 7/2011 | Tome | |
| 2011/0206236 A1 | 8/2011 | Center, Jr. et al. | |
| 2012/0123628 A1 | 5/2012 | Duggan et al. | |
| 2012/0200703 A1* | 8/2012 | Nadir | G02B 27/644 348/144 |
| 2012/0282905 A1 | 11/2012 | Owen | |
| 2014/0316698 A1 | 10/2014 | Roumeliotis et al. | |
| 2014/0333741 A1 | 11/2014 | Roumeliotis et al. | |
| 2014/0341465 A1* | 11/2014 | Li et al. | |
| 2014/0350839 A1 | 11/2014 | Pack et al. | |
| 2014/0372091 A1 | 12/2014 | Larimore | |
| 2016/0370203 A1* | 12/2016 | Hallberg | |

FOREIGN PATENT DOCUMENTS

| | | |
|---|---|---|
| CN | 101713991 A | 5/2010 |
| CN | 102298070 A | 12/2011 |
| CN | 102592225 A | 7/2012 |
| CN | 102665049 A | 9/2012 |
| CN | 103149939 A | 6/2013 |
| CN | 103345737 A | 10/2013 |
| CN | 103424114 A | 12/2013 |
| CN | 103630138 A | 3/2014 |
| CN | 103778523 A | 5/2014 |
| CN | 103918344 A | 7/2014 |
| CN | 103921933 A | 7/2014 |
| CN | 203747900 U | 7/2014 |
| CN | 103971396 A | 8/2014 |
| CN | 104006790 A | 8/2014 |
| CN | 104062977 A | 9/2014 |
| EP | 1901153 A1 | 3/2008 |
| EP | 2434256 A2 | 3/2012 |
| EP | 2730888 A1 | 5/2014 |
| JP | H01273113 A | 11/1989 |
| JP | 2006143193 A | 6/2006 |
| JP | 2006242943 A | 9/2006 |
| JP | 2008304260 A | 12/2008 |
| JP | 2009223407 A | 10/2009 |
| JP | 2010208501 A | 9/2010 |
| JP | 2012103819 A | 5/2012 |
| JP | 2013190421 A | 9/2013 |
| JP | 2014194729 A | 10/2014 |
| JP | 2017501383 A | 1/2017 |
| WO | WO-2012175592 A1 | 12/2012 |
| WO | WO-2015013418 A2 | 1/2015 |
| WO | WO-2016187760 A1 | 12/2016 |

OTHER PUBLICATIONS

International search report and written opinion dated Feb. 16, 2016 for PCT Application No. CN-2015079639.

NVIDIA. TEGRA Visual Computing Module (VCM). 2015. http://www.nvidia.com/object/visual-computing-module.html.

Shen. Autonomous navigation in complex indoor and outdoor environments with micro aerial vehicles. University of Pennsylvania. Dissertation. 2014.

Sibley, et al., Sliding window filter with application to planetary landing, Sep. 2010, J. Field Robot, 27(5):587-608.

Song, et al., Small UAV Localization Method Based on Optical-Flow and Inertial Navigation, Transducer and Microsystem Technologies, Jan. 31, 2015, ISSN: 1000-9787, 34(1):13-16.

Lupton, et al., Visual-inertial-aided Navigation for High-Dynamic Motion in Built Environments Without Initial Conditions, IEEE Trans. Robot., Feb. 2012, 28(1):61-76.

Chambers, et al. Robust Multi-Sensor Fusion for Micro Aerial Vehicle Navigation in GPS Degrated/Denied Environments. 2014 American Control Conference (ACC), 2014, pp. 1892-1899.

European search report and search opinion dated Jun. 8, 2017 for EP Application No. 15871318.0.

European search report and search opinion dated Jun. 14, 2017 for EP Application No. 15871321.4.

European search report and search opinion dated Jul. 27, 2017 for EP Application No. 15871314.9.

European search report and search opinion dated Jul. 27, 2017 for EP Application No. 15871317.2.

Fraundorfer, et al. Vision-based autonomous mapping and exploration using a quadrotor Mav. 2012 IEEE/RSJ International Conference on Intelligent Robotics and Systems, 2012, pp. 4557-4564.

International search report and written opinion dated Feb. 16, 2016 for PCT Application No. PCT/CN2015/079636.

International search report and written opinion dated Feb. 19, 2016 for PCT Application No. PCT/CN2015/079637.

International search report and written opinion dated Mar. 16, 2016 for PCT Application No. PCT/CN2015/079638.

Kobori, et al. Accurate and Robust Attitude Estimation Using MEMS Gyroscopes and a Monocular Camera. Transactions of the Society of Instrument and Control Engineers 47.10 (2011): 442-449. (In Japanese with English abstract).

Li, et al. Invariant Extended Kalman Filter-based state estimation for MAV in GPS-denied environments. 2014 International Conference on Advances in Computing, Communications and Informatics, 2014, pp. 803-810.

Shen, et al. Vision-Based State Estimation for Autonomous Rotorcraft MAVs in Complex Environments. 2013 IEEE International Conference on Robotics and Automation, 2013, pp. 1758-1764.

Veth, Michael J. Fusion of imaging and inertial sensors for navigation. No. AFIT/DS/ENG/06-09. Air Force Inst of Tech Wright-Patterson AFB OH, School of Engineering and Management, 2006. Dissertation.

* cited by examiner

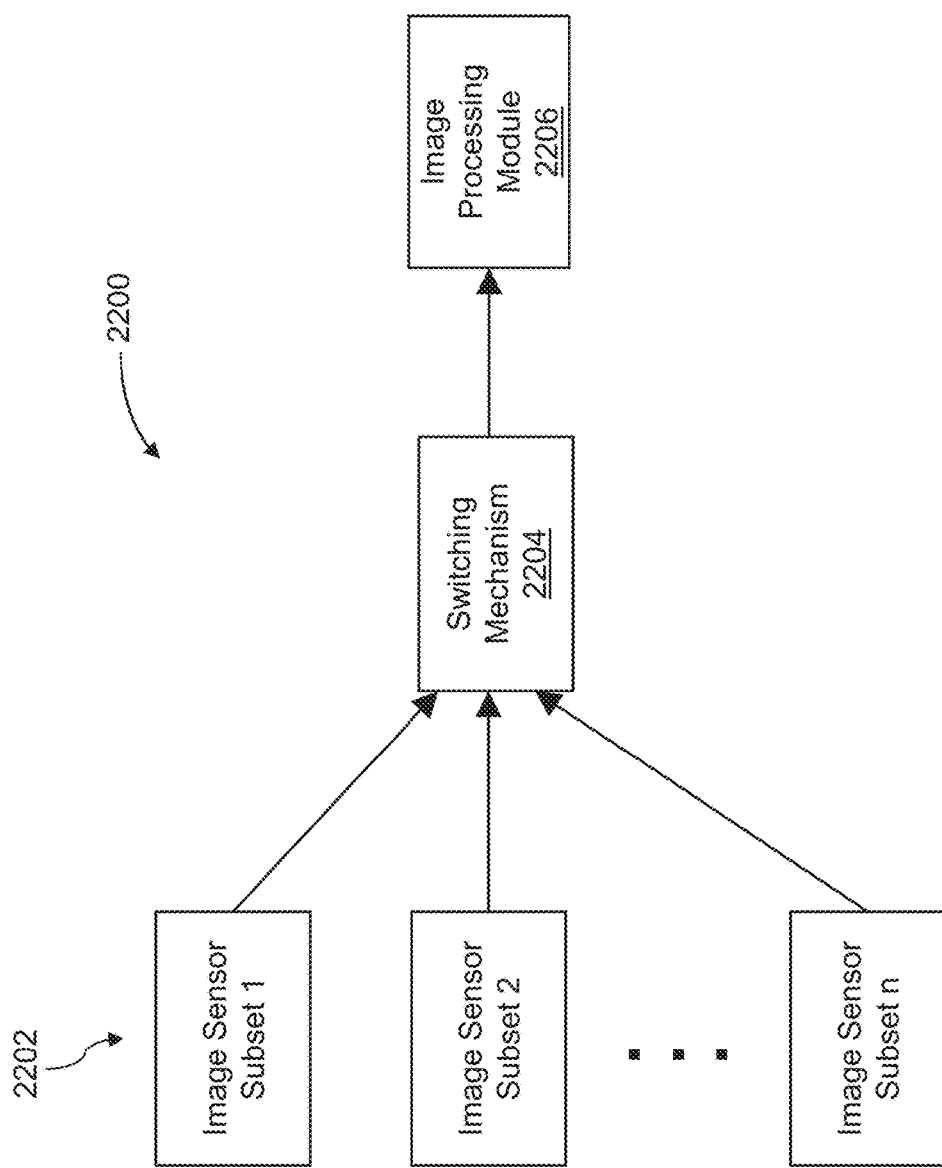

SENSOR FUSION USING INERTIAL AND IMAGE SENSORS

CROSS-REFERENCE

This application is a continuation of International Application No. PCT/CN2015/079639, filed on May 23, 2015. The above-referenced applications are hereby incorporated by reference.

BACKGROUND

Unmanned vehicles such as unmanned aerial vehicles (UAVs) can be used for performing surveillance, reconnaissance, and exploration tasks for a wide variety of civilian, commercial, and military applications. A UAV may be manually controlled by a remote user, or may operate in a semi-autonomous or fully autonomous manner. Such UAVs can include sensors configured to collect data that may be used during UAV operation, such as state information.

Existing approaches for data collection and processing for UAV operation may not be optimal in some instances. For example, some techniques for estimating state information for a UAV may not be sufficiently accurate, which may be detrimental to UAV function.

SUMMARY

The present disclosure provides systems, methods, and devices related to the control and operation of movable objects such as unmanned aerial vehicles (UAVs). In some embodiments, the systems, methods, and devices described herein utilize sensor fusion to enable determination of information relevant to UAV operation with enhanced accuracy and flexibility. For example, fusion of one or more inertial sensors and one or more image sensors can be used to improve initialization, error recovery, parameter calibration, and/or state estimation. The information obtained from these procedures can be used to facilitate UAV operation, e.g., autonomous or semi-autonomous navigation, obstacle avoidance, mapping, and the like.

In one aspect, a method for determining initialization information for a movable object using multiple sensors is provided. The method can comprise" detecting, with aid of one or more processors, that the movable object has started operating; receiving, at the one or more processors, inertial data from at least one inertial sensor carried by the movable object; receiving, at the one or more processors, image data from at least two image sensors carried by the movable object; and determining, with aid of the one or more processors, the initialization information for the movable object based on the inertial data and the image data, wherein the initialization information comprises one or more of a position of the movable object, a velocity of the movable object, or an orientation of the movable object relative to a gravity direction when the movable object started operating.

In some embodiments, the movable object is an unmanned aerial vehicle (UAV). Detecting that the UAV has started operating can comprise detecting that the UAV has started flight. The UAV can start flight from a free falling state and/or by being thrown by a user. Detecting that the UAV has started operating can comprise detecting that the UAV has taken off from a surface, and the surface can be an inclined surface or an aclinic surface.

In some embodiments, the inertial data comprises one or more measurements indicative of a three-dimensional acceleration and a three-dimensional angular velocity of the movable object. The inertial data can comprise one or more measurements obtained by the at least one inertial sensor over a time interval starting from when the movable object started operating.

In some embodiments, the image data comprises one or more images of an environment around the movable object. The image data can comprise one or more images obtained by each of the at least two image sensors over a time interval starting from when the movable object started operating. In some embodiments, the determining step comprises processing the one or more images using a feature point detection algorithm. The determining step can comprise processing the one or more images using an optical flow algorithm. The determining step can comprise processing the one or more images using a feature matching algorithm. The determining step can comprise comparing one or more images obtained by a first image sensor of the at least two image sensors to one or more images obtained by a second image sensor of the at least two image sensors.

In some embodiments, the at least two image sensors are configured to obtain images synchronously. Alternatively, the at least two image sensors are can be configured to obtain images asynchronously. The at least two image sensors comprise a plurality of image sensor subsets switchably coupled to the one or more processors via a switching mechanism, the switching mechanism being configured to couple a single image sensor subset to the one or more processors at a time. The receiving the image data step can comprise: coupling a first image sensor subset to the one or more processors via the switching mechanism; receiving image data from the first image sensor subset; coupling a second image sensor subset to the one or more processors via the switching mechanism; and receiving image data from the second image sensor subset.

In some embodiments, the initialization information further comprises a position and a velocity of the movable object when the movable object started operating. The determining step can comprise: generating a first estimate of the initialization information using the inertial data; generating a second estimate of the initialization information using the image data; and combining the first and second estimates to obtain the initialization information for the movable object. The initialization information can be determined using a linear optimization algorithm. The initialization information can be determined based only on the inertial data and the image data.

In some embodiments, the method further comprises correcting subsequent inertial data obtained from the at least one inertial sensor using the orientation of the movable object relative to the gravity direction.

In another aspect, a system for determining initialization information for a movable object using multiple sensors is provided. The system can comprise: at least one inertial sensor carried by the movable object; at least two image sensors carried by the movable object; and one or more processors individually or collectively configured to: detect that the movable object has started operating; receive inertial data from the at least one inertial sensor; receive image data from the at least two image sensors; and determine the initialization information for the movable object based on the inertial data and the image data, wherein the initialization information comprises one or more of a position of the movable object, a velocity of the movable object, or an orientation of the movable object relative to a gravity direction when the movable object started operating.

In another aspect, one or more non-transitory computer-readable storage media are provided. The one or more non-transitory computer-readable storage media can have stored thereon executable instructions that, when executed by one or more processors of a computer system for determining initialization information for a movable object, cause the computer system to at least: detect that the movable object has started operating; receive inertial data from at least one inertial sensor carried by the movable object; receive image data from at least two image sensors carried by the movable object; and determine the initialization information for the movable object based on the inertial data and the image data, wherein the initialization information comprises one or more of a position of the movable object, a velocity of the movable object, or an orientation of the movable object relative to a gravity direction when the movable object started operating.

In another aspect, a method for performing error recovery for a movable object using multiple sensor is provided. The method can comprise: detecting, with aid of one or more processors, that an error has occurred during operation of the movable object; receiving, at the one or more processors, inertial data from at least one inertial sensor carried by the movable object; receiving, at the one or more processors, image data from at least two image sensors carried by the movable object; and determining, with aid of the one or more processors, reinitialization information for the movable object based on the inertial data and the image data, wherein the reinitialization information comprises one or more of a position of the movable object, a velocity of the movable object, or an orientation of the movable object relative to a gravity direction when the error occurred.

In some embodiments, the movable object is an unmanned aerial vehicle (UAV).

In some embodiments, the error comprises a malfunction in one or more of the at least one inertial sensor or the at least two inertial sensors. The error can comprise a malfunction in a state estimation module used by the movable object. The state estimation module can use an iterative state estimation algorithm, and the malfunction can comprise the iterative state estimation algorithm failing to converge to a solution. The method can further comprise using the reinitialization information to reinitialize the iterative state estimation algorithm.

In some embodiments, the inertial data comprises one or more measurements indicative of a three-dimensional acceleration and a three-dimensional angular velocity of the movable object. The inertial data can comprise one or more measurements obtained by the at least one inertial sensor over a time interval starting from when the error occurred.

In some embodiments, the image data comprises one or more images of an environment around the movable object. The image data can comprise one or more images obtained by each of the at least two image sensors over a time interval starting from when the error occurred. In some embodiments, the determining step comprises processing the one or more images using a feature point detection algorithm. The determining step can comprise processing the one or more images using an optical flow algorithm. The determining step can comprise processing the one or more images using a feature matching algorithm. The determining step can comprise comparing one or more images obtained by a first image sensor of the at least two image sensors to one or more images obtained by a second image sensor of the at least two image sensors.

In some embodiments, the at least two image sensors are configured to obtain images synchronously. Alternatively, the at least two image sensors are can be configured to obtain images asynchronously. The at least two image sensors comprise a plurality of image sensor subsets switchably coupled to the one or more processors via a switching mechanism, the switching mechanism being configured to couple a single image sensor subset to the one or more processors at a time. The receiving the image data step can comprise: coupling a first image sensor subset to the one or more processors via the switching mechanism; receiving image data from the first image sensor subset; coupling a second image sensor subset to the one or more processors via the switching mechanism; and receiving image data from the second image sensor subset.

In some embodiments, the reinitialization information further comprises a position and a velocity of the movable object when the error ocurred. The determining step can comprise: generating a first estimate of the reinitialization information using the inertial data; generating a second estimate of the reinitialization information using the image data; and combining the first and second estimates to obtain the reinitialization information for the movable object. The reinitialization information can be determined using a linear optimization algorithm. The reinitialization information can be determined based only on the inertial data and the image data.

In some embodiments, the method further comprises correcting subsequent inertial data obtained from the at least one inertial sensor using the orientation of the movable object relative to the gravity direction.

In another aspect, a system for performing error recovery for a movable object using multiple sensors is provided. The system can comprise: at least one inertial sensor carried by the movable object; at least two image sensors carried by the movable object; and one or more processors individually or collectively configured to: detect that an error has occurred during operation of the movable object; receive inertial data from the at least one inertial sensor; receive image data from the at least two image sensors; and determine reinitialization information for the movable object based on the inertial data and the image data, wherein the reinitialization information comprises one or more of a position of the movable object, a velocity of the movable object, or an orientation of the movable object relative to a gravity direction when error occurred.

In another aspect, one or more non-transitory computer-readable storage media are provided. The one or more non-transitory computer-readable storage media can have stored thereon executable instructions that, when executed by one or more processors of a computer system for performing error recovery for a movable object, cause the computer system to at least: detect that an error has occurred during operation of the movable object; receive inertial data from at least one inertial sensor carried by the movable object; receive image data from at least two image sensors carried by the movable object; and determine reinitialization information for the movable object based on the inertial data and the image data, wherein the reinitialization information comprises one or more of a position of the movable object, a velocity of the movable object, or an orientation of the movable object relative to a gravity direction when the error occurred.

In another aspect, a method for calibrating one or more extrinsic parameters of a movable object using multiple sensors during operation of the movable object is provided. The method can comprise: receiving, at the one or more processors, initial values for the one or more extrinsic parameters, wherein the one or more extrinsic parameters comprise spatial relationships between at least two image sensors carried by the movable object; receiving, at the one or more processors, inertial data from at least one inertial sensor carried by the movable object during the operation of the movable object; receiving, at the one or more processors, image data from the at least two image sensors carried by the movable object during the operation of the movable object; and determining, with aid of the one or more processors, estimated values for the one or more extrinsic parameters based on the initial values, the inertial data, and the image data using an iterative optimization algorithm during the operation of the movable object.

In some embodiments, the movable object is an unmanned aerial vehicle (UAV). The operation of the UAV can comprise the UAV being in flight and/or powered on.

In some embodiments, the spatial relationships comprise relative positions and relative orientations of the at least two image sensors. The relative positions and relative orientations of the at least two image sensors can be determined with respect to the at least one inertial sensor.

In some embodiments, the initial values for the one or more extrinsic parameters are determined prior to the operation of the movable object. The initial values can be determined using the iterative optimization algorithm prior to the operation of the movable object. The initial values can be measured by a user prior to the operation of the movable object. The initial values for the one or more extrinsic parameters can be received from a memory device associated with the movable object. In some embodiments, the at least two image sensors are coupled to the movable object at one or more fixed locations, and the initial values for the one or more extrinsic parameters are determined based on the one or more fixed locations. The initial values for the one or more extrinsic parameters can be no more than about 2 cm away from the actual values of the one or more extrinsic parameters. The initial values for the one or more extrinsic parameters can be no more than about 2 degrees away from the actual values of the one or more extrinsic parameters.

In some embodiments, the inertial data comprises one or more measurements indicative of a three-dimensional acceleration and a three-dimensional angular velocity of the movable object. The inertial data can comprise one or more measurements obtained by the at least one inertial sensor over at least two different time points.

In some embodiments, the image data comprises one or more images of an environment around the movable object. The image data can comprise one or more images obtained by each of the at least two image sensors over at least two different time points. In some embodiments, the determining step comprises processing the one or more images using a feature point detection algorithm. The determining step can comprise processing the one or more images using an optical flow algorithm. The determining step can comprise processing the one or more images using a feature matching algorithm. The determining step can comprise comparing one or more images obtained by a first image sensor of the at least two image sensors to one or more images obtained by a second image sensor of the at least two image sensors.

In some embodiments, the at least two image sensors are configured to obtain images synchronously. Alternatively, the at least two image sensors are can be configured to obtain images asynchronously. The at least two image sensors comprise a plurality of image sensor subsets switchably coupled to the one or more processors via a switching mechanism, the switching mechanism being configured to couple a single image sensor subset to the one or more processors at a time. The receiving the image data step can comprise: coupling a first image sensor subset to the one or more processors via the switching mechanism; receiving image data from the first image sensor subset; coupling a second image sensor subset to the one or more processors via the switching mechanism; and receiving image data from the second image sensor subset.

In some embodiments, the iterative optimization algorithm is a nonlinear optimization algorithm. The iterative optimization algorithm can comprise calculating a maximum a posteriori probability (MAP) estimate of the one or more extrinsic parameters based on the initial values, the inertial data, and the image data. In some embodiments, the inertial data and the image data are the only sensor data used to determine the estimated values for the one or more extrinsic parameters.

In some embodiments, the method further comprises determining a state of the movable object based on the estimated values for the one or more extrinsic parameters. The state can comprise one or more of a position, an orientation, or a velocity of the movable object. The state of the movable object can be determined relative to a previous state of the movable object at a previous time point during the operation of the movable object. The previous time point can be a time point during which initialization or re-initialization occurred.

In another aspect, a system for calibrating one or more extrinsic parameters of a movable object using multiple sensors during the operation of the movable object is provided. The system can comprise: at least one inertial sensor carried by the movable object; at least two image sensors carried by the movable object; and one or more processors individually or collectively configured to: receive initial values for the one or more extrinsic parameters, wherein the one or more extrinsic parameters comprise spatial relationships between the at least two image sensors; receive inertial data from the at least one inertial sensor during the operation of the movable object; receive image data from the at least two image sensors during the operation of the movable object; and determine estimated values for the one or more extrinsic parameters based on the initial values, the inertial data, and the image data using an iterative optimization algorithm during the operation of the movable object.

In another aspect, one or more non-transitory computer-readable storage media are provided. The one or more non-transitory computer-readable storage media can have stored thereon executable instructions that, when executed by one or more processors of a computer system for calibrating one or more extrinsic parameters of a movable object, cause the computer system to at least: receive initial values for the one or more extrinsic parameters, wherein the one or more extrinsic parameters comprise spatial relationships between at least two image sensors carried by the movable object; receive inertial data from at least one inertial sensor carried by the movable object during the operation of the movable object; receive image data from the at least two image sensors during the operation of the movable object; and determine estimated values for the one or more extrinsic parameters based on the initial values, the inertial data, and the image data using an iterative optimization algorithm during the operation of the movable object.

In another aspect, a method for calibrating one or more extrinsic parameters of a movable object having a plurality of sensors in an initial configuration is provided. The method can comprise: detecting, with aid of one or more processors, that the initial configuration of the plurality of sensors has been modified, wherein the plurality of sensors comprises at least one inertial sensor and at least two image sensors; receiving, at the one or more processors, inertial data from at least one inertial sensor during operation of the movable object; receiving, at the one or more processors, image data from the at least two image sensors during the operation of the movable object; and estimating, with aid of the one or more processors, the one or more extrinsic parameters based on the inertial data and the image data in response to detecting that the initial configuration has been modified, wherein the one or more extrinsic parameters are estimated using an iterative optimization algorithm during the operation of the movable object, and wherein the one or more extrinsic parameters comprise spatial relationships between the plurality of sensors in the modified configuration.

In some embodiments, the movable object is an unmanned aerial vehicle (UAV). The operation of the UAV can comprise the UAV being in flight and/or powered on.

In some embodiments, the spatial relationships comprise relative positions and relative orientations of the at least two image sensors. The relative positions and relative orientations of the at least two image sensors can be determined with respect to the at least one inertial sensor.

In some embodiments, the initial values for the one or more extrinsic parameters are determined prior to the operation of the movable object. The initial values can be determined using the iterative optimization algorithm prior to the operation of the movable object. The initial values can be measured by a user prior to the operation of the movable object. The initial values for the one or more extrinsic parameters can be received from a memory device associated with the movable object. In some embodiments, the at least two image sensors are coupled to the movable object at one or more fixed locations, and the initial values for the one or more extrinsic parameters are determined based on the one or more fixed locations.

In some embodiments, the initial configuration is modified by removing at least one sensor from the plurality of sensors. The initial configuration can be modified by adding at least one sensor to the plurality of sensors. The initial configuration can be modified by changing at least one of a position or an orientation of at least one sensor of the plurality of sensors. The initial configuration can be modified prior to the operation of the movable object.

In some embodiments, the inertial data comprises one or more measurements indicative of a three-dimensional acceleration and a three-dimensional angular velocity of the movable object. The inertial data can comprise one or more measurements obtained by the at least one inertial sensor over at least two different time points.

In some embodiments, the image data comprises one or more images of an environment around the movable object. The image data can comprise one or more images obtained by each of the at least two image sensors over at least two different time points. In some embodiments, the determining step comprises processing the one or more images using a feature point detection algorithm. The determining step can comprise processing the one or more images using an optical flow algorithm. The determining step can comprise processing the one or more images using a feature matching algorithm. The determining step can comprise comparing one or more images obtained by a first image sensor of the at least two image sensors to one or more images obtained by a second image sensor of the at least two image sensors.

In some embodiments, the at least two image sensors are configured to obtain images synchronously. Alternatively, the at least two image sensors are can be configured to obtain images asynchronously. The at least two image sensors comprise a plurality of image sensor subsets switchably coupled to the one or more processors via a switching mechanism, the switching mechanism being configured to couple a single image sensor subset to the one or more processors at a time. The receiving the image data step can comprise: coupling a first image sensor subset to the one or more processors via the switching mechanism; receiving image data from the first image sensor subset; coupling a second image sensor subset to the one or more processors via the switching mechanism; and receiving image data from the second image sensor subset.

In some embodiments, the iterative optimization algorithm is a nonlinear optimization algorithm. The iterative optimization algorithm can comprise calculating a maximum a posteriori probability (MAP) estimate of the one or more extrinsic parameters based on the initial values, the inertial data, and the image data. In some embodiments, the inertial data and the image data are the only sensor data used to estimate one or more extrinsic parameters.

In some embodiments, the method further comprises determining a state of the movable object based on the estimated one or more extrinsic parameters. The state can comprise one or more of a position, an orientation, or a velocity of the movable object.

In another aspect, a system for calibrating one or more extrinsic parameters of a movable object having a plurality of sensors in an initial configuration is provided. The system can comprise: a plurality of sensors carried by the movable object and comprising at least one inertial sensor and at least two image sensors; and one or more processors individually or collectively configured to: detect that the initial configuration of the plurality of sensors has been modified; receive inertial data from the at least one inertial sensor during operation of the movable object; receive image data from the at least two image sensors during the operation of the movable object; and estimate the one or more extrinsic parameters based on the inertial data and the image data in response to detecting that the initial configuration has been modified, wherein the one or more extrinsic parameters are estimated using an iterative optimization algorithm during the operation of the movable object, and wherein the one or more extrinsic parameters comprise spatial relationships between the plurality of sensors in the modified configuration.

In another aspect, one or more non-transitory computer-readable storage media are provided. The one or more non-transitory computer-readable storage media can have stored thereon executable instructions that, when executed by one or more processors of a computer system for calibrating one or more extrinsic parameters of a movable object having a plurality of sensors in an initial configuration, cause the computer system to at least: detect that the initial configuration of the plurality of sensors has been modified, wherein the plurality of sensors comprises at least one inertial sensor and at least two image sensors; receive inertial data from the at least one inertial sensor during operation of the movable object; receive image data from the at least two image sensors during the operation of the movable object; and estimate the one or more extrinsic parameters based on the inertial data and the image data in response to detecting that the initial configuration has been modified, wherein the one or more extrinsic parameters are estimated using an iterative optimization algorithm during the operation of the movable object, and wherein the one or more extrinsic parameters comprise spatial relationships between the plurality of sensors in the modified configuration.

In another aspect, a method for estimating state information for a movable object using multiple sensors during operation of the movable object is provided. The method can comprise: receiving, at one or more processors, previous state information for the movable object; receiving, at the one or more processors, inertial data from at least one inertial sensor carried by the movable object, the inertial data comprising inertial measurement data obtained by the at least one inertial sensor over at least two different time points during the operation of the movable object; receiving, at the one or more processors, image data from at least two image sensors carried by the movable object, the image data comprising images obtained by each image sensor of the at least two image sensors over at least two different time points during the operation of the movable object; and determining, with aid of the one or more processors, updated state information for the movable object based on the previous state information, the inertial data, and the image data using an iterative optimization algorithm during the operation of the movable object.

In some embodiments, the movable object is an unmanned aerial vehicle (UAV). The operation of the UAV can comprise the UAV being in flight and/or powered on.

In some embodiments, the previous state information comprises a position, an orientation, and a velocity of the movable object at a previous time point during the operation of the movable object. The previous state information can be obtained using the iterative optimization algorithm. The updated state information can comprise a position, a velocity, and an orientation of the movable object.

In some embodiments, the inertial data comprises one or more measurements indicative of a three-dimensional acceleration and a three-dimensional angular velocity of the movable object.

In some embodiments, the image data comprises one or more images of an environment around the movable object. In some embodiments, the determining step comprises processing the one or more images using a feature point detection algorithm. The determining step can comprise processing the one or more images using an optical flow algorithm. The determining step can comprise processing the one or more images using a feature matching algorithm. The determining step can comprise comparing one or more images obtained by a first image sensor of the at least two image sensors to one or more images obtained by a second image sensor of the at least two image sensors.

In some embodiments, the at least two image sensors are configured to obtain images synchronously. Alternatively, the at least two image sensors are can be configured to obtain images asynchronously. The at least two image sensors comprise a plurality of image sensor subsets switchably coupled to the one or more processors via a switching mechanism, the switching mechanism being configured to couple a single image sensor subset to the one or more processors at a time. The receiving the image data step can comprise: coupling a first image sensor subset to the one or more processors via the switching mechanism; receiving image data from the first image sensor subset; coupling a second image sensor subset to the one or more processors via the switching mechanism; and receiving image data from the second image sensor subset.

In some embodiments, the iterative optimization algorithm is a nonlinear optimization algorithm. The iterative optimization algorithm can comprise calculating a maximum a posteriori probability (MAP) estimate of the updated state information based on the initial values, the inertial data, and the image data. In some embodiments, the inertial data and the image data are the only sensor data used to determine the updated state information.

In some embodiments, the method further comprises outputting the updated state information to a control module for controlling movement of the movable object.

In another aspect, a system for estimating state information for a movable object using multiple sensors during operation of the movable object is provided. The system can comprise: at least one inertial sensor carried by the movable object; at least two image sensors carried by the movable object; and one or more processors individually or collectively configured to: receive previous state information for the movable object; receive inertial data from the at least one inertial sensor, the inertial data comprising inertial measurement data obtained by the at least one inertial sensor over at least two different time points during the operation of the movable object; receive image data from the at least two image sensors, the image data comprising images obtained by each image sensor of the at least two image sensors over at least two different time points during the operation of the movable object; and determine updated state information for the movable object based on the previous state information, the inertial data, and the image data using an iterative optimization algorithm during the operation of the movable object.

In another aspect, one or more non-transitory computer-readable storage media are provided. The one or more non-transitory computer-readable storage media can have stored thereon executable instructions that, when executed by one or more processors of a computer system for estimating state information for a movable object, cause the computer system to at least: receive previous state information for the movable object; receive inertial data from at least one inertial sensor carried by the movable object, the inertial data comprising inertial measurement data obtained by the at least one inertial sensor over at least two different time points during the operation of the movable object; receive image data from at least two image sensors carried by the movable object, the image data comprising images obtained by each image sensor of the at least two image sensors over at least two different time points during the operation of the movable object; and determine updated state information for the movable object based on the previous state information, the inertial data, and the image data using an iterative optimization algorithm during the operation of the movable object.

It shall be understood that different aspects of the invention can be appreciated individually, collectively, or in combination with each other. Various aspects of the invention described herein may be applied to any of the particular applications set forth below or for any other types of movable objects. Any description herein of an aerial vehicle may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space. Furthermore, any description herein of a rotor or rotor assembly may apply to and be used for any propulsion system, device, or mechanism configured to generate a propulsive force by rotation (e.g., propellers, wheels, axles).

Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 22 illustrates a system with switchably coupled image sensors, in accordance with embodiments.

DETAILED DESCRIPTION

Figure 1:
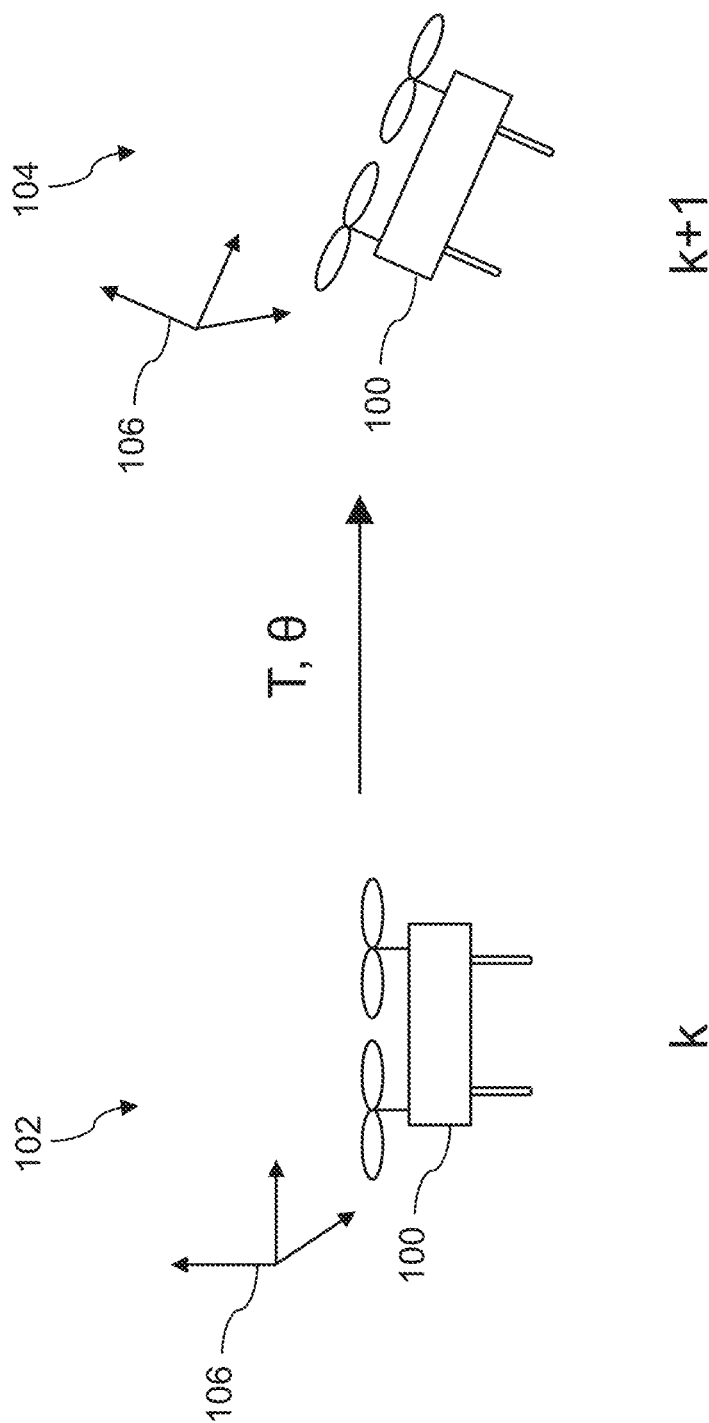
FIG. 1 illustrates state estimation for a UAV, in accordance with embodiments.

The systems, methods, and devices of the present disclosure enable determination of information relevant to the operation of movable objects such as unmanned aerial vehicles (UAVs). In some embodiments, the present disclosure utilizes sensor fusion techniques to combine sensor data from different sensor types in order to determine various types of information useful for UAV operation, such as information for state estimation, initialization, error recovery, and/or parameter calibration. For example, a UAV can include at least one inertial sensor and at least two image sensors. Various methods can be used to combine data from different types of sensors, such as iterative optimization algorithms. In some embodiments, an iterative optimization algorithm involves iteratively linearizing and solving a non-linear function (e.g., a non-linear objective function). The sensor fusion techniques presented herein can be used to improve the accuracy and robustness of UAV state estimation, initialization, error recovery, and/or parameter calibration, thus extending the capabilities of UAVs for "intelligent" autonomous or semi-autonomous operations.

In some embodiments, the present disclosure provides systems, methods, and devices related to performing initialization, error recovery, parameter calibration, and/or state estimation using a plurality of imaging sensors (e.g., a plurality of cameras) in combination with an inertial sensor. The use of multiple imaging sensors can provide various advantages compared to approaches utilizing a single image sensor, such as improved accuracy (e.g., since more image data is available for estimation), as well as enhanced stability and robustness (e.g., multiple image sensors can provide redundancy in the event one of the image sensors malfunctions). The sensor fusion algorithms for combining data from multiple image sensors may differ from algorithms for single image sensor approaches. For instance, algorithms for multiple image sensors may consider the spatial relationships between the different image sensors (e.g., relative positions and/or orientations), while such spatial relationship would not be applicable to single image sensor approaches.

Although some embodiments herein are presented in the context of UAVs, it shall be understood that the present disclosure can be applied to other types of movable objects, such as ground vehicles. Examples of movable objects suitable for use with the systems, methods, and devices provided herein are described in further detail below.

The UAVs described herein can be operated completely autonomously (e.g., by a suitable computing system such as an onboard controller), semi-autonomously, or manually (e.g., by a human user). The UAV can receive commands from a suitable entity (e.g., human user or autonomous control system) and respond to such commands by performing one or more actions. For example, the UAV can be controlled to take off from the ground, move within the air (e.g., with up to three degrees of freedom in translation and up to three degrees of freedom in rotation), move to target location or to a sequence of target locations, hover within the air, land on the ground, and so on. As another example, the UAV can be controlled to move at a specified velocity and/or acceleration (e.g., with up to three degrees of freedom in translation and up to three degrees of freedom in rotation) or along a specified movement path. Furthermore, the commands can be used to control one or more UAV components, such as the components described herein (e.g., sensors, actuators, propulsion units, payload, etc.). For instance, some commands can be used to control the position, orientation, and/or operation of a UAV payload such as a camera.

In some embodiments, the UAV can be configured to perform more complex functions that may involve a higher degree of autonomy, or may be performed entirely autonomously without requiring any user input. Examples of such functions include but are not limited to maintaining a specified position (e.g., hovering in place), navigation (e.g., planning and/or following a route for moving to a target destination), obstacle avoidance, and environmental mapping. The implementation of these functions may be based on information regarding the UAV and/or the surrounding environment.

For example, in some embodiments, it is beneficial to determine state information indicative of a past, current, and/or predicted future state of the UAV. The state information can include information regarding a spatial disposition of the UAV (e.g., location or position information such as longitude, latitude, and/or altitude; orientation or attitude information such as roll, pitch, and/or yaw). The state information can also include information regarding motion of the UAV (e.g., translational velocity, translation acceleration, angular velocity, angular acceleration, etc.). The state information can include information regarding spatial disposition and/or motion of the UAV with respect to up to six degrees of freedom (e.g., three degrees of freedom in position and/or translation, three degrees of freedom in orientation and/or rotation). The state information may be provided relative to a global coordinate system or relative to a local coordinate system (e.g., relative to the UAV or another entity). In some embodiments, the state information is provided relative to a previous state of the UAV, such as the spatial disposition of the UAV when it commenced operation (e.g., powered on, took off, began flight). The determination of state information may be referred to herein as "state estimation." Optionally, state estimation can be performed throughout operation of the UAV (e.g., continuously or at predetermined time intervals) so as to provide updated state information.

FIG. 1 illustrates state estimation for a UAV 100, in accordance with embodiments. The UAV 100 is depicted in FIG. 1 as being in a first state 102 at a first time point k and in a second state 104 at a second, subsequent time point k+1. A local coordinate system or reference frame 106 can be defined relative to the UAV 100 that is indicative of the position and orientation of the UAV 100. The UAV 100 can have a first position and orientation when in the first state 102 and a second position and orientation when in the second state 104. The change in state can be represented as a translation T from the first position to the second position and/or a rotation $\theta$ from the first orientation to the second orientation. If the position and orientation of the UAV 100 in the previous state 102 is known, T and $\theta$ can be used to determine the position and orientation of the UAV 100 in the subsequent state 104. Moreover, if the length of the time interval [k, k+1] is known, the translation and angular velocities of the UAV 100 in the second state 104 can also be estimated based on T and $\theta$, respectively. Accordingly, in some embodiments, state estimation involves determining the change in state T, $\theta$, then using the state change information and information regarding the first state 102 in order to determine the second state 104.

In some embodiments, state estimation is performed based on sensor data obtained by one or more sensors. Exemplary sensors suitable for use with the embodiments disclosed herein include location sensors (e.g., global positioning system (GPS) sensors, mobile device transmitters enabling location triangulation), image or vision sensors (e.g., imaging devices capable of detecting visible, infrared, or ultraviolet light, such as cameras), proximity or range sensors (e.g., ultrasonic sensors, lidar, time-of-flight or depth cameras), inertial sensors (e.g., accelerometers, gyroscopes, inertial measurement units (IMUs)), altitude sensors, attitude sensors (e.g., compasses) pressure sensors (e.g., barometers), audio sensors (e.g., microphones) or field sensors (e.g., magnetometers, electromagnetic sensors). Any suitable number and combination of sensors can be used, such as one, two, three, four, five, or more sensors. Optionally, the data can be received from sensors of different types (e.g., two, three, four, five, or more types). Sensors of different types may measure different types of signals or information (e.g., position, orientation, velocity, acceleration, proximity, pressure, etc.) and/or utilize different types of measurement techniques to obtain data. For instance, the sensors may include any suitable combination of active sensors (e.g., sensors that generate and measure energy from their own energy source) and passive sensors (e.g., sensors that detect available energy). As another example, some sensors may generate absolute measurement data that is provided in terms of a global coordinate system (e.g., position data provided by a GPS sensor, attitude data provided by a compass or magnetometer), while other sensors may generate relative measurement data that is provided in terms of a local coordinate system (e.g., relative angular velocity provided by a gyroscope; relative translational acceleration provided by an accelerometer; the projection view of a specific surrounding environment provided by an image sensor; relative distance information provided by an ultrasonic sensor, lidar, or time-of-flight camera). In some instances, the local coordinate system may be a body coordinate system that is defined relative to the UAV.

The sensors described herein can be carried by the UAV. A sensor can be situated on any suitable portion of the UAV, such as above, underneath, on the side(s) of, or within a vehicle body of the UAV. In some embodiments, one or more sensors can be enclosed within a housing of the UAV, positioned outside the housing, coupled to a surface (e.g., inner or outer surface) of the housing, or can form part of the housing. Some sensors can be mechanically coupled to the UAV such that the spatial disposition and/or motion of the UAV correspond to the spatial disposition and/or motion of the sensors. The sensor can be coupled to the UAV via a rigid coupling, such that the sensor does not move relative to the portion of the UAV to which it is attached. Alternatively, the coupling between the sensor and the UAV can permit movement of the sensor relative to the UAV. The coupling can be a permanent coupling or non-permanent (e.g., releasable) coupling. Suitable coupling methods can include adhesives, bonding, welding, and/or fasteners (e.g., screws, nails, pins, etc.). In some embodiments, the coupling between the sensor and the UAV comprises shock absorbers or dampers that reduce vibrations or other undesirable mechanical movements from being transmitted from the UAV body to the sensor. Optionally, the sensor can be integrally formed with a portion of the UAV. Furthermore, the sensor can be electrically coupled with a portion of the UAV (e.g., processing unit, control system, data storage) so as to enable the data collected by the sensor to be used for various functions of the UAV (e.g., navigation, control, propulsion, communication with a user or other device, etc.), such as the embodiments discussed herein.

In some embodiments, sensing results are generated by combining sensor data obtained by multiple sensors, also known as "sensor fusion." For instance, sensor fusion can be used to combine sensing data obtained by different sensor types, including as GPS sensors, inertial sensors, image sensors, lidar, ultrasonic sensors, and so on. As another example, sensor fusion can be used to combine different types of sensing data, such as absolute measurement data (e.g., data provided relative to a global coordinate system such as GPS data) and relative measurement data (e.g., data provided relative to a local coordinate system such as vision sensing data, lidar data, or ultrasonic sensing data). Sensor fusion can be used to compensate for limitations or inaccuracies associated with individual sensor types, thereby improving the accuracy and reliability of the final sensing result.

In embodiments where multiple sensors are used, each sensor can be situated on the UAV at a respective position and orientation. Information regarding the spatial relationships of the multiple sensors to each other (e.g., relative positions and orientations) can be used as a basis for fusing data from the multiple sensors. These spatial relationships may be referred to herein as the "extrinsic parameters" of the sensors, and the process of the determining the spatial relationships may be referred to herein as "extrinsic parameter calibration." In some embodiments, sensors are installed on the UAV at predetermined locations such that the initial values for the extrinsic parameters are known. In other embodiments, however, the initial values may be unknown, or may not be known with a sufficient degree of accuracy. Moreover, the extrinsic parameters may change during UAV operation, e.g., due to vibrations, collisions, or other occurrences that change the relative positions and/or orientations of the sensors. Accordingly, in order to ensure that the sensor fusion results are accurate and robust, it may be helpful to perform extrinsic parameter calibration throughout operation of the UAV (e.g., continuously or at predetermined time intervals) so as to provide updated parameter information.

Figure 2:
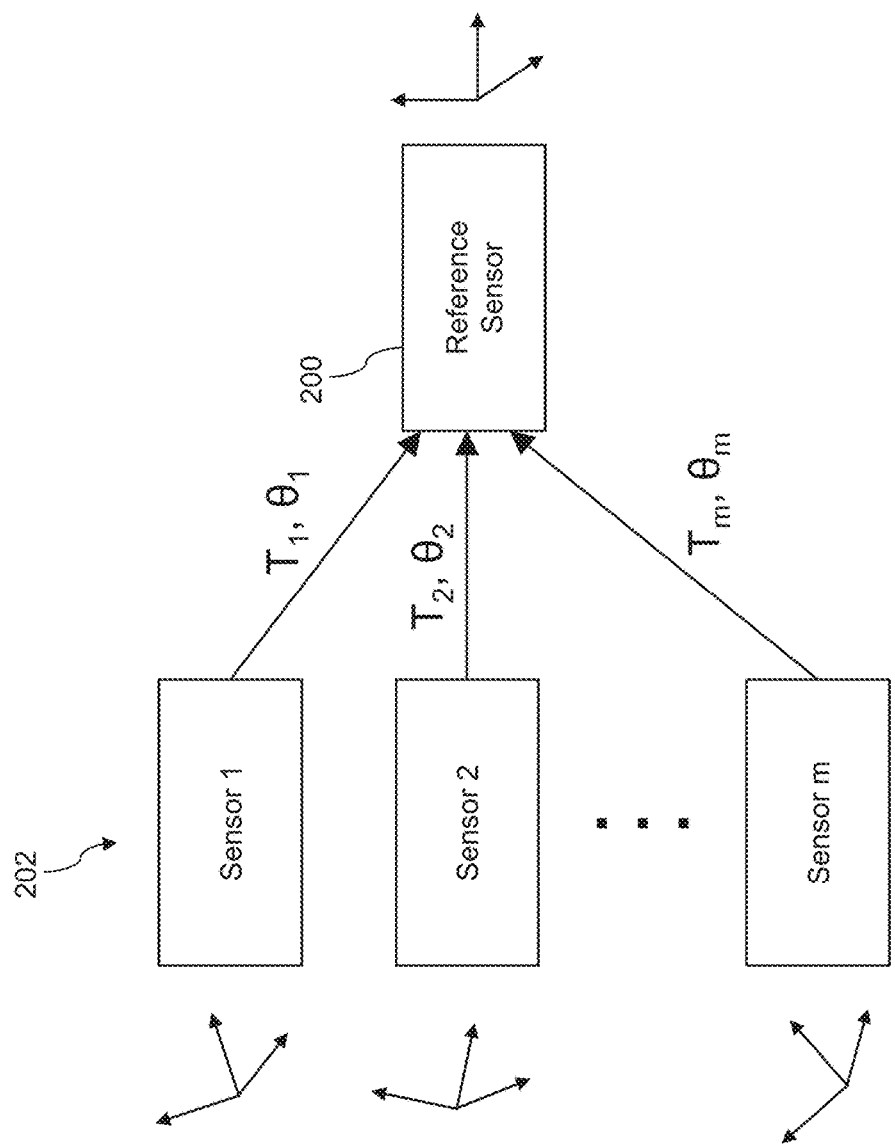
FIG. 2 illustrates extrinsic parameter calibration for a UAV, in accordance with embodiments.

FIG. 2 illustrates extrinsic parameter calibration for a UAV, in accordance with embodiments. The UAV includes a reference sensor 200 and a plurality of additional sensors 202. Each of the sensors 200, 202 is associated with a respective local coordinate system or reference frame that is indicative of the position and orientation of the sensor. In some embodiments, each sensor 202 is at a different respective position and orientation relative to the coordinate system of the reference sensor 200. The extrinsic parameters of each sensor 202 can be represented as a respective translation T and/or a respective rotation θ from the coordinate system of the sensor 202 to the coordinate system of the reference sensor 200. Accordingly, extrinsic parameter calibration can involve determining the set of extrinsic parameters $(T_1, \theta_1), (T_1, \theta_1), \ldots, (T_m, \theta_m)$ relating each of the sensors 202 to the reference sensor 200. Alternatively or in addition, extrinsic parameter calibration can involve determining the set of extrinsic parameters relating each of the sensors 202 to each other, rather than to the coordinate system of a single reference sensor 200. One of ordinary skill in the art would appreciate that determining the spatial relationships of the sensors 202 to a reference sensor 200 is equivalent to determining the spatial relationships of the sensors 202 to each other.

The UAVs described herein can implement various algorithms in order to perform state estimation and extrinsic parameter calibration. In some embodiments, the same algorithm is used to concurrently estimate the state information and extrinsic parameter values. In other embodiments, different algorithms are used to assess the state information and parameter values separately. Examples of such algorithms are described further herein. In some embodiments, it may be necessary or beneficial to initialize these algorithms with certain information prior to performing state estimation and/or parameter calibration for the first time (e.g., when the UAV has been powered on, started operating, or started flight). This information, which may be referred to herein as "initialization information," can include initial values for the UAV state and/or extrinsic parameters at an initial time point (e.g., when the UAV has been powered on, started operating, or started flight) that are used to initialize the state estimation and/or parameter calibration algorithms. The accuracy of the initialization information can influence the accuracy of the subsequent state estimation and/or parameter calibration procedures. The process of determining initialization information for the UAV may be referred to herein as "initialization."

For example, in some embodiments, the initialization information includes information indicative of an orientation of the UAV relative to the direction of gravity. This information may be particularly helpful for adjusting data from sensors that are influenced by gravity, such as inertial sensors. In some embodiments, it may be beneficial or necessary to subtract the contribution due to gravity from the acceleration measurements obtained by an inertial sensor such that the resultant inertial sensor data is indicative of the acceleration of the UAV only. Accordingly, the initialization procedure can involve determining the initial orientation of the UAV relative to the direction of gravity so as to enable correction of the inertial sensor data. Alternatively or in combination, the initialization information can include the position, orientation, velocity, acceleration, and/or extrinsic parameters of the UAV at an initial time point prior to or during UAV operation. The initialization information can be provided relative to the local coordinate system of the UAV, a global coordinate system, and/or a coordinate system of another entity (e.g., a remote controller for the UAV).

Figure 4:
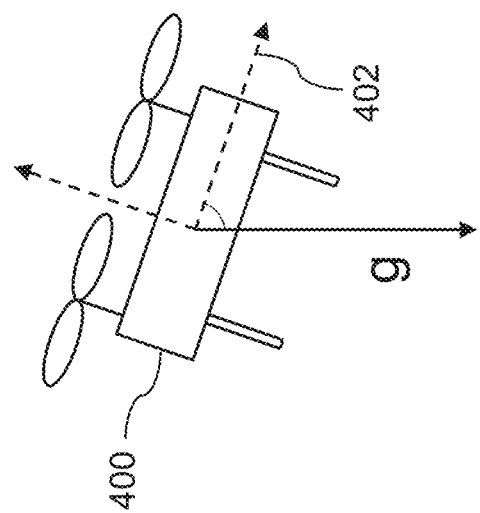
FIG. 4 illustrates initialization of a UAV in an inclined orientation, in accordance with embodiments.
Figure 3:
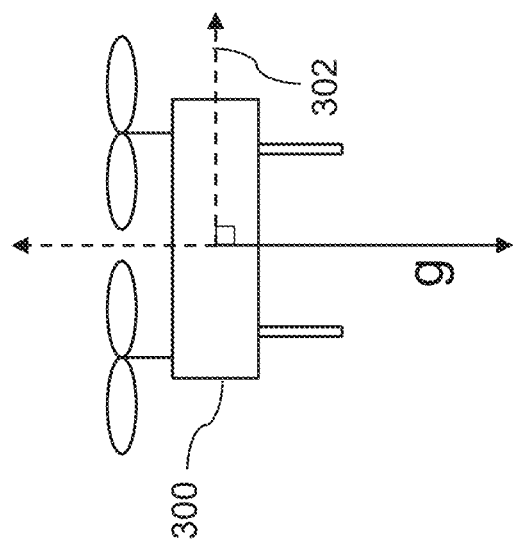
FIG. 3 illustrates initialization of a UAV in a horizontal orientation, in accordance with embodiments.

FIGS. 3 and 4 illustrate initialization of a UAV, in accordance with embodiments. FIG. 3 illustrates initialization of a UAV 300 in a horizontal orientation. "Horizontal orientation" may mean that the UAV 300 has a horizontal axis 302 (e.g., the axis passing through opposing lateral sides of the UAV) that is substantially orthogonal to the direction of the gravity vector g. The UAV 300 can be in a horizontal orientation, for example, when taking off from a horizontal surface. FIG. 4 illustrates initialization of a UAV 400 in an inclined orientation. "Inclined orientation" may mean that the UAV 400 has a horizontal axis 402 (e.g., the axis passing through opposing lateral sides of the UAV) that is nonorthogonal to the direction of the gravity vector g. The UAV 400 can be an inclined orientation, for example, when taking off from an inclined surface or when being launched from a non-stationary state (e.g., from mid-air or from being thrown into the air by a user). In some embodiments, the initialization methods described herein can be used to determine whether the UAV is initially at a horizontal orientation or an inclined orientation and/or the degree of inclination of the UAV relative to the gravity vector.

In some embodiments, if an error occurs in the state estimation and/or extrinsic parameter calibration algorithms, it may be necessary to reinitialize and restart the algorithm. An error may involve one or more sensors providing sensor data for the algorithm malfunctioning (e.g., failing to provide adequate data) or the algorithm failing to produce a result (e.g., failing to converge on a result within a specified period of time). Reinitialization may be substantially similar to the initialization procedure described herein, except that the reinitialization information is obtained at a time point at or around the time the error occurred, rather than at an initial time point of UAV operation. In some embodiments, reinitialization is performed subsequently after detecting an error, and the process of reinitialization following an error may be referred to herein as "error recovery." Alternatively or in combination, reinitialization can be performed at any time point subsequent to initialization as desired, e.g., at predetermined time intervals.

Figure 5:
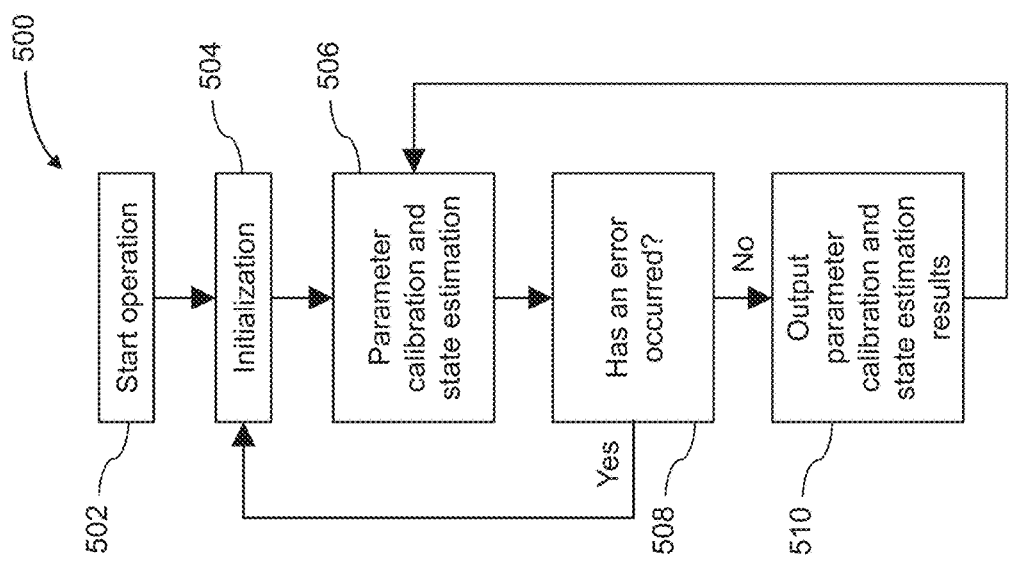
FIG. 5 illustrates a method for operating a UAV, in accordance with embodiments.

FIG. 5 illustrates a method 500 for operating a UAV, in accordance with embodiments. In step 502, the UAV starts operating (e.g., is powered on, takes off, etc.). In step 504, initialization is performed in order to determine initialization information for the UAV (e.g., orientation with respect to the direction of gravity as discussed above). In step 506, extrinsic parameter calibration and state estimation is performed for a current time point, e.g., to determine UAV position, orientation, velocity, relative positions and orientations of UAV sensors, etc. As discussed above, the parameter calibration and state estimation can be performed concurrently or separately. In step 508, it is determined whether an error occurred during UAV operation, e.g., a sensor malfunction or a failure in the parameter calibration and/or state estimation procedure. If an error did occur, the method 500 proceeds back to step 504 to reinitialize the UAV for error recovery. If no error has occurred, the results of the parameter calibration and state estimation are output in step 510, e.g., to a flight control module, remote terminal or controller, etc, for subsequent storage and/or use. For example, the flight control module can use the determined parameter values and/or state information to facilitate UAV navigation, mapping, obstacle avoidance, and the like. The method 500 then proceeds back to step 506 to repeat the parameter calibration and state estimation procedure for the next time point. The method 500 can be repeated at any rate, such as at least once every 0.1 seconds, so as to provide updated state information and parameter values during UAV operation.

In some embodiments, performing UAV initialization and/or error recovery as described herein is advantageous because this approach does not require making any assumptions about the initial state (e.g., position, orientation, velocity, acceleration, etc.) of the UAV. For instance, the approaches herein can permit UAV initialization and/or error recovery without assuming that the UAV is initially stationary (e.g., the velocity and acceleration are equal to zero). This assumption may be appropriate for certain situations (e.g., when the UAV is taking off from the ground or other planar surface) and the direction of the gravity vector can be obtained directly from the inertial sensor data in such embodiments. However, this assumption may not be appropriate for other situations (e.g., if the UAV is initially sliding down an inclined surface, if the UAV is thrown into the air by a user, if the UAV is in mid-air when an error occurs, etc.). In such embodiments, it may not be possible to determine the direction of the gravity vector from the inertial sensor data only, since there may be other acceleration values influencing the sensor result. Accordingly, the methods herein permit determination of the gravity vector regardless of the initial state of the UAV (e.g., whether the UAV is stationary or moving), thus improving the flexibility and accuracy of initialization and error recovery.

The UAVs described herein may utilize data from multiple sensors in order to perform the initialization, state estimation, and extrinsic parameter calibration methods provided herein. Various types and combinations of sensors can be used. In some embodiments, the UAV utilizes at least one inertial sensor and a least one image sensor. Optionally, the UAV can utilize at least one inertial sensor and a plurality of image sensors, such as two or more, three or more, four or more, five or more, six or more, seven or more, eight or more, nine or more, or ten or more image sensors.

An inertial sensor may be used herein to refer a motion sensor (e.g., a velocity sensor, an acceleration sensor such as an accelerometer), an orientation sensor (e.g., a gyroscope, inclinometer), or an IMU having one or more integrated motion sensors and/or one or more integrated orientation sensors. An inertial sensor may provide sensing data relative to a single axis of motion. The axis of motion may correspond to an axis of the inertial sensor (e.g., a longitudinal axis). A plurality of inertial sensors can be used, with each inertial sensor providing measurements along a different axis of motion. For example, three accelerometers can be used to provide acceleration data along three different axes of motion. The three directions of motion may be orthogonal axes. One or more of the accelerometers may be linear accelerometers configured to measure acceleration along a translational axis. Conversely, one or more of the accelerometers may be angular accelerometers configured to measure angular acceleration around a rotational axis. As another example, three gyroscopes can be used to provide orientation data about three different axes of rotation. The three axes of rotation may be orthogonal axes (e.g., roll axis, pitch axis, yaw axis). Alternatively, at least some or all of the inertial sensors may provide measurement relative to the same axes of motion. Such redundancy may be implemented, for instance, to improve measurement accuracy. Optionally, a single inertial sensor may be capable of providing sensing data relative to a plurality of axes. For example, an IMU including a plurality of integrated accelerometers and gyroscopes can be used to generate acceleration data and orientation data with respect to up to six axes of motion. Alternatively, a single accelerometer can be used to detect acceleration along multiple axes, and a single gyroscope can be used to detect rotation about multiple axes.

The image sensor can be any device configured to detect electromagnetic radiation (e.g., visible, infrared, and/or ultraviolet light) and generate image data based on the detected electromagnetic radiation. The image data generated by an image sensor can include one or more images, which may be static images (e.g., photographs), dynamic images (e.g., video), or suitable combinations thereof. The image data can be polychromatic (e.g., RGB, CMYK, HSV) or monochromatic (e.g., grayscale, black-and-white, sepia). In some embodiments, the image sensor can be a camera. Although certain embodiments provided herein are described in the context of cameras, it shall be understood that the present disclosure can be applied to any suitable image sensor, and any description herein relating to cameras can also be applied to other types of image sensors. A camera can be used to generate 2D images of a 3D scene (e.g., an environment, one or more objects, etc.). The images generated by the camera can represent the projection of the 3D scene onto a 2D image plane. Accordingly, each point in the 2D image corresponds to a 3D spatial coordinate in the scene. Multiple cameras can be used to capture 2D images of a 3D scene in order to allow the 3D spatial information of the scene (e.g., depth information indicative of a distance between an object in the scene and the UAV) to be reconstructed. Optionally, a single image sensor can be used to obtain 3D spatial information, e.g., using structure from motion techniques. The 3D spatial information can be processed to determine the UAV state (e.g., position, orientation, velocity, etc.).

The combination of inertial sensors and image sensors can provide various benefits for UAV operation. For instance, the accuracy of inertial data from inertial sensors such as IMUs may degrade over time due to noise and drift, or may be influenced by acceleration due to gravity. This issue may be mitigated or overcome by correcting and/or combining the inertial data with image data from one or more image sensors. As another example, the use of multiple image sensors can allow the UAV to continue operating even if some of the image sensors are obstructed and/or have malfunctioned, as the remaining image sensors are still available to collect data. Accordingly, inertial data from one or more inertial sensors and image data from one or more image sensors can be processed and combined using a sensor fusion algorithm in order to provide more robust and accurate sensing results for UAV operation.

Figure 6:
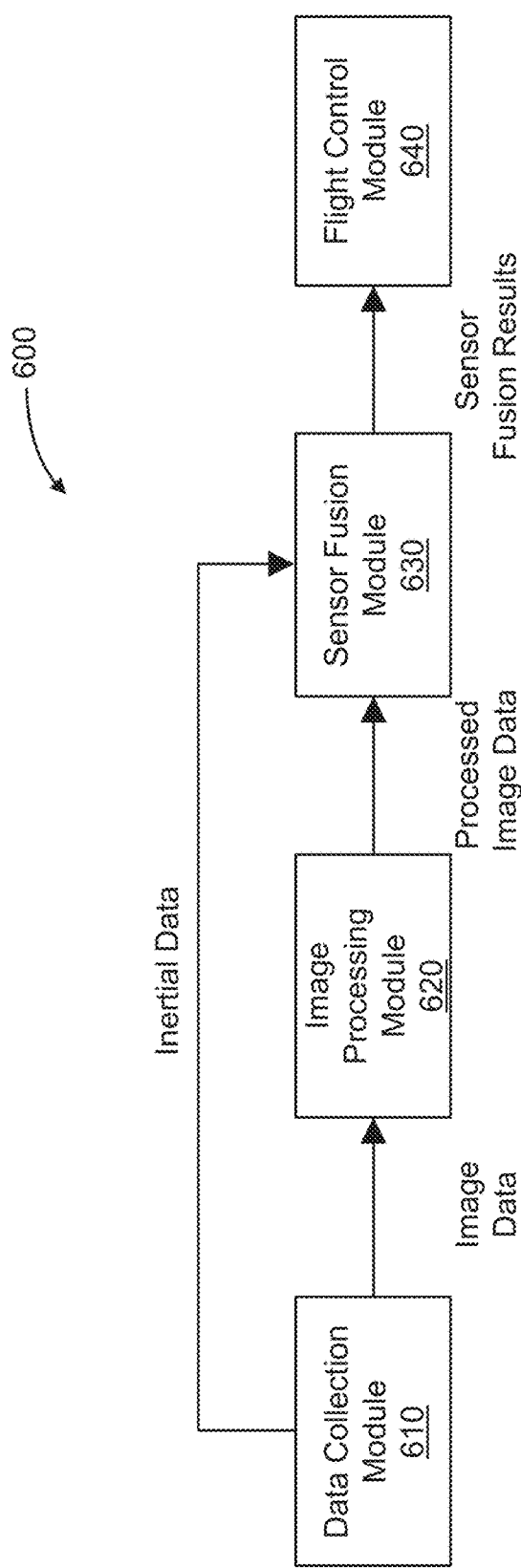
FIG. 6 illustrates a system for processing inertial data and image data, in accordance with embodiments.

FIG. 6 illustrates a system 600 for processing inertial data and image data, in accordance with embodiments. In some embodiments, the system 600 includes a data collection module 610, a image processing module 620, a sensor fusion module 630, and a flight control module 640. The various modules of the system 600 can be implemented using any suitable combination of hardware and software components, as described further herein. For example, each module can include suitable hardware components such as one or more processors and memory storing instructions executable by the one or more processors to perform the functions described herein. Alternatively or in combination, two or more modules can be implemented using the same set of hardware components, e.g., the same processor.

The data collection module 610 can be used to obtain inertial data and image data from one or more inertial sensors and one or more image sensors, respectively. In some embodiments, the inertial data and the image data is collected at substantially the same frequency. In other embodiments, the inertial data and the image data is collected at different frequencies, e.g., the inertial data is collected at a higher frequency that the image data, or vice-versa. For example, an inertial sensor may output inertial data at a frequency greater than or equal to about 50 Hz, 100 Hz, 150 Hz, 200 Hz, 250 Hz, 300 Hz, 350 Hz, 400 Hz, 450 Hz, 500 Hz, or more. An image sensor may output image data at a frequency greater than or equal to about 1 Hz, 5 Hz, 10 Hz, 15 Hz, 20 Hz, 25 Hz, 30 Hz, 40 Hz, 50 Hz, or 100 Hz. In embodiments where multiple image sensors are used, the data collection module 610 can synchronously collect image data from each of the image sensors at the same time points.

The image processing module 620 can be used to process the image data received from the data collection module 610. In some embodiments, the image processing module 620 implements a feature point algorithm that detects and/or extracts one or more feature points from one or more images. A feature point (also referred to herein as a "feature") can be a portion of an image (e.g., an edge, corner, interest point, blob, ridge, etc.) that is uniquely distinguishable from the remaining portions of the image and/or other feature points in the image. Optionally, a feature point may be relatively invariant to transformations of the imaged object (e.g., translation, rotation, scaling) and/or changes in the characteristics of the image (e.g., brightness, exposure). A feature point may be detected in portions of an image that is rich in terms of informational content (e.g., significant 2D texture, texture that exceeds a threshold value). A feature point may be detected in portions of an image that are stable under perturbations (e.g., when varying illumination and brightness of an image). Feature detection as described herein can be accomplished using various algorithms which may extract one or more feature points from image data. The algorithm may be an edge detection algorithm, a corner detection algorithm, a blob detection algorithm, or a ridge detection algorithm. In some embodiments, the corner detection algorithm may be a "Features from accelerated segment test" (FAST). In some embodiments, the feature detector may extract feature points and make calculations regarding feature points using FAST. In some embodiments, the feature detector can be a Canny edge detector, Sobel operator, Harris & Stephens/Plessy/Shi-Tomasi corner detection algorithm, the SUSAN corner detector, Level curve curvature approach, Laplacian of Gaussian, Difference of Gaussians, Determinant of Hessian, MSER, PCBR, or Grey-level blobs, ORB, FREAK, or suitable combinations thereof.

Optionally, the image processing module 620 can match the same feature points across different images, thus generating a set of matched feature points. Feature point matching can involve matching feature points between images captured by the same image sensor (e.g., images captured at different time points such as consecutive time points), between images captured by different image sensors (e.g., at the same time points or at different time points), or combinations thereof. Feature point matching can be performed using corner detection algorithms, optical flow algorithms, and/or feature matching algorithms. For example, optical flow can be used to determine the motion between consecutive images and thereby predict the location of a feature point in a subsequent image. Alternatively or in combination, feature point descriptors (e.g., characteristics of that can be used to uniquely identify the feature point) can be used to locate the same feature point in other images. Exemplary algorithms suitable for use with the embodiments herein are described in further detail herein.

In some embodiments, the image processing module 620 is configured to meet certain performance criteria so as to ensure that the image processing occurs at a sufficiently fast rate and with sufficient accuracy. For example, the image processing module 620 can be configured to handle three or more data channels with a real-time processing frequency of about 20 Hz. As another example, the image processing module 620 can be configured to perform feature tracking and matching such that the number of inliers in the RANSAC algorithm is greater than or equal to 70% when the reprojection error is 2, for example.

The sensor fusion module 630 can obtain the inertial data from the data collection module 610 and the processed image data (e.g., matched feature points) from the image processing module 620. In some embodiments, the sensor fusion module 630 implements one or more sensor fusion algorithms that process the inertial data and processed image data in order to determine information relevant to UAV operation, such as initialization information, state information, or extrinsic parameters. For example, a sensor fusion algorithm can be used to calculate UAV position and/or motion information, such as the UAV position, attitude, and/or velocity. Exemplary sensor fusion algorithms suitable for use with the embodiments herein are described in further detail below.

The flight control module 640 can use the sensor fusion results generated by the sensor fusion module 630 in order to determine control signals for the UAV. The control signals can be used to control operation of one or more UAV components, such as one or more propulsion units, one or more sensors, one or more payloads, one or more communication modules, and so on. In some embodiments, the control signals are used to effect autonomous or semi-autonomous UAV operation, e.g., for navigation, obstacle avoidance, route planning, environmental mapping, and the like.

Figure 7:
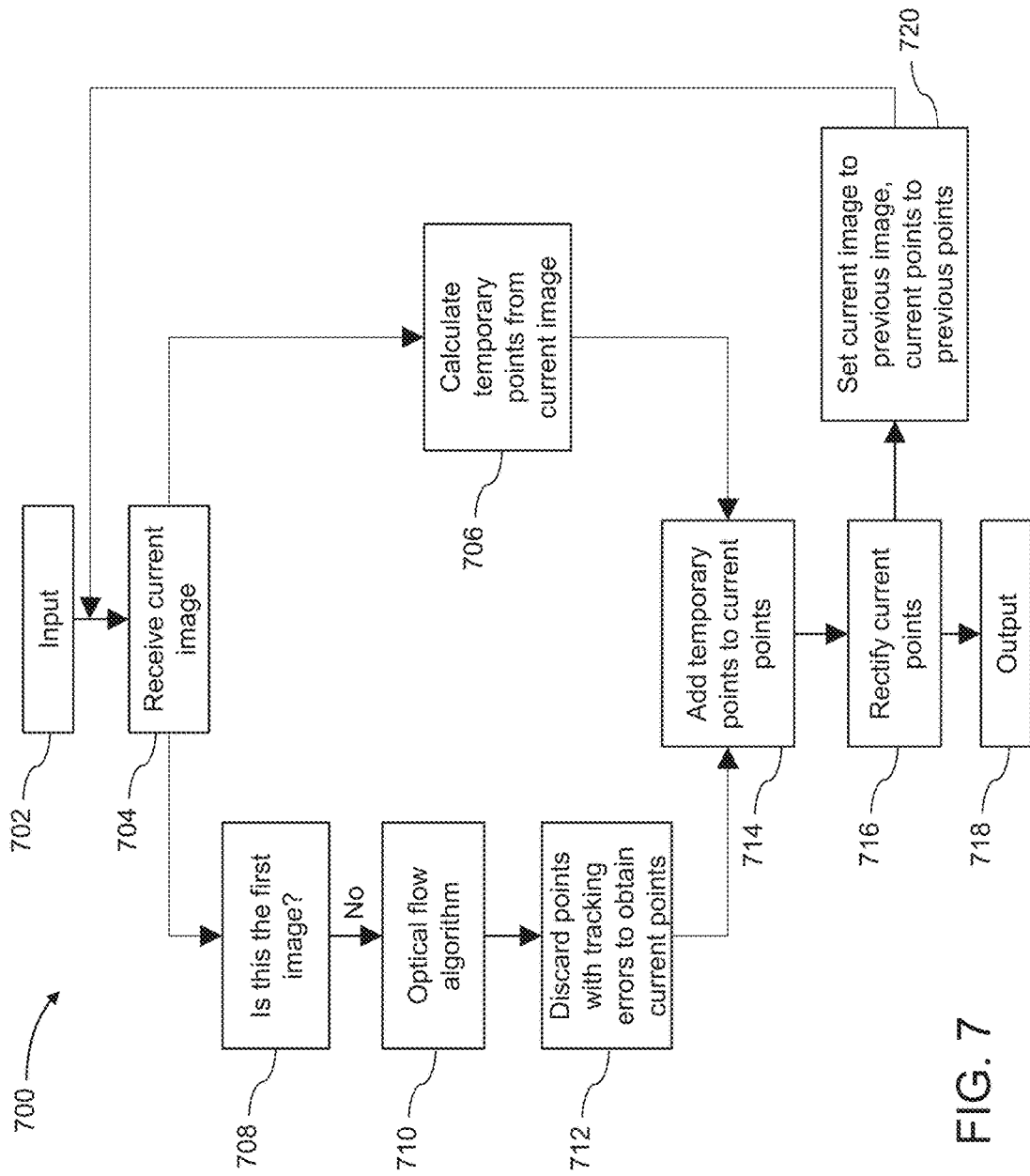
FIG. 7 illustrates an algorithm for performing feature point matching between images captured by a single image sensor at different time points, in accordance with embodiments.

FIG. 7 illustrates an algorithm 700 for performing feature point matching between images captured by a single image sensor at different time points (also known as "single channel processing"), in accordance with embodiments. The method 700, as with all other methods described herein, can be performed using any embodiment of the systems and devices described herein. In some embodiments, one or more steps of the method 700 are performed by one or more processors associated with the image processing module 620 of the system 600.

The input 702 to the algorithm 700 can include a sequence of images obtained by a single image sensor at a plurality of time points. In step 704, one of the images in the sequence (the "current image") is received. In step 706, a set of one or more feature points can be calculated from the current image ("temporary points"), e.g., using a corner detection algorithm or any other suitable feature point detection algorithm. The step 706 can involve calculating feature points using only the current image and no other images.

In step 708, it is determine whether the current image is the first image in the sequence (e.g., image captured at the earliest time point). If it is not the first image and there is at least one previous image captured at an earlier time point, the algorithm proceeds to step 710. In step 710, the current image is compared to one or more previous images using an optical flow algorithm. In some embodiments, the optical flow algorithm tracks one or more feature points detected in the previous image(s) ("previous points") to match the previous points to the feature points in the current image. Alternatively or in combination, other types of tracking algorithms can be used to match feature points, e.g., tracking algorithms that perform matching based on feature point descriptors. If tracking errors arise during the tracking of a previous point, e.g., the tracking is inaccurate or cannot be performed, that point can be discarded from the analysis in step 712. The remaining set of temporally-matched feature points are considered to be the "current points" for the analysis.

In step 714, the temporary points are added to the set of current points, and the resultant set of feature points is rectified (e.g., using extrinsic parameters) in order to produce a final set of feature points that are the output 718 of the algorithm. Alternatively, if the current image was determined not to be the first image in step 708, the steps 710 and 712 can be omitted, such that the final set of feature points are obtained from the temporary points determined in step 706 only. In step 720, the current image is set to be the previous image, and the current points are set to be the previous points. The algorithm 700 then proceeds back to the step 704 for the next iteration, in which the next image in the sequence is received for processing.

Figure 8:
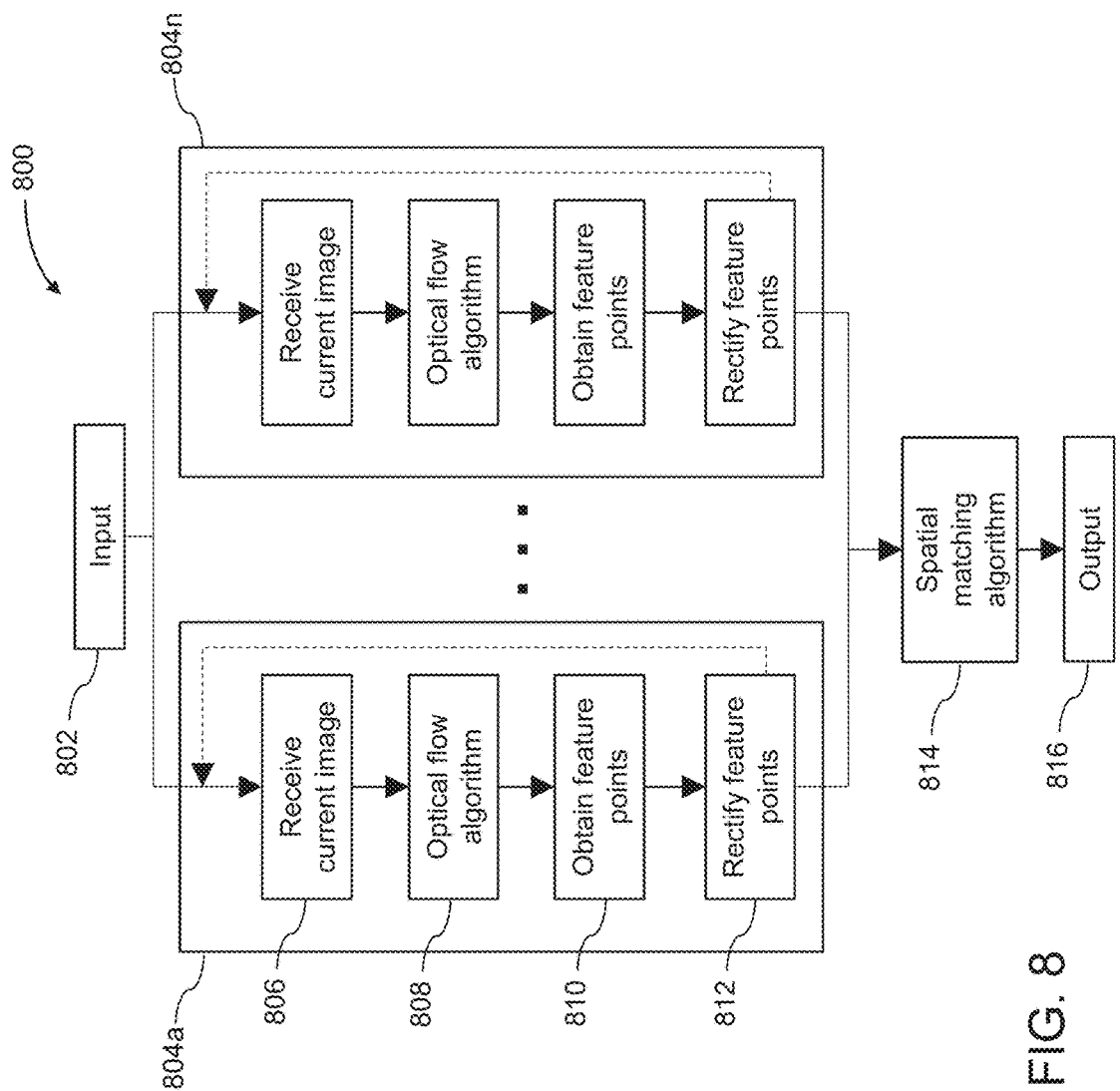
FIG. 8 illustrates an algorithm for performing feature point matching between images captured by different image sensors, in accordance with embodiments.

FIG. 8 illustrates an algorithm 800 for performing feature point matching between images captured by different image sensors (also known as "multi-channel processing"), in accordance with embodiments. In some embodiments, one or more steps of the method 800 are performed by one or more processors associated with the image processing module 620 of the system 600.

The input 802 to the algorithm 800 can include a plurality of images obtained by a plurality of different image sensors. In some embodiments, each image sensor provides a sequence of images obtained over a plurality of time points. The image data collection can be synchronous such that the image sensors are obtaining the images at substantially the same time points. Alternatively, the image data collection can be asynchronous such that different image sensors obtain images at different time points. Additional examples of asynchronous image data collection are described further herein.

The algorithm 800 can obtain temporally-matched feature points from each sequence of images from each image sensor using the single channel processing techniques described herein (e.g., the algorithm 700). For example, a plurality of parallel processes 804a . . . 804n can be used to obtain temporally-matched feature points from images of a corresponding number of image sensors. Similar to the steps of the algorithm 700 described herein, a single channel process can involve receiving a current image from an image sequence generated by a single image sensor (step 806), using an optical flow algorithm to track and match feature points in the current image to feature points in one or more previous images (step 808), obtaining a set of matched feature points by discarding feature points that could not be tracked (step 810), and rectifying the feature points using extrinsic calibration parameters for the image sensor (step 812). The resultant set of feature points can tracked and matched to feature points in subsequent images, as described herein. The single channel matching procedure can be repeated until all of the images in the image sequence have been processed.

In step 814, once a set of temporally-matched feature points have been obtained for each image sequence from each image sensor, feature points from different image sequences can be spatially matched to each other using a spatial matching algorithm. Since different image sensors can be configured to capture images with different fields of view, the same feature point in a scene may appear at different spatial locations in images from different sensors. At least some of the image sensors can have overlapping fields of view in order to ensure that at least some of the feature points will be present in image sequences from more than one image sensor. In some embodiments, the spatial matching algorithm analyzes images obtained by different image sensors (e.g., at the same time point or at different time points) in order to identify and match feature points across the different image sequences. The final output 816 of the algorithm 800 can be a set of feature points including temporally-matched feature points within the respective image sequences produced by each image sensors and spatially-matched feature points across the different image sequences.

In embodiments where multiple image sensors are used, collection and/or processing of image data from each of the image sensors can occur synchronously or asynchronously. For example, a synchronous image data collection scheme can involve each image sensor obtaining image data at substantially the same time points, and the image data can be transmitted to the processor(s) simultaneously. In contrast, an asynchronous image data collection scheme can involve different image sensors obtaining image data at different time points, and the image data can be transmitted to the processor(s) at different times (e.g., sequentially). In an asynchronous scheme, some of the image sensors may obtain images at the same time points and other image sensors may obtain images at different time points.

Figure 20:
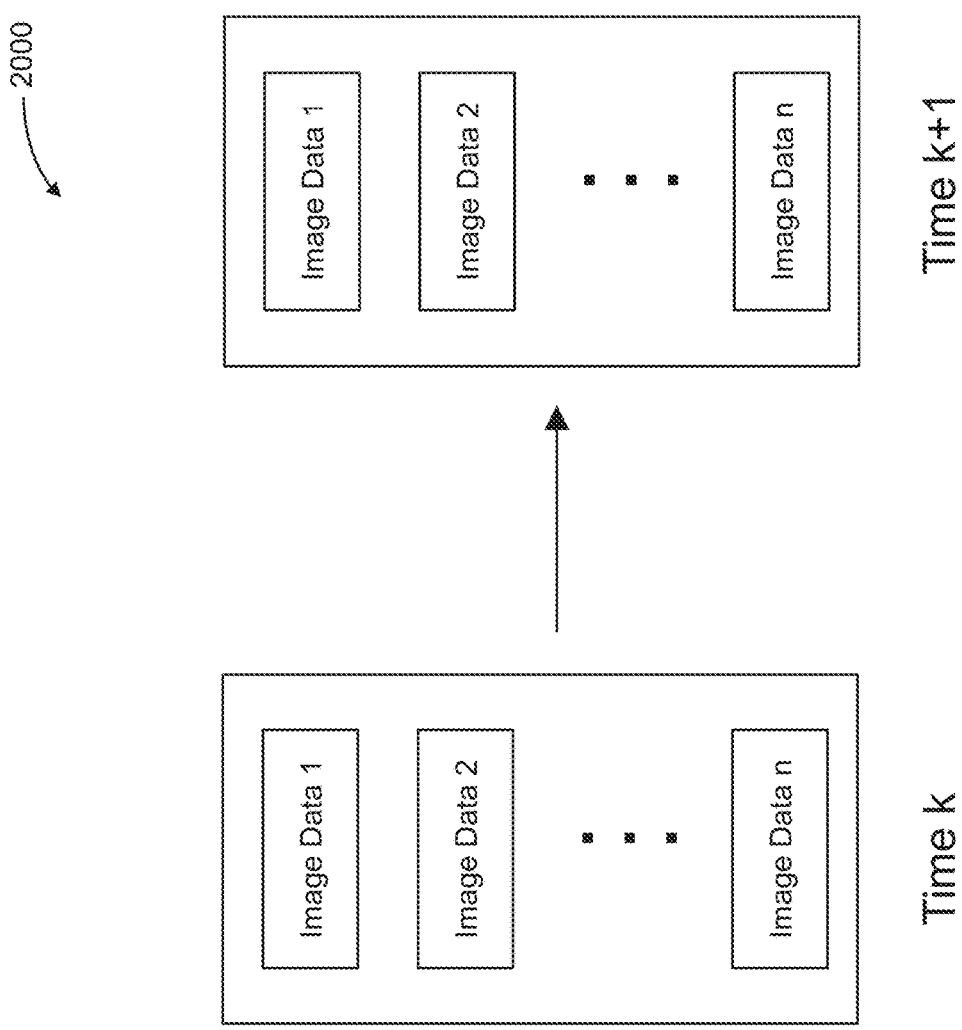
FIG. 20 illustrates a synchronous image data collection scheme, in accordance with embodiments.

FIG. 20 illustrates a synchronous image data collection scheme 2000, in accordance with embodiments. The scheme 2000 can be used to obtain and process data from any number of image sensors, such as two, three, four, five, six, seven, eight, nine, 10, 15, 20, 30, 40, 50, or more image sensors. In the depiction of FIG. 20, image data is received synchronously from n image sensors. For example, at a first time point k, each of the image sensors generates respective image data. The image data from each of the sensors can be simultaneously transmitted to one or more processors (e.g., of an image processing module). The image data can be transmitted along with a timestamp indicating the time point at which the data was generated. Similarly, at a second time point k+1, image data is obtained by each image sensor and transmitted to the processor(s) simultaneously. This process can be repeated during operation of the UAV. Synchronous image data collection can be advantageous in terms of improving the ease and accuracy of feature point matching across images from different sensors. For instances, images taken at the same time point may exhibit fewer variations in exposure time, brightness, or other image characteristics that may influence the ease of feature point matching.

Figure 21:
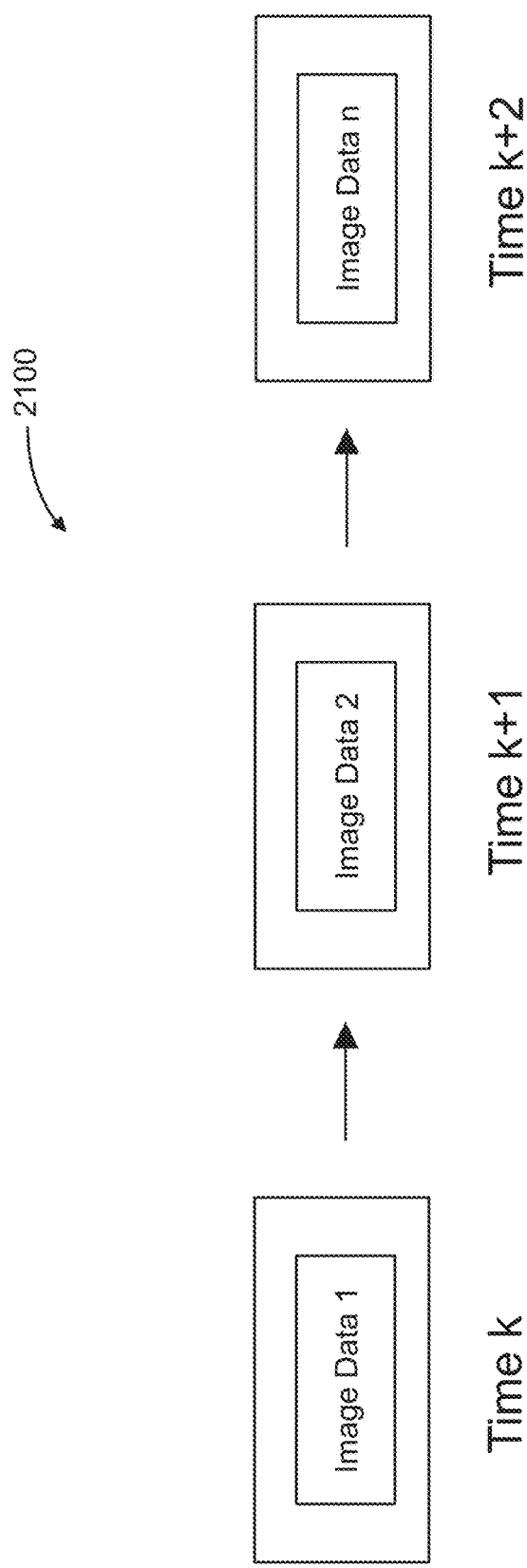
FIG. 21 illustrates an asynchronous image data collection scheme, in accordance with embodiments.

FIG. 21 illustrates an asynchronous image data collection scheme 2100, in accordance with embodiments. The scheme 2100 can be used to obtain and process data from any number of image sensors, such as two, three, four, five, six, seven, eight, nine, 10, 15, 20, 30, 40, 50, or more image sensors. In the depiction of FIG. 21, image data is received asynchronously from n image sensors. For example, at a first time point k, a first image sensor obtains and transmits image data to one or more processors (e.g., of an image processing module). At a second time point k+1, a second image sensor obtains and transmits image data to the one or more processors. At a third time point k+2, the nth image sensor obtains and transmits image data to the one or more processors. Each image data can be transmitted along with a timestamp indicating the time point at which it was obtained, e.g., in order to facilitate downstream image processing. The time interval between different time points may be constant or variable. In some embodiments, the time interval between the different time points is about 0.02 s, or is within a range from about 0.05 s to about 0.2 s. This process can be repeated during operation of the UAV until each of the image data has been received from each of the image sensors. The order in which the image data is obtained and received can be varied as desired. Additionally, while FIG. 21 illustrates image data being obtained from a single image sensor at each time point, it shall be appreciated that image data can be received from multiple sensors at some or all of the time points. In some embodiments, asynchronous image data collection is achieved by selectively coupling different subset of image sensors to the one or more processors via a switching mechanism, as described further herein. Asynchronous image data collection can provide various advantages, such as relative ease of implementation, compatibility with a wider range of hardware platforms, and reduction of computing load.

As described herein, the systems and devices of the present disclosure can include a sensor fusion module (e.g., the sensor fusion module 630 of the system 600) configured to implement a sensor fusion algorithm that processes image data and inertial data to obtain state information, initialization information, and/or extrinsic parameters. In some embodiments, the sensor fusion algorithm is performed throughout operation of the UAV (e.g., continuously or at predetermined time intervals) so as to provide updates in real time. Various types of sensor fusion algorithms are suitable for use with the embodiments presented herein, such as Kalman filter-based algorithms or optimization algorithms. In some embodiments, the optimization methods presented herein can be considered to be a type of bundle-based algorithm. Kalman filter-based algorithms can also be considered to be a special case of bundle-based algorithms. In some embodiments, the primary distinction between a Kalman filter-based algorithm and the bundle-based algorithms presented herein is the number of states to be optimized. A Kalman filter-based algorithm may utilize one or two states, while the bundle-based algorithms herein may utilize more than three states (e.g., at least 5 states, at least 10 states, at least 20 states, at least 30 states, at least 40 states, or at least 50 states). In some embodiments, the bundle-based algorithms presented herein can provide increased accuracy since the optimization procedure utilizes more information. In some embodiments, a Kalman filter-based algorithm can provide increased speed and stability.

In some embodiments, the sensor fusion algorithm involves an optimization algorithm. The optimization algorithm can be used to determine a set of solution parameters that minimize or maximize the value of an objective function. In some embodiments, the optimization algorithm is an iterative optimization algorithm that iteratively generates estimates until the algorithm converges to a solution, or the algorithm is stopped (e.g., for exceeding a time threshold). In some embodiments, the optimization algorithm is linear, while in other embodiments, the optimization algorithm is non-linear. In some embodiments, the optimization algorithm involves iteratively linearizing and solving a non-linear function. The embodiments herein may utilize a single optimization algorithm or a plurality of different types of optimization algorithms in order to estimate different types of UAV information. For example, the methods described herein can involve using a linear optimization algorithm to estimate certain values and a non-linear optimization algorithm to estimate other values.

In some embodiments, the present disclosure provides an iterative optimization algorithm for using inertial data from at least one inertial sensor and image data from at least two image sensors to estimate UAV state information (e.g., position, orientation, velocity) and/or extrinsic parameters (e.g., spatial relationships between the inertial sensor(s) and/or image sensors) at one or more time points during UAV operation. Optionally, the iterative optimization algorithm can also determine the estimated values for the state information and/or extrinsic parameters based on initial values for the state information and/or extrinsic parameters. The iterative optimization algorithm can involve, for example, calculating a maximum a posteriori probability (MAP) estimate of the state information and/or extrinsic parameters based on the inertial data, image data, and/or initial values. In some embodiments, the objective function for the iterative optimization algorithm relates the actual values of the state information, initialization information, and/or extrinsic parameters to estimates of the state information, initialization information, and/or extrinsic parameters computed based on inertial data, image data, and/or initial values. The objective function can be a linear function or a non-linear function. Iterative solving techniques can be used to minimize or maximize the objective function in order to obtain a solution for the actual values of state information, initialization information, and/or extrinsic parameters. For example, a non-linear objective function can be iteratively linearized and solved, as discussed further herein.

Figure 9:
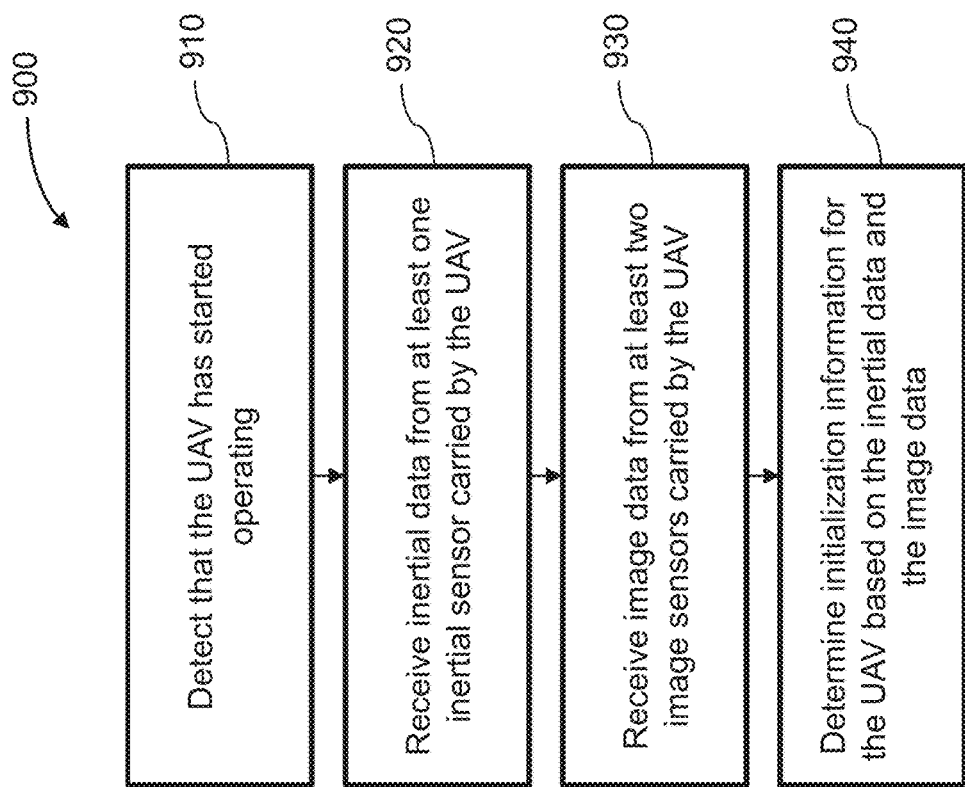
FIG. 9 illustrates a method for determining initialization information for a UAV using multiple sensors, in accordance with embodiments.

FIG. 9 illustrates a method 900 for determining initialization information for a UAV (or any other movable object) using multiple sensors, in accordance with embodiments. The steps of the method 900 can be performed using any embodiment of the systems and devices described herein. For example, some or all of the steps of the method 900 can be performed using one or more processors carried by a UAV. The method 900 can be performed in combination with any embodiment of the various methods described herein.

As discussed herein, the initialization information to be determined using the method 900 can include one or more of: an orientation of the UAV (e.g., relative to a gravity direction), a position of the UAV, or a velocity of the UAV. For example, the initialization information can include an orientation of the UAV (e.g., relative to a gravity direction), a position of the UAV, and a velocity of the UAV. In some embodiments, the initialization information is determined for a time point approximately when the UAV starts operation. For example, the time point can be no more than about 50 ms, 100 ms, 200 ms, 300 ms, 400 ms, 500 ms, 600 ms, 700 ms, 800 ms, 900 ms, 1 s, 2 s, 3 s, 4 s, 5 s, 6 s, 7 s, 8 s, 9 s, 10 s, 30 s, or 60 s after the UAV started operating. As another example, the time point can be no more than about 50 ms, 100 ms, 200 ms, 300 ms, 400 ms, 500 ms, 600 ms, 700 ms, 800 ms, 900 ms, 1 s, 2 s, 3 s, 4 s, 5 s, 6 s, 7 s, 8 s, 9 s, 10 s, 30 s, or 60 s before the UAV started operating.

In step 910, it is detected that the UAV has started operating. The step 910 can involve detecting one or more of the following: the UAV has been powered on, the UAV has taken off from a surface, or the UAV has started flight. The UAV can take off from an inclined surface or an aclinic (non-inclined surface). The UAV can start flight from a surface (e.g., the ground), from a free falling state (e.g., in the air), from being launched from a launching apparatus, or from being thrown by a user into the air. Optionally, the step 910 can involve detecting one or more of the following: the propulsion units of the UAV have been actuated, the output of the propulsion units is greater than or equal to a threshold value, the UAV altitude is greater than or equal to a threshold value, the UAV velocity is greater than or equal to a threshold value, or the UAV acceleration is greater than or equal to a threshold value.

In step 920, inertial data is received from at least one inertial sensor carried by the UAV. The inertial data can include one or more measurements indicative of a three-dimensional acceleration and a three-dimensional angular velocity of the UAV. In some embodiments, the inertial data includes one or more measurements obtained by the at least one inertial sensor over a time interval starting from when the UAV started operating and/or when the UAV is in flight.

In step 930, image data is received from at least two image sensors carried by the UAV. The image data can include one or more images of an environment around the UAV. In some embodiments, the image data can include one or more images obtained by each of the at least two image sensors over a time interval starting from when the UAV started operating and/or when the UAV is in flight.

In step 940, initialization information for the UAV is determined based on the inertial data and the image data. The initialization information can include a position, a velocity, and/or an orientation of the UAV relative to a gravity direction when the UAV started operating. In some embodiments, the step 940 includes processing the image data in accordance with the image processing algorithms described herein. For example, the image data can include one or more images obtained by each of the at least two image sensors over a time interval starting from when the movable object started operating, and the one or more images can be processed using feature point detection algorithm, an optical flow algorithm, and/or a feature matching based on descriptors algorithm. As discussed herein, images obtained from different image sensors can be compared to each other, e.g., in order to perform feature point matching. For example, one or more images obtained by a first image sensor can be compared to one or more images obtained by a second image sensor. Optionally, the initialization information can be determined using only the inertial data and the image data, without requiring any other data such as sensor data from other types of sensors. In some embodiments, the initialization information is determined directly from the inertial data and the image data, without requiring any initial estimates or values for the initialization information. The initialization information can be determined using only data obtained while the UAV is in operation (e.g., after the UAV has been powered on, during flight of the UAV), without relying on any data obtained prior to UAV operation (e.g., prior to the UAV being power on and/or in flight). For instance, the initialization information can be determined during UAV operation without requiring a prior initialization performed before the UAV started operating.

In some embodiments, the step 940 involves generating estimates of the initialization information using the inertial data and the image data. For example, the step 940 can be performed by generating a first estimate of the initialization information using the inertial data and generating a second estimate of the initialization information using the image data. The first and second estimates can be combined to obtain the initialization information for the UAV.

In some embodiments, the initialization information is determined using an optimization algorithm, such as a linear optimization algorithm, a nonlinear optimization algorithm, or an iterative nonlinear optimization algorithm. An exemplary algorithm suitable for use with the embodiments herein is presented below.

A UAV can have a sensing system including m cameras (or other image sensor type) and one IMU (or other inertial sensor type). The IMU can be configured to output angular velocity around three axes and linear acceleration value along three axes. The output frequency of the IMU can be higher than the output frequency of the cameras. For example, the sample rate for the cameras can be assumed to be $f_{cam}$ Hz, and $N=f_{cam} \times T$. The system can receive $(N+1) \times m$ images in a time interval T after starting operation (e.g., after powering on). The time interval T can correspond to a plurality of time points $t_0, t_1, t_2, t_3, t_4, t_5, \ldots, t_N$ and a plurality of UAV states $x_0^0, x_1^0, x_2^0, x_k^0, \ldots, x_N^0$, where $x_k^0 = [p_k^0, v_k^K, g^k]$, $k=0,1,2, \ldots, N$, $p_k^0$ represents a current position of the UAV (with respect to the position at $t_0$, the time point when operation started), $v_k^k$ represents a current velocity of the UAV (with respect to the body coordinate system of the UAV), and $g^k$ represents the acceleration due to gravity (with respect to the body coordinate system of the UAV). The initial condition can be $p_0^0 = [0, 0, 0]$.

The number of feature points observed in the received $(N+1) \times m$ images can be $M+1$. It can be assumed that the $i^{th}$ feature point is initially observed by the $j^{th}$ camera at a time $t_k$ ($0 \leq k \leq N$), and $\lambda_i$ is the depth of the feature point in a direction perpendicular to the a plane of the $j^{th}$ camera at time $t_k$. All the UAV states $x_0^0, x_1^0, x_2^0, x_k^0, \ldots, x_N^0$ and feature depths $\lambda_0, \lambda_1, \lambda_2, \lambda_3, \ldots, \lambda_M$ can form the total state X.

A plurality of IMU data can be received in a time $(t_k, t_{k+1})$, each corresponding to a time interval t, the following equations can be defined:

$$\alpha_{k+1}^k = \int\int_{t\in[k,k+1]} R_t^k a_t^b dt^2$$

$$\beta_{k+1}^k = \int_{t\in[k,k+1]} R_t^k a_t^b dt$$

where $R_t^k$ represents a rotation from a time t to a time k and is obtained by integrating an angular velocity from the IMU, $\alpha_t^b$ represents an acceleration with respect to the UAV body coordinate system at time t, and $\alpha$ and $\beta$ represent integrals of the raw IMU data. The estimate from the IMU data, $z_{k+1}^k$, can be determined as follows, with the covariance matrix $P_{k+1}^k$ representing an error caused by noise in the raw IMU data:

$$z_{k+1}^k = \begin{bmatrix} \hat{\alpha}_{k+1}^k \\ \hat{\beta}_{k+1}^k \\ 0 \end{bmatrix} = \begin{bmatrix} R_0^k(p_{k+1}^0 - p_k^0) - v_k^k \Delta t + g^k \frac{\Delta t^2}{2} \\ R_{k+1}^k v_{k+1}^{k+1} - v_k^k + g^k \Delta t \\ R_{k+1}^k g^{k+1} - g^k \end{bmatrix} =$$

$$\begin{bmatrix} \ldots & -R_0^k & -\Delta t & \frac{\Delta t^2}{t} & R_0^k & 0 & 0 & \ldots \\ \ldots & 0 & -1 & \Delta t & 0 & R_{k+1}^k & 0 & \ldots \\ \ldots & 0 & 0 & -1 & 0 & 0 & R_{k+1}^k & \ldots \end{bmatrix} \begin{bmatrix} \ldots \\ p_k^0 \\ v_k^k \\ g^k \\ p_{k+1}^0 \\ v_{k+1}^{k+1} \\ g^{k+1} \\ \ldots \end{bmatrix} =$$

$$H_{k+1}^k X + n_{k+1}^k$$

$$P_{k+1}^k = \begin{bmatrix} {}^{\alpha\beta}P_{k+1}^k & 0 \\ 0 & {}^g P_{k+1}^k \end{bmatrix}$$

where $H_{k+1}^k$ is the left matrix in the equation above, X is the total state, and $n_{k+1}^k$ is additive noise. ${}^{\alpha\beta}P_{k+1}^k$, and ${}^g P_{k+1}^k$ can be calculated using pre-integration techniques known to those of ordinary skill in the art.

For the cameras, if it is assumed that the feature point l is initially observed by a camera $c_n$ at a time $t_i$, then is observed by a camera $c_m$ at a time $t_j$, then the following estimate ${}^{cm}z_l^j$ can be obtained:

$${}^{cm}z_l^j = 0 = \begin{bmatrix} -1 & 0 & {}^{cm}u_l^j \\ 0 & -1 & {}^{cm}v_l^j \end{bmatrix} \left( R_b^{cj}\left( R_{ci}^b \lambda_i \begin{bmatrix} {}^{cn}u_l^j \\ {}^{cn}v_l^j \\ 1 \end{bmatrix} + T_{ci}^b \right) + T_b^{cj} \right) = H_l^{ij} X + n_l^{ij}$$

where X is the total state, ${}^{ci}u_l^j$ and ${}^{ci}v_l^j$ are the image coordinates for the feature point l in an image obtained by the $i^{th}$ camera at time $t_j$, $R_{ci}^b$ represents the rotation of the $i^{th}$ camera relative to the IMU, and $T_{ci}^b$ represents the translation of the $i^{th}$ camera relative to the IMU. $H_l^{ij}$ can be derived from the above equation similar to $H_{k+1}^k$ for the IMU data:

$$H_l^{ij} = \begin{bmatrix} \ldots & R_b^{cj} R_0^j & \ldots & -R_b^{cj} R_0^j & \ldots & R_b^{cj} R_0^j R_i^0 R_{ci}^b \begin{bmatrix} {}^{ci}u_l^j \\ {}^{ci}v_l^j \\ 1 \end{bmatrix} & \ldots \end{bmatrix}$$

The purpose can be to optimize an estimation of the UAV state by using (1) an estimate from the IMU and (2) a geometric constraint between image sequences. The objective equation is to minimize an error from the IMU and the geometric constraint between image sequences:

$$\min_X \left\{ \sum_{k=1,\ldots,K} \| z_{k+1}^k - H_{k+1}^k \|_{P_{k+1}^k}^2 + \sum_{(i,j,cn,cm)\in C} \| {}^{cm}z_l^j - H_l^{ij} X \|_{P_l^{ij}}^2 \right\}$$

It can be further defined that $$\Lambda_D = (H_{k+1}^k)^T (P_{k+1}^k)^{-1} H_{k+1}^k$$

$$b_D = (H_{k+1}^k)^T (P_{k+1}^k)^{-1} z_{k+1}^k$$

$$\Lambda_C = (H_l^{ij})^T (P_l^{ij})^{-1} H_l^{ij}$$

$$b_C = (H_l^{ij})^T (P_l^{ij})^{-1} H_l^{ij}$$

where $P_l^{ij}$ is a diagonal matrix measuring the uncertainty in the camera observation data.

In some embodiments, the solving procedure includes storing the estimate from the IMU in $\Lambda_D$, storing the geometric constraint between the image sequences in $\Lambda_C$, and then solving the following linear equation:

$$(\Lambda_D + \Lambda_C) X = (b_D + b_C)$$

The method 900 can provide various advantages for UAV operation. For example, the method 900 can be used to determine the orientation of the UAV with respect to a direction of gravity for various takeoff types, such as taking off from an inclined surface, taking off from mid-air or in free fall, or taking off by being manually launched or thrown by a user. Accordingly, the method 900 can further comprise correcting subsequent inertial data obtained from the inertial sensor using this orientation information. Moreover, the method 900 can be used to provide automatic initialization after the UAV has started operating, even in situations where the initial UAV state (e.g., position, orientation, velocity, etc.) is completely unknown.

In addition to allowing for automatic initialization of a UAV, the methods of the present disclosure can also be used to perform reinitialization or error recovery after an error occurs in the UAV system. The methods for reinitialization can be substantially similar to the methods for initialization described herein, except that the reinitialization is performed after an error has been detected, rather than after the UAV has started operation.

Figure 10:
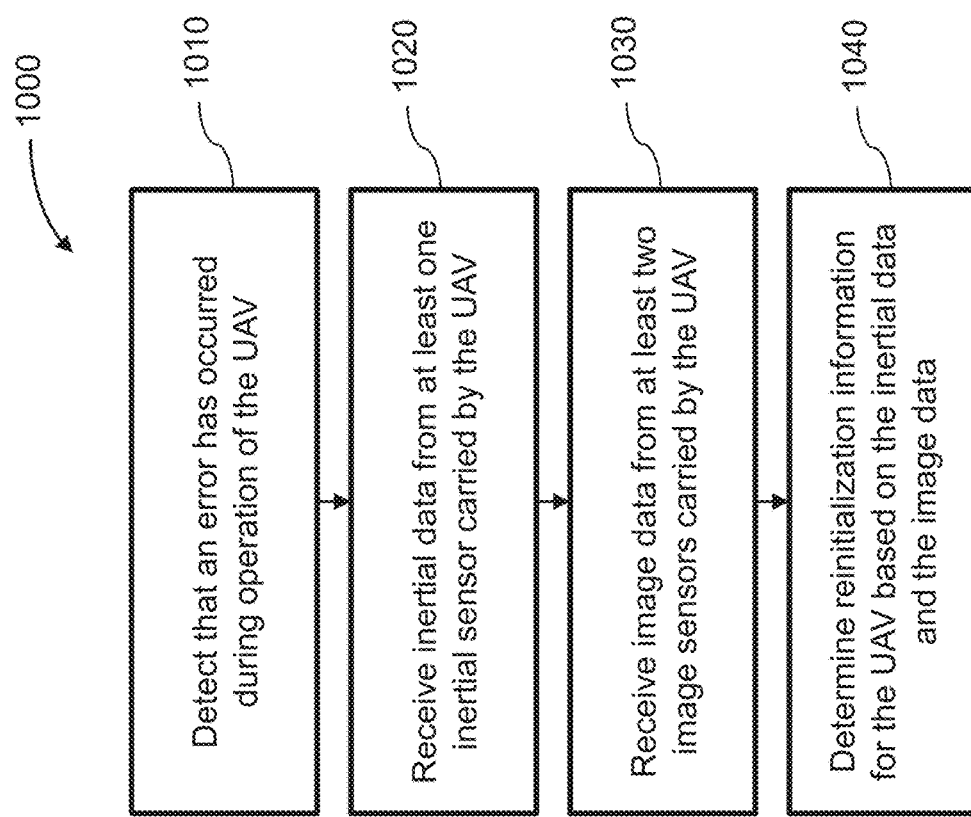
FIG. 10 illustrates a method for error recovery for a UAV using multiple sensors, in accordance with embodiments.

FIG. 10 illustrates a method 1000 for error recovery for a UAV (or any other movable object) using multiple sensors, in accordance with embodiments. The steps of the method 1000 can be performed using any embodiment of the systems and devices described herein. For example, some or all of the steps of the method 1000 can be performed using one or more processors carried by a UAV. The method 1000 can be performed in combination with any embodiment of the various methods described herein.

The method 1000 can be used to determine reinitialization information that is used to reinitialize the UAV after an error has occurred so normal operations can resume. Similar to the initialization information described herein, reinitialization information can include one or more of: an orientation of the UAV (e.g., relative to a gravity direction), a position of the UAV, or a velocity of the UAV. For example, the reinitialization information can include an orientation of the UAV (e.g., relative to a gravity direction), a position of the UAV, and a velocity of the UAV. In some embodiments, the reinitialization information is determined for a time point approximately when the error occurred. For example, the time point can be no more than about 50 ms, 100 ms, 200 ms, 300 ms, 400 ms, 500 ms, 600 ms, 700 ms, 800 ms, 900 ms, 1 s, 2 s, 3 s, 4 s, 5 s, 6 s, 7 s, 8 s, 9 s, 10 s, 30 s, or 60 s after the error occurred. As another example, the time point can be no more than about 50 ms, 100 ms, 200 ms, 300 ms, 400 ms, 500 ms, 600 ms, 700 ms, 800 ms, 900 ms, 1 s, 2 s, 3 s, 4 s, 5 s, 6 s, 7 s, 8 s, 9 s, 10 s, 30 s, or 60 s before the error occurred.

In step 1010, it is detected that an error has occurred during operation of the UAV. Operation of the UAV can involve the UAV being powered on, the UAV having taken off from a surface, or the UAV having started flight. The error can involve a malfunction in one or more sensors, such as a malfunction in one or more of the at least one inertial sensor or the at least two inertial sensors. The error can involve a malfunction in a UAV component, such as a data collection module, image processing module, sensor fusion module, or flight control module. For example, the UAV can include a sensor fusion module that uses an iterative optimization algorithm, and the malfunction can involve the iterative optimization estimation algorithm failing to converge to a solution. Optionally, the UAV can include a state estimation module, as described further herein, and the state estimation module can use an iterative state estimation algorithm. The malfunction can involve the iterative state estimation algorithm failing to converge to a solution.

In step 1020, inertial data is received from at least one inertial sensor carried by the UAV. The inertial data can include one or more measurements indicative of a three-dimensional acceleration and a three-dimensional angular velocity of the UAV. In some embodiments, the inertial data includes one or more measurements obtained by the at least one inertial sensor over a time interval starting from when the error occurred.

In step 1030, image data is received from at least two image sensors carried by the UAV. The image data can include one or more images of an environment around the UAV. In some embodiments, the image data can include one or more images obtained by each of the at least two image sensors over a time interval starting from when the error occurred.

In step 1040, reinitialization information for the UAV is determined based on the inertial data and the image data. The reinitialization information can include a position, a velocity, and/or an orientation of the UAV relative to a gravity direction when the error occurred. In some embodiments, the step 1040 includes processing the image data in accordance with the image processing algorithms described herein. For example, the image data can include one or more images obtained by each of the at least two image sensors over a time interval starting from when the error occurred, and the one or more images can be processed using feature point detection algorithm, an optical flow algorithm, and/or a feature matching algorithm. As discussed herein, images obtained from different image sensors can be compared to each other, e.g., in order to perform feature point matching. For example, one or more images obtained by a first image sensor can be compared to one or more images obtained by a second image sensor. Optionally, the reinitialization information can be determined using only the inertial data and the image data, without requiring any other data such as sensor data from other types of sensors. In some embodiments, the reinitialization information is determined directly from the inertial data and the image data, without requiring any initial estimates or values for the reinitialization information.

In some embodiments, the step 1040 involves generating estimates of the reinitialization information using the inertial data and the image data. For example, the step 1040 can be performed by generating a first estimate of the reinitialization information using the inertial data and generating a second estimate of the reinitialization information using the image data. The first and second estimates can be combined to obtain the reinitialization information for the UAV.

In some embodiments, the reinitialization information is determined using an optimization algorithm, such as a linear optimization algorithm, a nonlinear optimization algorithm, an iterative optimization algorithm, an iterative linear optimization algorithm, or an iterative nonlinear optimization algorithm. An optimization algorithm used for assessing reinitialization information can be substantially similar to the algorithm presented herein for assessing initialization information, except that the relevant time points are in the time interval following the occurrence of an error, rather than the time interval after the UAV starts operating.

The method 1000 can provide various advantages for UAV operation. For example, the method 1000 can be used to determine the orientation of the UAV with respect to a direction of gravity in various situations where an error may occur, such as when the UAV is in mid-air during flight. Accordingly, the method 1000 can involve correcting subsequent inertial data obtained from the inertial sensor using this orientation information. Moreover, the method 1000 can be used to provide automatic reinitialization after the UAV has started operating, even in situations where the initial UAV state (e.g., position, orientation, velocity, etc.) after the error occurs is completely unknown. For example, the method 1000 can involve using the determined reinitialization information to reinitialize an iterative state estimation algorithm implemented by a state estimation module. Advantageously, the reinitialization techniques described herein can be used to detect and respond to errors during UAV operation in real time, thus improving the reliability of UAV operation.

Figure 11:
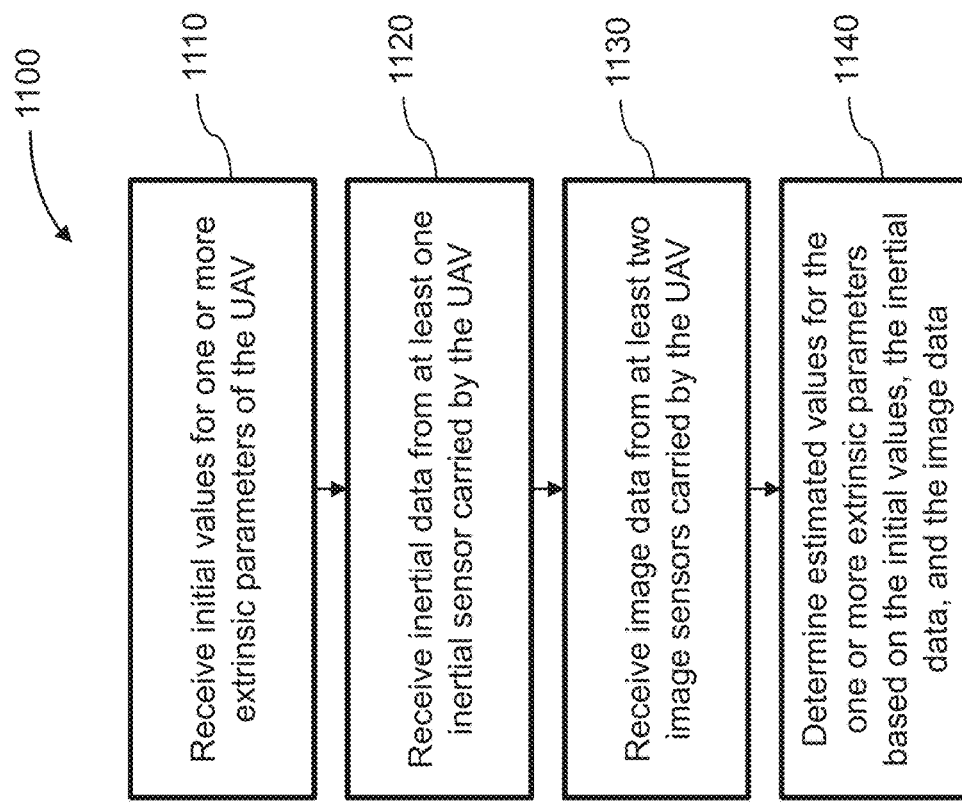
FIG. 11 illustrates a method for calibrating one or more extrinsic parameters of a UAV, in accordance with embodiments.

FIG. 11 illustrates a method 1100 for calibrating one or more extrinsic parameters of a UAV (or any other movable object) using multiple sensors during operation of the UAV, in accordance with embodiments. The steps of the method 1100 can be performed using any embodiment of the systems and devices described herein. For example, some or all of the steps of the method 1100 can be performed using one or more processors carried by a UAV. The method 1100 can be performed in combination with any embodiment of the various methods described herein.

The method 1100 can be used to determine extrinsic parameters for the UAV during operation (e.g., when the UAV is powered on, in flight, etc.), which may be referred to herein as "online" calibration. In some embodiments, online calibration is performed continuously or at predetermined time intervals during UAV operation so as to allow for real-time updating of the extrinsic parameters. For example, the method 1100 can be performed once every 0.1 s during UAV operation.

In step 1110, initial values for the one or more extrinsic parameters are received. In some embodiments, the extrinsic parameters include spatial relationships between at least two image sensors carried by the UAV. For example, the spatial relationships can include the relative positions and relative orientations of the image sensors. The relative positions and relative orientations of the at least two image sensors can determined with respect to each other and/or to the position and orientation of at least one inertial sensor carried by the UAV.

Various methods can be used to obtain the initial values. In some embodiments, the initial values are received from a memory device associated with the UAV (e.g., carried onboard the UAV). The initial values can be determined prior to the operation of the UAV. For instance, the initial values can be determined using the iterative optimization algorithms described herein prior to UAV operation. As another example, the initial values can be measured by a user prior to operation. Optionally, the initial values can be factory calibration values determined when the UAV was manufactured. In some embodiments, the initial values can be determined based on knowledge of the UAV configuration. For example, the image sensors and/or inertial sensors can be coupled to the UAV at certain fixed locations (e.g., a selected set of locations that are available for mounting sensors) and the initial values can be determined based on information regarding the fixed locations.

In some embodiments, the initial values are intended to provide a rough approximation of the actual values of extrinsic parameters and are not intended to be very accurate. Contrary to other calibration methods, the methods provided herein do not require accurate initial values for the extrinsic parameters in order to perform online calibration. For example, the initial values for the extrinsic parameters (e.g., relative positions) can be no more than about 0.1 cm, 0.25 cm, 0.5 cm, 0.75 cm, 1 cm, 1.25 cm, 1.5 cm, 1.75 cm, 2 cm, 2.25 cm, 2.5 cm, 2.75 cm, 3 cm, or 5 cm away from the actual values of the extrinsic parameters. Alternatively, the initial values for the extrinsic parameters (e.g., relative positions) can be at least about 0.1 cm, 0.25 cm, 0.5 cm, 0.75 cm, 1 cm, 1.25 cm, 1.5 cm, 1.75 cm, 2 cm, 2.25 cm, 2.5 cm, 2.75 cm, 3 cm, or 5 cm away from the actual values of the extrinsic parameters. As another example, the initial values for the extrinsic parameters (e.g., relative orientations) can be no more than about 0.1 degrees, 0.25 degrees, 0.5 degrees, 0.75 degrees, 1 degrees, 1.25 degrees, 1.5 degrees, 1.75 degrees, 2 degrees, 2.25 degrees, 2.5 degrees, 2.75 degrees, 3 degrees, or 5 degrees away from the actual values of the extrinsic parameters. Alternatively, the initial values for the extrinsic parameters (e.g., relative positions) can be at least about 0.1 degrees, 0.25 degrees, 0.5 degrees, 0.75 degrees, 1 degrees, 1.25 degrees, 1.5 degrees, 1.75 degrees, 2 degrees, 2.25 degrees, 2.5 degrees, 2.75 degrees, 3 degrees, or 5 degrees away from the actual values of the extrinsic parameters.

In step 1120, inertial data is received from at least one inertial sensor carried by the UAV during operation of the UAV. The inertial data can include one or more measurements indicative of a three-dimensional acceleration and a three-dimensional angular velocity of the UAV. In some embodiments, the inertial data includes one or more measurements obtained by the at least one inertial sensor over at least two, three, four, five, six, seven, eight, nine, 10, 20, 30, 40, or 50 time points.

In step 1130, image data is received from at least two image sensors carried by the UAV during operation of the UAV. The image data can include one or more images of an environment around the movable object. In some embodiments, the image data can include one or more images obtained by each of the at least two image sensors over at least two, three, four, five, six, seven, eight, nine, 10, 20, 30, 40, or 50 time points.

In step 1140, estimated values for the one or more extrinsic parameters are determined based on the initial values, the inertial data, and the image data. The estimated values can be determined during operation of the UAV. Optionally, the inertial data and the image data can be the only sensor data used to determine the estimated values for the extrinsic parameters. The step 1140 can involve processing one or more images obtained by the image sensors using a feature point detection algorithm, optical flow algorithm, and/or feature matching algorithm. Optionally, the step 1140 can involve comparing one or more images obtained by a first sensor to one or more images obtained by a second sensor.

In some embodiments, the estimated values are determined using an optimization algorithm, such as a nonlinear optimization algorithm, a linear optimization algorithm, an iterative optimization algorithm, or an iterative nonlinear optimization algorithm. The iterative optimization algorithm can include calculating a maximum a posteriori probability (MAP) estimate of the one or more extrinsic parameters based on the initial values, the inertial data, and the image data. An exemplary algorithm suitable for use with the embodiments herein is presented below.

A UAV can have a sensing system including m cameras (or other image sensor type) and one IMU (or other inertial sensor type). The extrinsic parameters of the cameras can be $R_{ci}^b$ and $T_{ci}^b$, with $1 \leq i \leq m$, similar to the notation previously described herein. Similar to the other optimization algorithms provided herein, an optimization objective function can be established which includes an integral estimate from the IMU and the response from the cameras.

It can be assumed that a UAV state over a time period from $t_0$ to $t_N$ ([$t_0, t_1, t_2, t_3, t_4, t_5, \ldots, t_N$]) is $x_0^0, x_1^0, x_2^0, x_k^0, \ldots, x_N^0$, where $x_k^0 = [p_k^0, v_k^K, q_k^0]$, $k=0, 1, 2, \ldots, N$, $p_k^0$ represents a current position of the UAV (with respect to the position at $t_0$, the time point when operation started), $v_k^k$ represents a current velocity of the UAV (with respect to the body coordinate system of the UAV) at time k, and $q_k^0$, represents a current orientation of the UAV (with respect to the orientation at $t_0$) at time k. The initial condition can be $p_0^0 = [0, 0, 0]$ and $q_0^0 = [0, 0, 0, 1]$. It can be assumed that the $i^{th}$ feature point is initially observed by the $j^{th}$ camera at a time $t_k$ ($0 \leq k \leq N$), and $\lambda_i$ is the depth of the feature point in a direction perpendicular to the a plane of the $j^{th}$ camera at time $t_k$. The camera parameters to be estimated are $R_{ci}^b, T_{ci}^b$, where $R_{ci}^b$ represents the rotation of the $i^{th}$ camera relative to the IMU, $T_{ci}^b$ represents the translation of the $i^{th}$ camera relative to the IMU, and $1 \leq i \leq m$. The unknowns to be estimated are UAV states $x_0^0, x_1^0, x_2^0, x_k^0, \ldots, x_N^0$, extrinsic calibration parameters $R_{c1}^b, T_{c1}^b, \ldots, R_{cm}^b, T_{cm}^b$, and feature depth $\lambda_0, \lambda_1, \lambda_2, \lambda_3, \ldots, \lambda_M$. All those unknowns form a vector X, referred to herein as the total state.

In some embodiments, the objective equation is defined as:

$$\min_X \left\{ \| b_p - \Lambda_p X \| + \sum_{k=1,\ldots,N} \| r_D(z_{k+1}^k, X) \|^2_{P_{k+1}^k} + \sum_{(i,j,ci,cj) \in C} \| r_C(c^j z_i^j, X) \|^2_{P_i^{ij}} \right\}$$

where $r_D(z_{k+1}{}^k, X)$ relates the total state X to an integral estimate from the IMU $z_{k+1}{}^k$, and $r_C({}^{cm}z_l^j, X)$ relates the total state X to an estimate from the image sensors ${}^{cm}z_l^j$. $\|b_p - \Lambda_p X\|$ encodes the prior information for X. Since $r_D(z_{k+1}{}^k, X)$ and $r_C({}^{cj}z_l^j, X)$ are non-linear with respect to X and thus may be difficult to solve, the algorithm can operate on the error state representation $\delta X$ and the functions can be linearized through a first order Taylor expansion:

$$r_D(z_{k+1}{}^k, X) = r_D(z_{k+1}{}^k, \hat{X}) + H_{k+1}{}^k \delta X$$

$$r_C({}^{cm}z_l^j, X) = r_C({}^{cm}z_l^j, \hat{X}) + H_l^j \delta X$$

$\hat{X}$ is the estimated value of total state X within some error terms $\delta X$. Notice that $R_{ci}{}^b$ in the error state representation $\delta X$ may not be $\delta R_{ci}{}^b$, but $\delta \theta_{ci}{}^b$ (a minimal representation).

Considering actual physical models of UAV dynamics and the principles of camera geometry, the residuals $r_D(z_{k+1}{}^k, X)$ and $r_C({}^{cj}z_l^j, X)$ can be defined as:

$$r_D(z_{k+1}^k, X) = \begin{bmatrix} R_0^k(p_{k+1}^0 - p_k^0 + g^0 \Delta t^2/2) - v_k^k \Delta t - \hat{\alpha}_{k+1}^k \\ R_0^k(R_{k+1}^0 v_{k+1}^{k+1} + g^0 \Delta t) - v_k^k - \beta_{k+1}^k \\ 2\left[\hat{q}_{k+1}^{k-1} \otimes q_{k+1}^{k-1} \otimes q_{k+1}^0\right]_{xyz} \end{bmatrix}$$

$$r_C({}^{cj}z_l^j, X) = \begin{bmatrix} \dfrac{f_{x_l^j}}{f_{z_l^j}} - \hat{u}_l^j \\ \dfrac{f_{y_l^j}}{f_{z_l^j}} - \hat{v}_l^j \end{bmatrix}$$

where $f_{x_l^j}$, $f_{y_l^j}$, $f_{z_l^j}$ are the three elements of $f_l^j$, which is the coordinate of feature l in frame j estimated through pose information. Other notations in the equations are defined above.

$H_{k+1}{}^k$ and $H_l^j$ are the derivatives of $r_D(z_{k+1}{}^k, X)$ and $r_C({}^{cj}z_l^j, X)$ with respect to $\delta X$, and have two cases, as discussed below.

In one case, suppose a feature l is firstly observed in time i by camera ci, and then is observed by camera cj in the same time:

$${}^{cj}f_l^j = \begin{bmatrix} x_l^j \\ y_l^j \\ z_l^j \end{bmatrix} = (R_{cj}^b)^T (R_{ci}^b \lambda_l u_l^i + T_{ci}^b) - (R_{cj}^b)^T T_{cj}^b$$

where $u_l^i$ is the normalised coordinate. The following equations can be obtained:

$$H_l^j = \frac{\partial r_c}{\partial f_l^j} \frac{\partial f_l^j}{\partial \delta X} = \frac{\partial r_c}{\partial f_l^j} \left[ \frac{\partial f_l^j}{\partial \delta \theta_{cj}^b} \frac{\partial f_l^j}{\partial \delta T_{cj}^b} \frac{\partial f_l^j}{\partial \delta \theta_{ci}^b} \frac{\partial f_l^j}{\partial \delta T_{ci}^b} \frac{\partial f_l^j}{\partial \delta \lambda_l} \frac{\partial f_l^j}{\partial \delta x_i} \frac{\partial f_l^j}{\partial \delta x_j} \right] \quad (10)$$

$$\frac{\partial r_c}{\partial f_l^j} = \begin{bmatrix} \dfrac{1}{z_l^j} & 0 & -\dfrac{x_l^j}{(z_l^j)^2} \\ 0 & \dfrac{1}{z_l^j} & -\dfrac{y_l^j}{(z_l^j)^2} \end{bmatrix}$$

$$\frac{\partial f_l^j}{\partial \delta \theta_{cj}^b} = \left\lfloor (R_{cj}^b)^T [\lambda_l R_{ci}^b u_l^i + T_{ci}^b - T_{cj}^b] \times \right\rfloor$$

-continued $$\frac{\partial f_l^j}{\partial \delta T_{cj}^b} = -(R_{cj}^b)^T$$

$$\frac{\partial f_l^j}{\partial \delta \theta_{ci}^b} = -\lambda_l (R_{cj}^b)^T R_{ci}^b \lfloor u_l^i \times \rfloor$$

$$\frac{\partial f_l^j}{\partial \delta T_{ci}^b} = (R_{cj}^b)^T$$

$$\frac{\partial f_l^j}{\partial \delta \lambda_l} = (R_{cj}^b)^T R_{ci}^b u_l^i$$

$$\frac{\partial f_l^j}{\partial \delta x_i} = [0 \ 0 \ 0]$$

$$\frac{\partial f_l^j}{\partial \delta x_j} = [0 \ 0 \ 0]$$

In another case, suppose a feature l is firstly observed in time i by camera ci, and then is observed in the following time j by camera cj:

$${}^{cj}f_l^j = \begin{bmatrix} x_l^j \\ y_l^j \\ z_l^j \end{bmatrix} = (R_{cj}^b)^T (R_0^j [p_i^0 - p_j^0 + R_i^0 (R_{ci}^b \lambda_l u_l^i + T_{ci}^b)]) - (R_{cj}^b)^T T_{cj}^b =$$

$$(R_{cj}^b)^T R_0^j (p_i^0 - p_j^0) + \lambda_l (R_{cj}^b)^T R_0^j R_i^0 R_{ci}^b u_l^i + (R_{cj}^b)^T R_0^j R_i^0 T_{ci}^b - (R_{cj}^b)^T T_{cj}^b$$

If ci=cj, the following equations can be obtained:

$$H_l^j = \frac{\partial r_c}{\partial f_l^j} \frac{\partial f_l^j}{\partial \delta X} = \frac{\partial r_c}{\partial f_l^j} \left[ \frac{\partial f_l^j}{\partial \delta \theta_{cj}^b} \frac{\partial f_l^j}{\partial \delta T_{cj}^b} \frac{\partial f_l^j}{\partial \delta \lambda_l} \frac{\partial f_l^j}{\partial \delta x_i} \frac{\partial f_l^j}{\partial \delta x_j} \right]$$

$$\frac{\partial r_c}{\partial f_l^j} = \begin{bmatrix} \dfrac{1}{z_l^j} & 0 & -\dfrac{x_l^j}{(z_l^j)^2} \\ 0 & \dfrac{1}{z_l^j} & -\dfrac{y_l^j}{(z_l^j)^2} \end{bmatrix}$$

$$\frac{\partial f_l^j}{\partial \delta \theta_{cj}^b} = \left\lfloor \left(R_{cj}^b\right)^T [R_0^j (p_i^0 - p_j^0) + R_0^j R_i^0 T_{ci}^b - T_{cj}^b] \times \right\rfloor - $$

$$\lambda_l \left(R_{cj}^b\right)^T R_0^j R_i^0 R_{cj}^b \lfloor u_l^i \times \rfloor + \lambda_l \left\lfloor \left(R_{cj}^b\right)^T R_0^j R_i^0 R_{cj}^b u_l^i \times \right\rfloor$$

$$\frac{\partial f_l^j}{\partial \delta T_{cj}^b} = (R_{cj}^b)^T R_0^j R_i^0 - (R_{cj}^b)^T$$

$$\frac{\partial f_l^j}{\partial \delta \lambda_l} = (R_{cj}^b)^T R_0^j R_i^0 R_{ci}^b u_l^i$$

$$\frac{\partial f_l^j}{\partial \delta x_i} = \left[(R_{cj}^b)^T R_0^j 0 - (R_{cj}^b)^T R_0^j \hat{R}_i^0 \lfloor \lambda_l R_{cj}^b u_l^i + T_{ch}^b \times \rfloor\right]$$

$$\frac{\partial f_l^j}{\partial \delta x_j} = \left[-(R_{cj}^b)^T R_0^j 0 (R_{cj}^b)^T \lfloor \hat{R}_0^j [p_i^0 - p_j^0 + R_i^0 (R_{cj}^b \lambda_l u_l^i + T_{cj}^b)] \times \rfloor\right]$$

If ci≠cj, the following equations can be obtained:

$$H_l^j = \frac{\partial r_c}{\partial f_l^j} \frac{\partial f_l^j}{\partial \delta X} = \frac{\partial r_c}{\partial f_l^j} \left[ \frac{\partial f_l^j}{\partial \delta \theta_{cj}^b} \frac{\partial f_l^j}{\partial \delta T_{cj}^b} \frac{\partial f_l^j}{\partial \delta \theta_{ci}^b} \frac{\partial f_l^j}{\partial \delta T_{ci}^b} \frac{\partial f_l^j}{\partial \delta \lambda_l} \frac{\partial f_l^j}{\partial \delta x_i} \frac{\partial f_l^j}{\partial \delta x_j} \right]$$

-continued $$\frac{\partial r_c}{\partial f_i^j} = \begin{bmatrix} \frac{1}{z_i^j} & 0 & -\frac{x_i^j}{(z_i^j)^2} \\ 0 & \frac{1}{z_i^j} & -\frac{y_i^j}{(z_i^j)^2} \end{bmatrix}$$

$$\frac{\partial f_i^j}{\partial \delta \theta_{cj}^b} = \left\lfloor \left(R_{cj}^b\right)^T [R_0^j(p_i^0 - p_j^0) + \lambda_i R_0^j R_i^0 P_{ci}^b u_i^l + R_0^j R_i^0 T_{ci}^b - T_{cj}^b] \times \right\rfloor$$

$$\frac{\partial f_i^j}{\partial \delta T_{cj}^b} = -(R_{cj}^b)^T$$

$$\frac{\partial f_i^j}{\partial \delta \theta_{ci}^b} = -\lambda_i (R_{cj}^b)^T R_0^j R_i^0 R_{ci}^b \lfloor u_i^l \times \rfloor$$

$$\frac{\partial f_i^j}{\partial \delta T_{ci}^b} = (R_{cj}^b)^T R_0^j R_i^0$$

$$\frac{\partial f_i^j}{\partial \delta \lambda_l} = (R_{cj}^b)^T R_0^j R_i^0 R_{ci}^b u_i^l$$

$$\frac{\partial f_i^j}{\partial \delta x_i} = \left[ (R_{cj}^b)^T R_0^j 0 - (R_{cj}^b)^T R_0^j \hat{R}_i^0 \lfloor \lambda_l R_{ci}^b u_i^l + T_{ci}^b \times \rfloor \right]$$

$$\frac{\partial f_i^j}{\partial \delta x_j} = \left[ -(R_{cj}^b)^T R_0^j 0 (R_{cj}^b)^T \lfloor \hat{R}_0^j [p_i^0 - p_j^0 + R_i^0 (R_{ci}^b \lambda_l u_i^l + T_{ci}^b)] \times \rfloor \right]$$

The following equation can be obtained by substituting the above equations into the objective equation:

$$\min_{\delta X} \left\{ \| b_p - \Lambda_p \hat{X} \| + \sum_{k=0,\ldots,N-1} \| r_D(z_{k+1}^k, \hat{X}) + H_{k+1}^k \delta X \|_{P_{k+1}^k}^2 + \sum_{(i,j,cn,cm) \in C} \| r_C(c_j z_i^j, \hat{X}) + H_i^j \delta X \|_{P_i^{ij}}^2 \right\}$$

In some embodiments, an initial value can be provided, and the objective equation can be iteratively solved. The initial value can be obtained by using an initialization or reinitialization algorithm as described herein, adding an integral estimate from the IMU to the optimized estimate from the last time point, or by initializing as $\hat{X}=0$. The objective equation can be iteratively solved to obtain $\delta X$, and then update $\hat{X}$ according to $\hat{X} = \hat{X} \oplus \delta X$ until $\delta X \approx 0$. Finally, after convergence, $\hat{X}$ is the UAV state output by the system.

In some embodiments, if $\delta X$ does not approach zero over multiple iterations, such that the parameter calibration algorithm fails to converge to a solution, this can be considered to be an error in the system, and reinitialization can be performed to recover from the error as described herein The extrinsic parameters after factory calibration and/or an optimal estimate of the parameters from the last time point can be input into the objective equation as part of the UAV state, then the equation can be iteratively solved and updated in order to correct any errors in estimating the extrinsic parameters and minimize the objective equation. The system can detect an error in the extrinsic parameters (solve $\delta X$) in real time, and correct the error (update $\hat{X} = \hat{X} \oplus \delta X$).

Optionally, following the step 1140, a state of the UAV (e.g., position, orientation, and/or velocity) can be determined based on the estimated values for the extrinsic parameters. For example, the extrinsic parameters can be used to fuse sensor data from the image sensors and inertial sensors in order to calculate state information. In some embodiments, the state information is determined relative to a previous UAV state at a previous time point during UAV operation. The previous time point can be the first time point for which state information is available, e.g., a time point when the UAV started operating, when initialization occurred, or when re-initialization occurred. Alternatively, the state information can be determined relative to a global coordinate system rather than relative to a previous UAV state.

Figure 12:
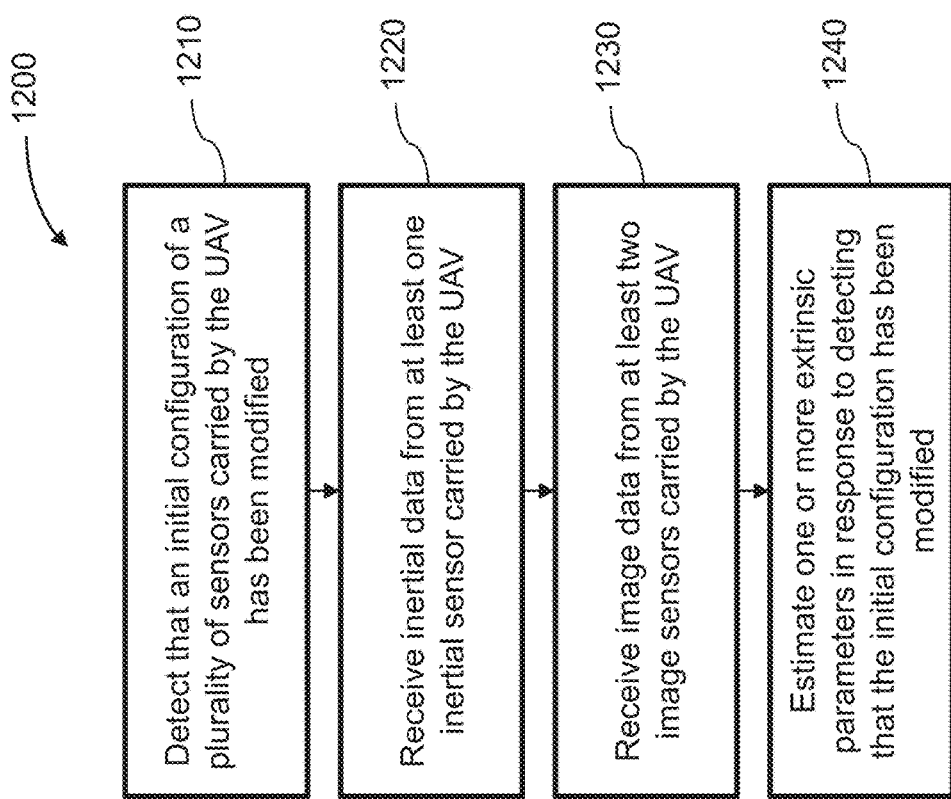
FIG. 12 illustrates a method for calibrating one or more extrinsic parameters of a UAV having a plurality of sensors in an initial configuration, in accordance with embodiments.

FIG. 12 illustrates a method 1200 for calibrating one or more extrinsic parameters of a UAV (or any other movable object) having a plurality of sensors in an initial configuration, in accordance with embodiments. The steps of the method 1200 can be performed using any embodiment of the systems and devices described herein. For example, some or all of the steps of the method 1200 can be performed using one or more processors carried by a UAV. The method 1200 can be performed in combination with any embodiment of the various methods described herein. Similar to the method 1100, the method 1200 can be used to perform online calibration during UAV operation.

In step 1210, it is detected that an initial configuration of a plurality of sensors carried by the UAV has been modified. The plurality of sensors can include at least one inertial sensor and at least two images sensors. The initial configuration can have been modified by removing at least one sensor of the plurality, adding at least one sensor to the plurality, changing a position and/or orientation of a sensor of the plurality, or combinations thereof. In some embodiments, the initial configuration is modified prior to the operation of the UAV (e.g., before the UAV is in flight and/or has been powered on), and the modification is detected during UAV operation. In other embodiments, the configuration is modified during operation of the UAV. Various methods can be used to detect the modification. For example, the modification can be detected if the $\delta \theta$ and $\delta T$ values within $\delta X$ in the iteration processes discussed herein are not close to zero, meaning that additional updates should be performed.

In step 1220, inertial data is received from at least one inertial sensor carried by the UAV during operation of the UAV. The inertial data can include one or more measurements indicative of a three-dimensional acceleration and a three-dimensional angular velocity of the UAV. In some embodiments, the inertial data includes one or more measurements obtained by the at least one inertial sensor over at least two, three, four, five, six, seven, eight, nine, 10, 20, 30, 40, or 50 time points.

In step 1230, image data is received from at least two image sensors carried by the UAV during operation of the UAV. The image data can include one or more images of an environment around the movable object. In some embodiments, the image data can include one or more images obtained by each of the at least two image sensors over at least two, three, four, five, six, seven, eight, nine, 10, 20, 30, 40, or 50 time points.

In step 1240, one or more extrinsic parameters are estimated in response to detecting that the initial configuration has been modified. The one or more extrinsic parameters can include spatial relationships between the plurality of sensors in the modified configuration. In some embodiments, the spatial relationships include relative positions and relative orientations of the image sensors, which can be determined with respect to each other and/or with respect to the inertial sensor. The extrinsic parameters can be estimated in various ways. In some embodiments, the one or more extrinsic parameters are estimated based on the inertial data and the image data received in steps 1220 and 1230. Optionally, the inertial data and the image data can be the only sensor data used to determine the estimated values for the extrinsic parameters. The step 1240 can involve processing one or more images obtained by the image sensors using a feature point detection algorithm, optical flow algorithm, and/or feature matching algorithm. Optionally, the step 1240 can involve comparing one or more images obtained by a first sensor to one or more images obtained by a second sensor.

In some embodiments, the extrinsic parameters are estimated based on initial values for the one or more extrinsic parameters. Various methods can be used to obtain the initial values. In some embodiments, the initial values are received from a memory device associated with the UAV (e.g., carried onboard the UAV). The initial values can be determined prior to the operation of the UAV. For instance, the initial values can be determined using the iterative optimization algorithms described herein prior to UAV operation. As another example, the initial values can be measured by a user prior to operation. Optionally, the initial values can be factory calibration values determined when the UAV was manufactured. In some embodiments, the initial values can be determined based on knowledge of the UAV configuration. For example, the image sensors and/or inertial sensors can be coupled to the UAV at certain fixed locations (e.g., a selected set of locations that are available for mounting sensors) and the initial values can be determined based on information regarding the fixed locations.

In some embodiments, the extrinsic parameters are estimated using an optimization algorithm, such as a nonlinear optimization algorithm, a linear optimization algorithm, an iterative optimization algorithm, an iterative nonlinear optimization algorithm, or an iterative linear optimization algorithm. The iterative optimization algorithm can include calculating a maximum a posteriori probability (MAP) estimate of the one or more extrinsic parameters based on the initial values, the inertial data, and the image data. The iterative optimization algorithm can be similar to the algorithms previously described herein with respect to the method 1100.

Optionally, following the step 1240, a state of the UAV (e.g., position, orientation, and/or velocity) can be determined based on the estimated extrinsic parameters. For example, the extrinsic parameters can be used to fuse sensor data from the image sensors and inertial sensors in order to calculate state information. In some embodiments, the state information is determined relative to a previous UAV state at a previous time point during UAV operation. The previous time point can be the first time point for which state information is available, e.g., a time point when the UAV started operating, when initialization occurred, or when re-initialization occurred. Alternatively, the state information can be determined relative to a global coordinate system rather than relative to a previous UAV state.

The automatic parameter calibration methods described herein (e.g., the methods 1100, 1200) can be beneficial in terms of ensuring accuracy and reliability of UAV sensor data processing, as the extrinsic parameters can change during UAV operation, e.g., due to vibrations, collisions, or other events that may alter the spatial relationships of the sensors relative to each other. For example, the methods described herein can be used to continuously estimate the spatial relationships (e.g., relative positions and orientations) between the image sensors and the inertial sensor during UAV operation, as well as detect and correct errors in the estimated values of the spatial relationships during operation. Additionally, the implementation of online calibration described herein can also advantageously obviate the need for accurate calibration of the UAV prior to operation, which may be referred to herein as "offline" calibration. This can allow for "plug-and-play" approach in which the sensor configuration of the UAV can be modified (e.g., by adding one or more sensors, removing one or more sensors, moving one or more sensors), and the UAV can be operated immediately after the modification without requiring a lengthy offline calibration procedure to determine the new extrinsic parameters for the sensor configuration. In some embodiments, the parameter calibration methods provided herein enable the extrinsic parameters to be determined during UAV operation without performing any parameter calibration prior to UAV operation.

Figure 13:
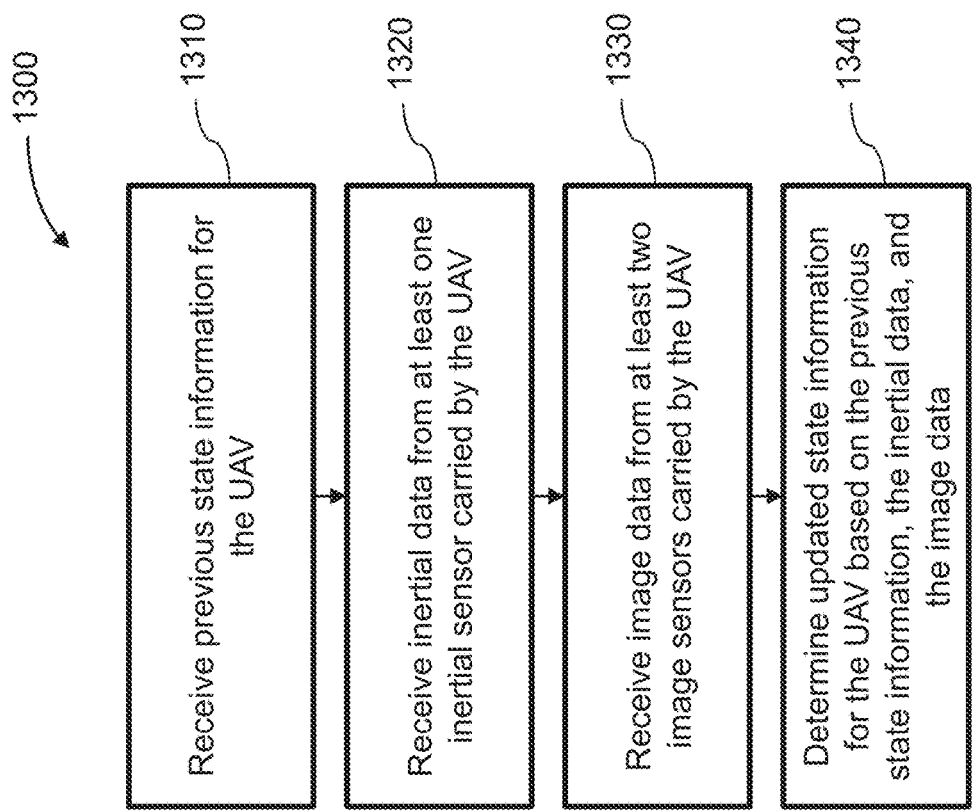
FIG. 13 illustrates a method for estimating state information for a UAV using multiple sensors during operation of the UAV, in accordance with embodiments.

FIG. 13 illustrates a method 1300 for estimating state information for a UAV (or any other movable object) using multiple sensors during operation of the UAV, in accordance with embodiments. The steps of the method 1300 can be performed using any embodiment of the systems and devices described herein. For example, some or all of the steps of the method 1300 can be performed using one or more processors carried by a UAV. The method 1300 can be performed in combination with any embodiment of the various methods described herein.

The method 1300 can be used to estimate a current state of the UAV during operation (e.g., when the UAV is powered on, in flight, etc). State estimation can involve determining various types of state information, such as the position, orientation, velocity, and/or acceleration of the UAV. The state information can be determined relative to a previous state of the UAV at an earlier time point, or can be determined in absolute terms (e.g., with respect to a global coordinate system). In some embodiments, state estimation is performed continuously or at predetermined time intervals during UAV operation so as to allow for real-time updating of the extrinsic parameters. For example, the method 1300 can be performed once every 0.1 s during UAV operation.

In step 1310, previous state information for the UAV is received. The previous state information can include a position, an orientation, a velocity, and/or an acceleration of the UAV at a previous time point during UAV operation. In some embodiments, the previous state information is obtained using an iterative optimization algorithm, e.g., the same algorithm used in step 1340 of the method 1300. State information from one or more previous time points can be stored on a memory device associated with the UAV in order to facilitate estimation of updated state information for subsequent time points.

In step 1320, inertial data from at least one inertial sensor carried by the UAV is received. The inertial data can include inertial measurement data obtained by the inertial sensor over at least two, three, four, five, six, seven, eight, nine, 10, 20, 30, 40, or 50 time points during operation of the UAV. The inertial data can be indicative of a three-dimensional acceleration and a three-dimensional angular velocity of the UAV.

In step 1330, image data from at least two image sensors carried by the UAV is received. The image data can include images obtained by each image sensor over at least two, three, four, five, six, seven, eight, nine, 10, 20, 30, 40, or 50 time points during operation of the UAV. The images can be of an environment around the UAV.

In step 1340, updated state information for the UAV is determined based on the previous state information, the inertial data, and/or the image data during operation of the UAV. The updated state information can include the position, orientation, velocity, and/or acceleration of the UAV. The updated state information can be current state information for the UAV at a current time point. Optionally, the inertial data and the image data can be the only sensor data used to determine the updated state information. The step 1340 can involve processing the images obtained by each image sensor using a feature point detection algorithm, optical flow algorithm, and/or feature matching algorithm. Optionally, the step 1340 can involve comparing one or more images obtained by a first sensor to one or more images obtained by a second sensor.

In some embodiments, the estimated values are determined using an optimization algorithm, such as a nonlinear optimization algorithm, a linear optimization algorithm, an iterative optimization algorithm, an iterative nonlinear optimization algorithm, or an iterative linear optimization algorithm. The iterative optimization algorithm can include calculating a maximum a posteriori probability (MAP) estimate of the one or more extrinsic parameters based on the initial values, the inertial data, and the image data. An exemplary algorithm suitable for use with the embodiments herein is presented below.

A UAV can have a sensing system including m cameras (or other image sensor type) and one IMU (or other inertial sensor type). The output frequency of the IMU can be higher than the output frequency of the cameras. The extrinsic parameters of the cameras can be $\theta_{ci}^b$ and $T_{ci}^b$, with $1 \leq i \leq m$. Similar to the other optimization algorithms provided herein, an optimization objective function can be established which includes an integral estimate from the IMU and the response from the cameras.

A UAV can have a sensing system including m cameras (or other image sensor type) and one IMU (or other inertial sensor type). The output frequency of the IMU can be higher than the output frequency of the cameras. The extrinsic parameters of the cameras can be $R_{ci}^b$ and $T_{ci}^b$, where $R_{ci}^b$ represents the rotation of the $i^{th}$ camera relative to the IMU, $T_{ci}^b$ represents the translation of the $i^{th}$ camera relative to the IMU, and $1 \leq i \leq m$. Similar to the other optimization algorithms provided herein, an optimization objective function can be established which includes an integral estimate from the IMU and the response from the cameras.

It can be assumed that a UAV state over a time period from $t_0$ to $t_N ([t_0, t_1, t_2, t_3, t_4, t_5, \ldots, t_N])$ is $x_0^0, x_1^0, x_2^0, x_k^0, \ldots, x_N^0$, where $x_k^0 = [p_k^0, v_k^K, q_k^0]$, $k = 0, 1, 2, \ldots, N$, $p_k^0$ represents a current position of the UAV (with respect to the position at $t_0$, the time point when operation started), $v_k^k$ represents a current velocity of the UAV (with respect to the body coordinate system of the UAV) at time k, and $q_k^0$, represents a current orientation of the UAV (with respect to the orientation at $t_0$)) at time k. The initial condition can be $p_0^0 = [0, 0, 0]$ and $q_0^0 = [0, 0, 0, 1]$. The number of feature points observed in (N+1)×m images can be M. It can be assumed that the $i^{th}$ feature point is initially observed by the $j^{th}$ camera at a time $t_k (0 \leq k \leq N)$, and $\lambda_i$ is the depth of the feature point in a direction perpendicular to the a plane of the $j^{th}$ camera at time $t_k$. The unknowns to be estimated are UAV states $x_0^0, x_1^0, x_2^0, x_k^0, \ldots, x_N^0$, extrinsic calibration parameters $R_{c1}^b, T_{c1}^b, \ldots, R_{cm}^b, T_{cm}^b$, and feature depth $\lambda_0, \lambda_1, \lambda_2, \lambda_3, \ldots, \lambda_M$. All those unknowns form a vector X, referred to herein as the total state.

In some embodiments, the objective equation is defined as:

$$\min_X \left\{ \|b_p - \Lambda_p X\| + \sum_{k=0,\ldots,N-1} \|r_D(z_{k+1}^k, X)\|_{P_{k+1}^k}^2 + \sum_{(i,j,cn,cm) \in C} \|r_C(^{cm}z_i^j, X)\|_{P_i^{ji}}^2 \right\}$$

where $\|b_p - \Lambda_p X\|$ stores prior information (representing an estimate for X), $r_D(z_{k+1}^k, X)$ is the relation between the total state X and integral estimate from the IMU $z_{k+1}^k$, and $r_D(^{cm}z_i^j, X)$ is the relation between the total state X and estimate from the image sensors $^{cm}z_i^j$. The equations $r_D(z_{k+1}^k, X)$ and $r_C(^{cm}z_i^j, X)$ can be derived as discussed herein. Since $r_D(z_{k+1}^k, X)$ and $r_D(^{cm}z_i^j, X)$ are non-linear, they can be expanded with a first order Taylor expansion to obtain $$r_D(z_{k+1}^k, X) = r_D(z_{k+1}^k, \hat{X}) + H_{k+1}^k \delta X$$

$$r_C(^{cm}z_i^j, X) = r_C(^{cm}z_i^j, \hat{X}) + H_i^j \delta X$$

The following equation can be obtained by substituting the above two equations into the objective equation:

$$\min_{\delta X} \left\{ \|b_p - \Lambda_p \hat{X}\| + \sum_{k=0,\ldots,N-1} \|r_D(z_{k+1}^k, \hat{X}) + H_{k+1}^k \delta X\|_{P_{k+1}^k}^2 + \sum_{(i,j,cn,cm) \in C} \|r_C(^{cm}z_i^j, \hat{X}) + H_i^j \delta X\|_{P_i^{ji}}^2 \right\}$$

In some embodiments, an initial value can be provided, and the objective equation can be iteratively solved using the Gauss-Newton algorithm. The initial value can be obtained by using an initialization or reinitialization algorithm as described herein, adding an integral estimate from the IMU to the optimized estimate from the last time point, or by initializing as $\hat{X} = 0$. The objective equation can then be iteratively solved to obtain $\delta X$, and then update $\hat{X}$ according to $$\hat{X} = \hat{X} \oplus \delta X$$

until $\delta X \approx 0$ to minimize the objective equation. Thus, $\hat{X}$ is the UAV state output by the system.

In some embodiments, if $\delta X$ does not approach zero over multiple iterations, such that the state estimation algorithm fails to converge to a solution, this can be considered to be an error in the system, and reinitialization can be performed to recover from the error as described herein.

In some embodiments, sensor data from one or more previous time points can be used to estimate the current state information. For example, previous inertial data and/or image data from at least one, two, three, four, five, six, seven, eight, nine, 10, 20, 30, 40, or 50 previous time points can be used to estimate the current state information. Various methods can be used to determine the amount of previous state information to be used to estimate a current state of the UAV, such as a sliding window filter.

Figure 14:
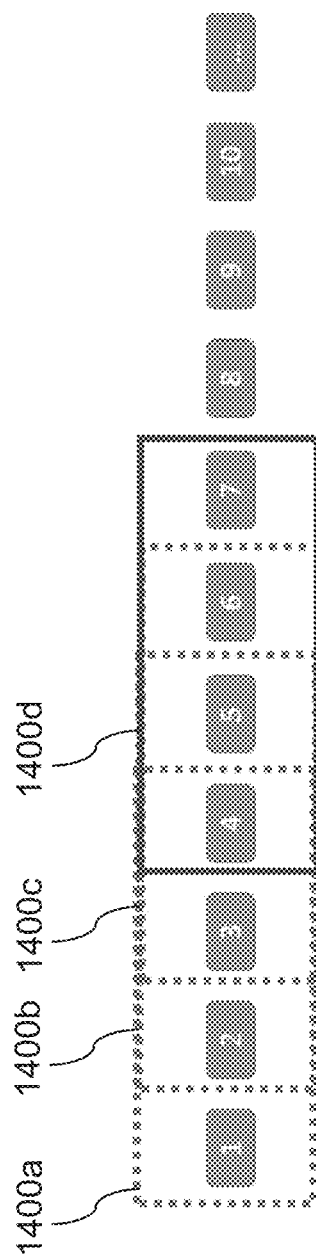
FIG. 14 illustrates a sliding window filter for selecting previous state information, in accordance with embodiments.

FIG. 14 illustrates a sliding window filter for selecting previous state information, in accordance with embodiments. The size of the sliding window can be K, such that sensor data (e.g., inertial data and/or image data) from K time points is used to estimate a current state. Although K=4 of FIG. 14, it shall be understood that K can be any suitable value, such as 20. The K time points can include K−1 previous time points and the current time point. When new sensor data is obtained at a subsequent time point, the new data can be added to the sliding window, and data from a previous time point can be removed from the sliding window in order to maintain a constant window size K. For example, in the depiction of FIG. 14, the first sliding window 1400a contains data from time points 1-4, the second sliding window 1400a contains data from time points 2-5, the third sliding window 1400c contains data from time points 3-6, and the fourth sliding window 1400d contains data from time points 4-7. In some embodiments, the discarded time point is the earliest time point in the sliding window (e.g., first in first out (FIFO)). In other embodiments, the discarded time point may not be the earliest time point, and other marginalization approaches besides FIFO can be used to determine which time points to keep and which to discard, such as first in last out (FILO), or a mixture between FIFO and FILO. In some embodiments, time points are discarded based on checking the parallax between a specified time point and its neighboring time points. If the parallax is not large enough for a stable arithmetic solution, the time point can be marginalized and dropped, e.g., using a Schur complement marginalization method.

In some embodiments, $b_p$ and $\Lambda_p$ can store information from previous time points used to estimate the current state. For example, $b_p$ and $\Lambda_p$ can store sensor data (e.g., inertial data and/or image data) at previous time points from when the UAV started operating (or was reinitialized from an error) up to the current time point. Optionally, $b_p$ and $\Lambda_p$ can exclude data from the K time points already included in the sliding window described herein. In such embodiments, when data is discarded from the sliding window, it can be used to update $b_p$ and $\Lambda_p$.

In some embodiments, the algorithm can be used to detect an error in the input sensor data in real-time. For example, an error can occur if one of the image sensors malfunctions or is obstructed. As another example, an error can occur if excessive noise is present in the image data obtained by an image sensor. Error detection can be performed when solving $\delta X$ and updating $\hat{X}=\hat{X}+\delta X$, by detecting whether the $\delta X$ corresponding to the image data and/or inertial data is convergent (e.g., whether $\delta X$ is becoming smaller and/or approaching zero over multiple iterations. If the $\delta X$ is convergent, then the sensor data can be considered to be error free. However, if the $\delta X$ is not convergent, then the sensor data can be considered to be erroneous, and the sensor data causing the convergence issues can be removed from the optimization process.

Optionally, following the step 1340, the updated state information can be output, e.g., to a control module for controlling movement of the UAV. For example, the control module can use the updated state information to control one or more propulsion units of the UAV, e.g., to effect autonomous or semi-autonomous navigation, obstacle avoidance, route planning, environmental mapping, and the like.

The method 1300 can provide several advantages for UAV operation. For example, the state estimation methods described herein can be more accurate than other types of state estimation methods while conserving computing resources. The estimated state information can be more accurate than state information estimated using inertial data only or image data only. In some embodiments, the estimated values for the state information (e.g., position information) is no more than about 0.1 cm, 0.25 cm, 0.5 cm, 0.75 cm, 1 cm, 1.25 cm, 1.5 cm, 1.75 cm, 2 cm, 2.25 cm, 2.5 cm, 2.75 cm, 3 cm, or 5 cm away from the actual values of the state information. The accuracy can be further enhanced by using more image sensors. Additionally, the embodiments herein are suitable for use with multiple image sensors, thus allowing for the system to continue operation even if one or more of the image sensors malfunction or are obstructed. In some embodiments, the state estimation method reduces noise and thus improves the robustness and stability of the UAV system.

Figure 15:
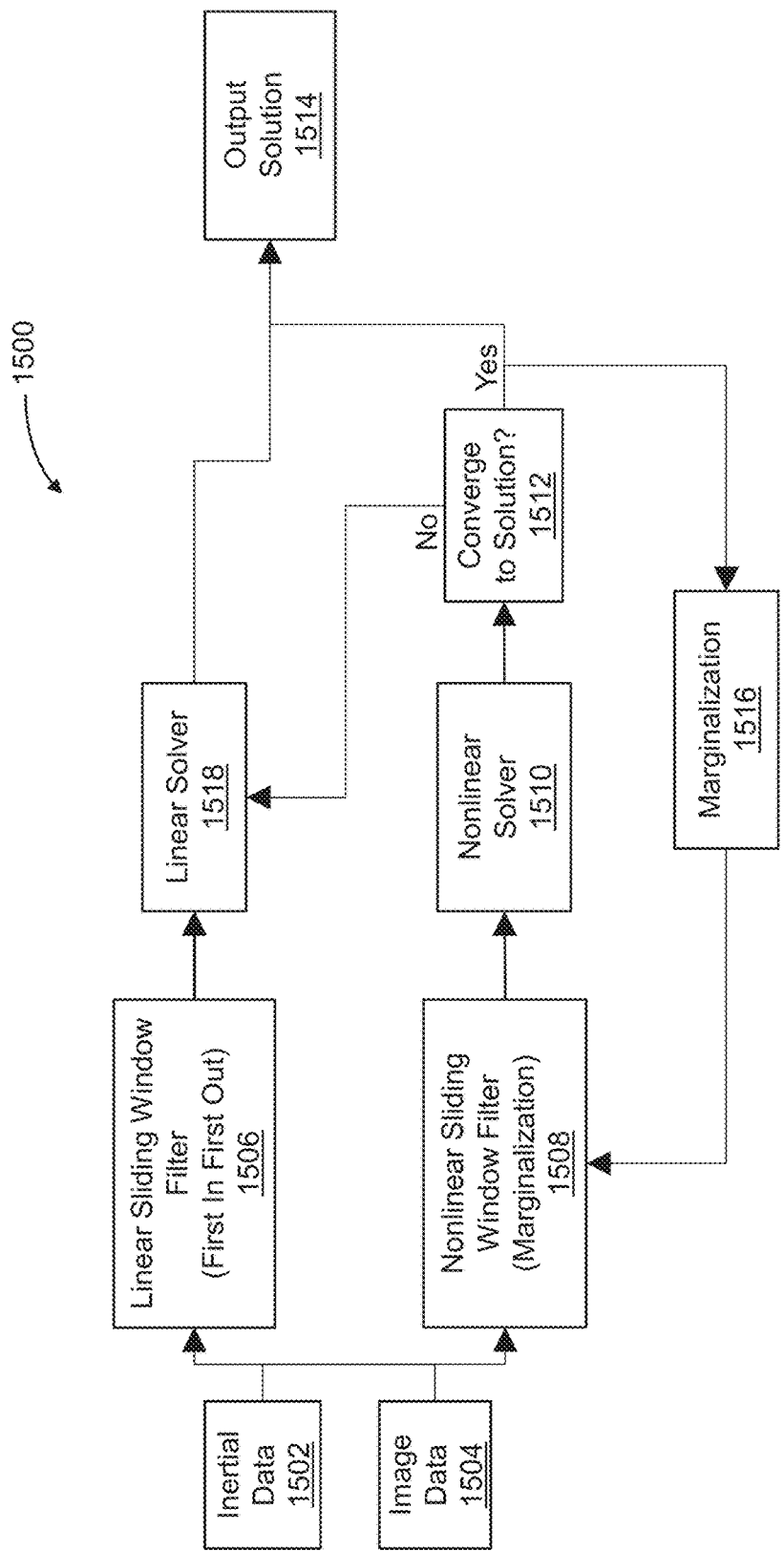
FIG. 15 illustrates a method for performing state estimation and/or parameter calibration for a UAV, in accordance with embodiments.

FIG. 15 illustrates a method 1500 for performing state estimation and/or parameter calibration for a UAV (or any other movable object), in accordance with embodiments. In the method 1500, inertial data 1502 and image data 1504 are received from at least one inertial sensor and at least two image sensors carried by the UAV, as described herein. The inertial data 1502 and image data 1504 can be input into a linear sliding window filter 1506 and a nonlinear sliding window filter 1508. The linear sliding window filter 1506 can utilize a FIFO approach to discard data from previous time points when new data is received. The non-linear sliding window filter 1508 can utilize a marginalization approach to discard data from previous time points when new data is received.

In some embodiments, state estimation and/or parameter calibration is performed by inputting the inertial data and image data selected by the nonlinear sliding window filter 1508 into a nonlinear solver 1510 to generate a solution that provides estimated values for the state information and/or extrinsic parameters. The nonlinear solver 1510 can be a nonlinear optimization algorithm, such as the embodiments described herein. The method 1500 can include detecting whether the nonlinear solver 1510 has converged in order to produce a solution 1512. If the nonlinear solver 1510 has converged and produced solution, the solution can be output 1514, e.g., to another UAV component such as a flight control module. The method can then proceed to receive new sensor data and marginalize out previous sensor data 1516 via the nonlinear sliding window filter 1508, and the process can be repeated to continue generating updated state estimates.

If the nonlinear solver 1510 fails to converge, the method 1500 can proceed to use a linear solver 1518 to generate a solution that provides estimated values for the state information, and output the solution 1514. The linear solver 1518 can be a linear optimization algorithm, such as the embodiments described herein. In some embodiments, the failure of the nonlinear solver 1510 to converge is considered an error, and the linear solver 1518 can implement a reinitialization algorithm in order to recover from the error. The solution (e.g., reinitialization information) provided by the linear solver 1518 can be used as the initial values for subsequent state estimates performed by the nonlinear solver 1510.

The various methods described herein can be implemented by any suitable system or device. In some embodiments, the methods herein are performed by a hardware platform including a computing platform, a flight control module, a sensor module, and a data acquisition subsystem. The computing platform can include a sensor fusion module that receives and processes sensor data in accordance with the various sensor fusion algorithms described herein. The computing platform can be implemented using any suitable combination of hardware and software components. For example, in some embodiments, the computing platform utilizes the NVIDIA Tegra K1 as a basis for designing the ARM architecture CPU and GPU computing platform. The computing platform can be designed to fulfill certain performance requirements, such as stability and scalability.

Table 1 provides some exemplary requirements and testing methods for a computing platform:

TABLE 1

Exemplary Requirements and Testing Methods

| Hardware | Validation Requirements | Testing Method |
|---|---|---|
| Development kit | System stability Scalability | Voltage range, current range Number and performance parameters of each interface (USB, serial, etc.) |
| CPU computing power GPU computing power | Linear equations GPU image processing capabilities, GPU general computing power | Performance of different math libraries (lapack, OpenBLAS, Eigen, OpenCV, etc.) |

The flight control module can include any suitable combination of hardware and software components for controlling operation of the UAV, such as components for controlling UAV position, orientation, velocity, and/or acceleration. In some embodiments, the flight control module includes one or more components for controlling the actuation of the propulsion units of the UAV, e.g., in order to achieve a desired position, orientation, velocity, etc. The flight control module can be communicably coupled to the computing platform in order to receive data (e.g., state information) from the platform and use the data as input into one or more flight control algorithms. For example, the flight control module can include underlying APIs in order to receive data from the computing platform, e.g., at frequency of at least 50 Hz.

The sensor module can include one or more sensors, such as at least one inertial sensor and at least two image sensors as described herein. In some embodiments, the sensor module includes three global shutter cameras, with two cameras set up in a binocular configuration facing forward (e.g., along a direction of motion of the UAV), and one camera set up in a monocular configuration facing downward. The cameras can have a sampling frequency of about 20 Hz. In some embodiments, the sensor module includes one IMU configured to acquire and angular velocity and a linear acceleration of the UAV at a frequency of at least 100 Hz. The IMU can also be configured to provide an angular value, e.g., using an uncorrected integration from a gyroscope. Optionally, the sensor module can also include other types of sensors, such as a compass, barometer, GPS, and/or ultrasonic sensor (e.g., forward-oriented and downward-oriented ultrasonic sensors). The sensors for the sensor module can be coupled to the UAV body using rigid connections that constrain movement of the sensors relative to the body. Optionally, vibration-reducing systems such as dampers or shock absorbers can be installed between the sensors and the UAV module in order to reduce undesirable movements of the sensors.

The data acquisition subsystem can be operably coupled to the sensor module in order to transmit the sensor data from the various sensors to the computing platform and/or flight control module. The data acquisition system can utilize any suitable type of communication interface, such as USB interfaces, serial ports, or combinations thereof In some embodiments, the image sensors and ultrasonic sensors are coupled via USB interfaces, while the IMU and other sensor type are coupled via serial ports.

Figure 16:
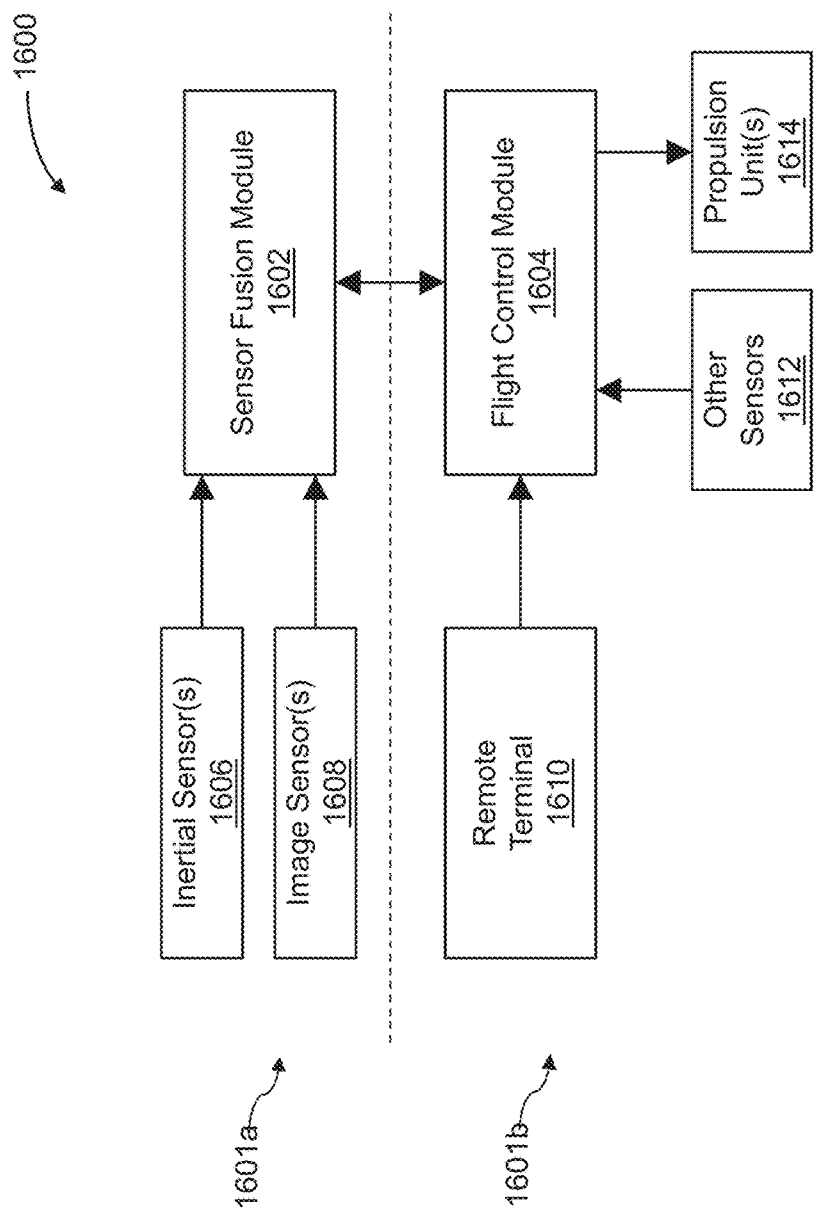
FIG. 16 illustrates a system for controlling a UAV using multiple sensors, in accordance with embodiments.

FIG. 16 illustrates a system 1600 for controlling a UAV using multiple sensors, in accordance with embodiments. The system 1600 can be used to implement any embodiment of the methods described herein. At least some or all of the components of the system 1600 can be carried by a UAV. The system 1600 can be considered to be divided into two different functional units: a sensor fusion unit 1601a (components above the dashed line) and a flight control unit 1601b (components below the dashed line). The sensor fusion unit 1601a and the flight control unit 1601b can be communicably coupled to each other for exchanging data, control signals, and the like. In some embodiments, the sensor fusion unit 1601a and flight control unit 1601b are configured to operate independently of each other, such that if one unit malfunctions, the other can continue to operate. For example, if the sensor fusion unit 1601a experiences a malfunction, the flight control unit 1601b can be configured to continue functioning independently, e.g., in order to execute an emergency landing operation.

In some embodiments, the system 1600 includes a sensor fusion module 1602 that is operably coupled to a flight control module 1604. The sensor fusion module 1602 can also be coupled to a plurality of sensors, such as one or more inertial sensors 1606 and one or more image sensors 1608. The sensor fusion module 1602 can include one or more processors that use the inertial data and image data from the inertial sensor(s) 1606 and image sensor(s) 1608 in order to perform the initialization, error recovery, state estimation, and extrinsic parameter calibration methods described herein. Optionally, the sensor fusion module 1602 can be coupled to or include an image processing module for processing image data, as described above and herein. The results generated by the sensor fusion module 1602 can be transmitted to the flight control module 1604 in order to facilitate various flight operations. The flight operations can be performed based on the results from the sensor fusion module, user commands received from a remote terminal 1610, sensor data received from other sensors 1612 (e.g., a GPS sensor, magnetometer, ultrasonic sensor), or combinations thereof. For example, the flight control module 1604 can determine control signals to be transmitted to one or more propulsion units 1614 (e.g., rotors) in order to control position, orientation, velocity, and/or acceleration of the UAV, e.g., for UAV operations such as navigation, obstacle avoidance, and the like.

The components of the system 1600 can be implemented using various types and combinations of hardware elements. For example, the sensor fusion module 1602 can be implemented using any suitable hardware platform including one or more processors and memory storing instructions executable by the one or more processors. The connections between the different components of the system 1600 can be implemented using various types of communication interfaces, e.g., analog or digital interfaces such as USB interfaces, serial ports, pulse width modulation channels, or combinations thereof. Such interfaces may utilize wired or wireless communication methods. For example, the image sensor(s) 1608 can be coupled to the sensor fusion module 1602 via USB interfaces, while the inertial sensor(s) 1606 can be coupled to the sensor fusion module 1606 via serial ports. The sensor fusion module 1602 can be coupled to the flight control module 1604 via serial ports. The flight control module 1604 can be coupled to the remote terminal 1610 via a wireless communication interface, such as a radio control (RC) interface. The flight control module 1604 can transmit commands to the propulsion unit(s) 1614 via pulse-width modulation.

In some embodiments, the sensor fusion module 1602 is used to combine inertial data from the inertial sensor(s) 1606 and image data from the image sensor(s) 1608, as described herein. Optionally, the sensor fusion module 1602 can combine internal data from the flight control module 1604 and sensor data from the sensors 1606, 1608 in order to estimate state information for the UAV (e.g., movement information such as velocity or acceleration). The sensor fusion module 1602 can use any suitable computing platform, such as a Jetson TK1 (TK1) platform. The image sensor(s) 1608 can be communicably coupled to the TK1 platform via a USB interface. The TK1 can run any operating system, such as the Ubuntu 14.04 operating system, using suitable drivers. In some embodiments, Robot Operating System (ROS) can be used for data transmission. Table 2 provides some exemplary hardware and software components for the sensor fusion module 1602:

TABLE 2

Exemplary Hardware and Software Components

| Hardware | Software |
| --- | --- |
| TK1 | Ubuntu 14.04 operating system |
| TK1 | ROS architecture for system management |
| TK1 | Driver |
| TK1 | OpenCV GPU version for image cropping |
| TK1 | Eigen matrix library for algorithm |
| PixHawk PX4 | TK1/MAVROS information conversion kit and MAVlink communication protocol |

The systems, device, and methods herein can utilize any suitable number of image sensors, such as one, two, three, four, five, six, seven, eight, nine, 10, 15, 20, 30, 40, 50, or more image sensors. The plurality of image sensors can be simultaneously coupled to one or more processors of an imaging processing module for receiving and analyzing image data (e.g., in order to perform feature point detection and matching), e.g., via a corresponding number of communication interfaces. In some embodiments, however, certain hardware platforms may not be capable of supporting simultaneous couplings to a large number of image sensors (e.g., more than six image sensors, more than 10 image sensors). For example, some image processing modules may not include a sufficient number of communication interfaces such that all of the image sensors can be simultaneously coupled. In such embodiments, the plurality of image sensors may not all be simultaneously coupled to the module at the same time. For instance, a switching mechanism can be used to selectively couple certain subset of the image sensors to the module at different times.

FIG. 22 illustrates a system 2200 with switchably coupled image sensors, in accordance with embodiments. The various components of the system 2200 can be combined with and/or substituted for any embodiment of the other systems and devices presented herein. The system 2200 can be used in combination with any of the methods described herein, e.g., the asynchronous data collection scheme 2100. The system 2200 can include a plurality of image sensor subsets 2202 (e.g., n different subsets as depicted herein). Any number of image sensor subsets can be used, such as two, three, four, five, six, seven, eight, nine, 10, 15, 20, 30, 40, 50, or more subsets. Each image sensor subset can include any number of individual image sensors, such as such as one, two, three, four, five, six, seven, eight, nine, 10, 15, 20, 30, 40, 50, or more image sensors. The image sensor subsets can each include the same number of image sensors. Alternatively, some or all of the image sensor subsets can include differing numbers of image sensors. Each image sensor subset can be coupled to a switching mechanism 2204, which is in turn coupled to an image processing module 2206. The switching mechanism 2204 can include any suitable combination of hardware and software components for selectively coupling sensor subsets to the module 2206 (e.g., switches, relays, etc.). The image processing module 2206 can be used to process image data in order to perform feature point detection and/or matching, as discussed herein. In some embodiments, the image processing module 2206 is coupled to and/or is a component of a sensor fusion module for performing initialization, error recovery, parameter calibration, and/or state estimation.

The switching mechanism 2204 can be configured to couple only a single image sensor subset to the image processing module 2206 at a time, such that the image processing module 2206 receives and processes image data from a single subset at a time. In order to obtain data from all of the image sensors of the system 2200, the switching mechanism 2204 can be controlled to alternate which subsets are coupled to the image processing module 2206. For example, image data can be received by coupling a first image sensor subset to the module 2206, receiving the image data from the first subset, coupling a second image sensor subset to the module 2206, receiving the image data from the second subset, and so on until images from all the subsets have been received. The order and frequency with which the switching mechanism 2204 switches between different subsets can be varied as desired. This approach allows image data to be received from relatively large numbers of image sensors without requiring that the image processing module 2206 maintain simultaneous connections to each of the sensors at all times. This can be advantageous in terms of improving the flexibility of the system to accommodate any number of image sensors (e.g., for plug-and-play), while reducing the computing load associated with processing image data from a large number of sensors at once.

The systems, devices, and methods described herein can be applied to a wide variety of movable objects. As previously mentioned, any description herein of an aerial vehicle may apply to and be used for any movable object. A movable object of the present invention can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be mounted on a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$ or 10 m$^3$. Conversely, the total volume of the movable object may be greater than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$.

In some embodiments, the movable object may have a footprint (which may refer to the lateral cross-sectional area encompassed by the movable object) less than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$. Conversely, the footprint may be greater than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail below. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 17:
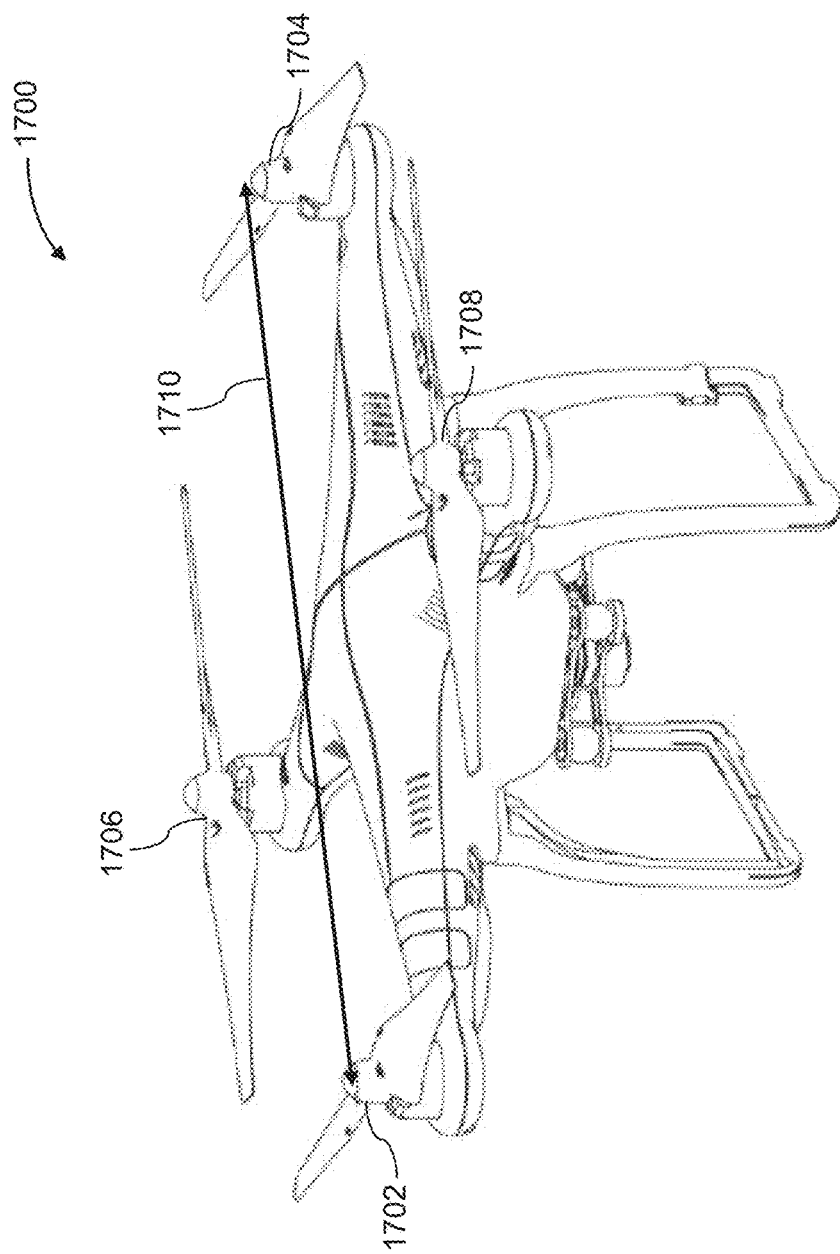
FIG. 17 illustrates a UAV, in accordance with embodiments.

FIG. 17 illustrates an unmanned aerial vehicle (UAV) 1700, in accordance with embodiments of the present invention. The UAV may be an example of a movable object as described herein. The UAV 1700 can include a propulsion system having four rotors 1702, 1704, 1706, and 1708. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 1710. For example, the length 1710 can be less than or equal to 2 m, or less than equal to 5 m. In some embodiments, the length 1710 can be within a range from 40 cm to 1 m, from 10 cm to 2 m, or from 5 cm to 5 m. Any description herein of a UAV may apply to a movable object, such as a movable object of a different type, and vice versa.

In some embodiments, the movable object can be configured to carry a load. The load can include one or more of passengers, cargo, equipment, instruments, and the like. The load can be provided within a housing. The housing may be separate from a housing of the movable object, or be part of a housing for an movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object).

In some embodiments, the load includes a payload. The payload can be configured not to perform any operation or function. Alternatively, the payload can be a payload configured to perform an operation or function, also known as a functional payload. For example, the payload can include one or more sensors for surveying one or more targets. Any suitable sensor can be incorporated into the payload, such as an image capture device (e.g., a camera), an audio capture device (e.g., a parabolic microphone), an infrared imaging device, or an ultraviolet imaging device. The sensor can provide static sensing data (e.g., a photograph) or dynamic sensing data (e.g., a video). In some embodiments, the sensor provides sensing data for the target of the payload. Alternatively or in combination, the payload can include one or more emitters for providing signals to one or more targets. Any suitable emitter can be used, such as an illumination source or a sound source. In some embodiments, the payload includes one or more transceivers, such as for communication with a module remote from the movable object. Optionally, the payload can be configured to interact with the environment or a target. For example, the payload can include a tool, instrument, or mechanism capable of manipulating objects, such as a robotic arm.

Optionally, the load may include a carrier. The carrier can be provided for the payload and the payload can be coupled to the movable object via the carrier, either directly (e.g., directly contacting the movable object) or indirectly (e.g., not contacting the movable object). Conversely, the payload can be mounted on the movable object without requiring a carrier. The payload can be integrally formed with the carrier. Alternatively, the payload can be releasably coupled to the carrier. In some embodiments, the payload can include one or more payload elements, and one or more of the payload elements can be movable relative to the movable object and/or the carrier, as described above.

The carrier can be integrally formed with the movable object. Alternatively, the carrier can be releasably coupled to the movable object. The carrier can be coupled to the movable object directly or indirectly. The carrier can provide support to the payload (e.g., carry at least part of the weight of the payload). The carrier can include a suitable mounting structure (e.g., a gimbal platform) capable of stabilizing and/or directing the movement of the payload. In some embodiments, the carrier can be adapted to control the state of the payload (e.g., position and/or orientation) relative to the movable object. For example, the carrier can be configured to move relative to the movable object (e.g., with respect to one, two, or three degrees of translation and/or one, two, or three degrees of rotation) such that the payload maintains its position and/or orientation relative to a suitable reference frame regardless of the movement of the movable object. The reference frame can be a fixed reference frame (e.g., the surrounding environment). Alternatively, the reference frame can be a moving reference frame (e.g., the movable object, a payload target).

In some embodiments, the carrier can be configured to permit movement of the payload relative to the carrier and/or movable object. The movement can be a translation with respect to up to three degrees of freedom (e.g., along one, two, or three axes) or a rotation with respect to up to three degrees of freedom (e.g., about one, two, or three axes), or any suitable combination thereof.

In some instances, the carrier can include a carrier frame assembly and a carrier actuation assembly. The carrier frame assembly can provide structural support to the payload. The carrier frame assembly can include individual carrier frame components, some of which can be movable relative to one another. The carrier actuation assembly can include one or more actuators (e.g., motors) that actuate movement of the individual carrier frame components. The actuators can permit the movement of multiple carrier frame components simultaneously, or may be configured to permit the movement of a single carrier frame component at a time. The movement of the carrier frame components can produce a corresponding movement of the payload. For example, the carrier actuation assembly can actuate a rotation of one or more carrier frame components about one or more axes of rotation (e.g., roll axis, pitch axis, or yaw axis). The rotation of the one or more carrier frame components can cause a payload to rotate about one or more axes of rotation relative to the movable object. Alternatively or in combination, the carrier actuation assembly can actuate a translation of one or more carrier frame components along one or more axes of translation, and thereby produce a translation of the payload along one or more corresponding axes relative to the movable object.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 18:
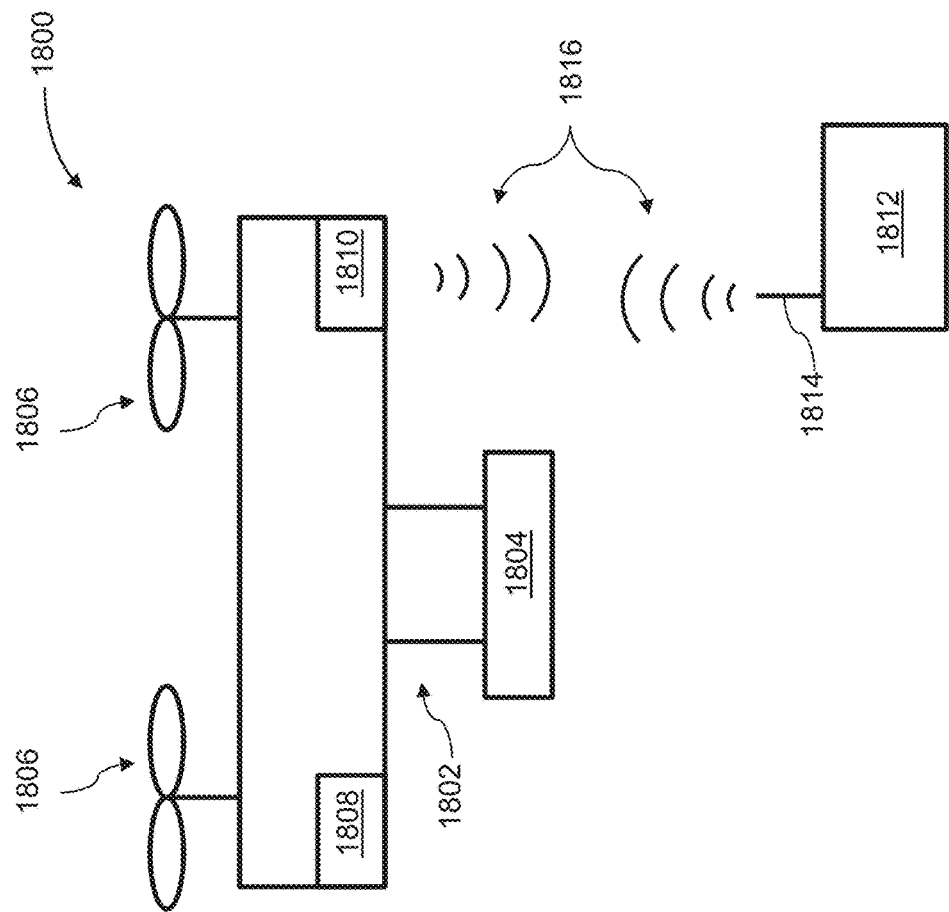
FIG. 18 illustrates a movable object including a carrier and a payload, in accordance with embodiments.

FIG. 18 illustrates a movable object 1800 including a carrier 1802 and a payload 1804, in accordance with embodiments. Although the movable object 1800 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1804 may be provided on the movable object 1800 without requiring the carrier 1802. The movable object 1800 may include propulsion mechanisms 1806, a sensing system 1808, and a communication system 1810.

The propulsion mechanisms 1806 can include one or more of rotors, propellers, blades, engines, motors, wheels, axles, magnets, or nozzles, as previously described. For example, the propulsion mechanisms 1806 may be self-tightening rotors, rotor assemblies, or other rotary propulsion units, as disclosed elsewhere herein. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1806 can be mounted on the movable object 1800 using any suitable means, such as a support element (e.g., a drive shaft) as described elsewhere herein. The propulsion mechanisms 1806 can be mounted on any suitable portion of the movable object 1800, such on the top, bottom, front, back, sides, or suitable combinations thereof.

In some embodiments, the propulsion mechanisms 1806 can enable the movable object 1800 to take off vertically from a surface or land vertically on a surface without requiring any horizontal movement of the movable object 1800 (e.g., without traveling down a runway). Optionally, the propulsion mechanisms 1806 can be operable to permit the movable object 1800 to hover in the air at a specified position and/or orientation. One or more of the propulsion mechanisms 1800 may be controlled independently of the other propulsion mechanisms. Alternatively, the propulsion mechanisms 1800 can be configured to be controlled simultaneously. For example, the movable object 1800 can have multiple horizontally oriented rotors that can provide lift and/or thrust to the movable object. The multiple horizontally oriented rotors can be actuated to provide vertical takeoff, vertical landing, and hovering capabilities to the movable object 1800. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1800 (e.g., with respect to up to three degrees of translation and up to three degrees of rotation).

The sensing system 1808 can include one or more sensors that may sense the spatial disposition, velocity, and/or acceleration of the movable object 1800 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1808 can be used to control the spatial disposition, velocity, and/or orientation of the movable object 1800 (e.g., using a suitable processing unit and/or control module, as described below). Alternatively, the sensing system 1808 can be used to provide data regarding the environment surrounding the movable object, such as weather conditions, proximity to potential obstacles, location of geographical features, location of manmade structures, and the like.

The communication system 1810 enables communication with terminal 1812 having a communication system 1814 via wireless signals 1816. The communication systems 1810, 1814 may include any number of transmitters, receivers, and/or transceivers suitable for wireless communication. The communication may be one-way communication, such that data can be transmitted in only one direction. For example, one-way communication may involve only the movable object 1800 transmitting data to the terminal 1812, or vice-versa. The data may be transmitted from one or more transmitters of the communication system 1810 to one or more receivers of the communication system 1812, or vice-versa. Alternatively, the communication may be two-way communication, such that data can be transmitted in both directions between the movable object 1800 and the terminal 1812. The two-way communication can involve transmitting data from one or more transmitters of the communication system 1810 to one or more receivers of the communication system 1814, and vice-versa.

In some embodiments, the terminal 1812 can provide control data to one or more of the movable object 1800, carrier 1802, and payload 1804 and receive information from one or more of the movable object 1800, carrier 1802, and payload 1804 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1806), or a movement of the payload with respect to the movable object (e.g., via control of the carrier 1802). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1808 or of the payload 1804). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1812 can be configured to control a state of one or more of the movable object 1800, carrier 1802, or payload 1804. Alternatively or in combination, the carrier 1802 and payload 1804 can also each include a communication module configured to communicate with terminal 1812, such that the terminal can communicate with and control each of the movable object 1800, carrier 1802, and payload 1804 independently.

In some embodiments, the movable object 1800 can be configured to communicate with another remote device in addition to the terminal 1812, or instead of the terminal 1812. The terminal 1812 may also be configured to communicate with another remote device as well as the movable object 1800. For example, the movable object 1800 and/or terminal 1812 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1800, receive data from the movable object 1800, transmit data to the terminal 1812, and/or receive data from the terminal 1812. Optionally, the remote device can be connected to the Internet or other telecommunications network, such that data received from the movable object 1800 and/or terminal 1812 can be uploaded to a website or server.

Figure 19:
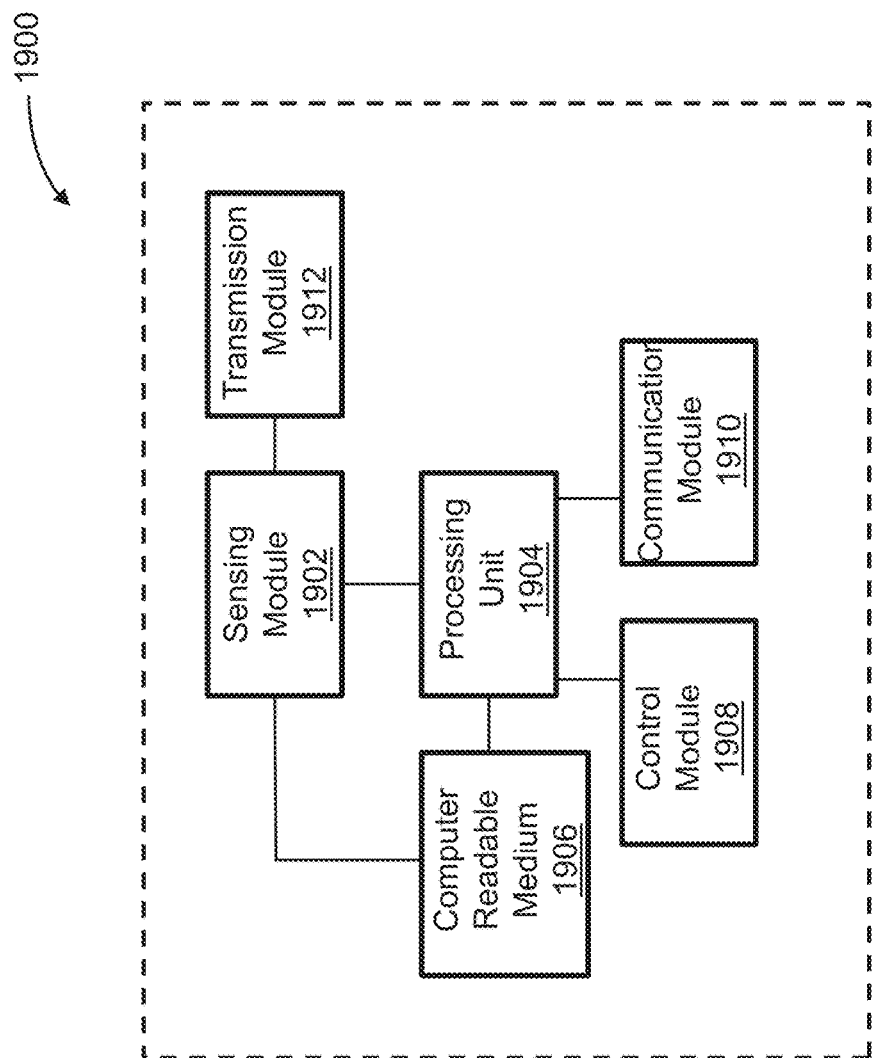
FIG. 19 illustrates a system for controlling a movable object, in accordance with embodiments.

FIG. 19 is a schematic illustration by way of block diagram of a system 1900 for controlling a movable object, in accordance with embodiments. The system 1900 can be used in combination with any suitable embodiment of the systems, devices, and methods disclosed herein. The system 1900 can include a sensing module 1902, processing unit 1904, non-transitory computer readable medium 1906, control module 1908, and communication module 1910.

The sensing module 1902 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1902 can be operatively coupled to a processing unit 1904 having a plurality of processors. In some embodiments, the sensing module can be operatively coupled to a transmission module 1912 (e.g., a Wi-Fi image transmission module) configured to directly transmit sensing data to a suitable external device or system. For example, the transmission module 1912 can be used to transmit images captured by a camera of the sensing module 1902 to a remote terminal.

The processing unit 1904 can have one or more processors, such as a programmable processor (e.g., a central processing unit (CPU)). The processing unit 1904 can be operatively coupled to a non-transitory computer readable medium 1906. The non-transitory computer readable medium 1906 can store logic, code, and/or program instructions executable by the processing unit 1904 for performing one or more steps. The non-transitory computer readable medium can include one or more memory units (e.g., removable media or external storage such as an SD card or random access memory (RAM)). In some embodiments, data from the sensing module 1902 can be directly conveyed to and stored within the memory units of the non-transitory computer readable medium 1906. The memory units of the non-transitory computer readable medium 1906 can store logic, code and/or program instructions executable by the processing unit 1904 to perform any suitable embodiment of the methods described herein. For example, the processing unit 1904 can be configured to execute instructions causing one or more processors of the processing unit 1904 to analyze sensing data produced by the sensing module. The memory units can store sensing data from the sensing module to be processed by the processing unit 1904. In some embodiments, the memory units of the non-transitory computer readable medium 1906 can be used to store the processing results produced by the processing unit 1904.

In some embodiments, the processing unit 1904 can be operatively coupled to a control module 1908 configured to control a state of the movable object. For example, the control module 1908 can be configured to control the propulsion mechanisms of the movable object to adjust the spatial disposition, velocity, and/or acceleration of the movable object with respect to six degrees of freedom. Alternatively or in combination, the control module 1908 can control one or more of a state of a carrier, payload, or sensing module.

The processing unit 1904 can be operatively coupled to a communication module 1910 configured to transmit and/or receive data from one or more external devices (e.g., a terminal, display device, or other remote controller). Any suitable means of communication can be used, such as wired communication or wireless communication. For example, the communication module 1910 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1910 can transmit and/or receive one or more of sensing data from the sensing module 1902, processing results produced by the processing unit 1904, predetermined control data, user commands from a terminal or remote controller, and the like.

The components of the system 1900 can be arranged in any suitable configuration. For example, one or more of the components of the system 1900 can be located on the movable object, carrier, payload, terminal, sensing system, or an additional external device in communication with one or more of the above. Additionally, although FIG. 19 depicts a single processing unit 1904 and a single non-transitory computer readable medium 1906, one of skill in the art would appreciate that this is not intended to be limiting, and that the system 1900 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1900 can occur at one or more of the aforementioned locations.

As used herein A and/or B encompasses one or more of A or B, and combinations thereof such as A and B.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the invention and that methods and structures within the scope of these claims and their equivalents be covered thereby.

What is claimed is:

1. A method comprising:
   detecting, with aid of one or more processors, whether a physical configuration of a plurality of sensors onboard an unmanned aerial vehicle (UAV) has been changed from an initial configuration to a modified configuration, wherein the plurality of sensors comprise at least one inertial sensor and at least two image sensors, and the physical configuration is changed by removing at least one first sensor from the plurality of sensors, or adding at least one second sensor to the plurality of sensors;
   receiving, at the one or more processors, inertial data from the at least one inertial sensor during operation of the UAV, the operation of the UAV including the UAV being powered on pre-flight and/or effecting flight of the UAV;
   receiving, at the one or more processors, image data from the at least two image sensors during the operation of the UAV; and
   estimating, with aid of the one or more processors, one or more extrinsic parameters based on the inertial data and the image data in response to the physical configuration having been changed to the modified configuration, wherein the one or more extrinsic parameters are estimated using an iterative optimization algorithm during the operation of the UAV, and wherein the one or more extrinsic parameters comprise spatial relationships between the plurality of sensors in the modified configuration.

2. The method of claim 1, wherein the spatial relationships comprise relative positions and relative orientations of the at least two image sensors that are determined with respect to the at least one inertial sensor.

3. The method of claim 1, wherein the physical configuration is changed further by changing at least one of a position or an orientation of at least one sensor of the plurality of sensors.

4. The method of claim 1, wherein the physical configuration is changed prior to or during the operation of the UAV.

5. The method of claim 1, wherein the inertial data comprises one or more measurements indicative of a three-dimensional acceleration and a three-dimensional angular velocity of the UAV, and wherein the image data comprises one or more images of an environment around the UAV.

6. The method of claim 1, wherein the iterative optimization algorithm comprises iteratively linearizing and solving a nonlinear objective function so as to estimate the one or more extrinsic parameters of the plurality of sensors.

7. The method of claim 1, wherein the iterative optimization algorithm comprises calculating a maximum a posteriori probability (MAP) estimate of the one or more extrinsic parameters based on the initial configuration, the inertial data, and the image data.

8. The method of claim 1, further comprising determining a state of the UAV based on the estimated one or more extrinsic parameters of the plurality of sensors.

9. A system comprising:
   a plurality of sensors carried by an unmanned aerial vehicle and comprising at least one inertial sensor and at least two image sensors; and
   one or more processors configured to: detect whether a physical configuration of the plurality of sensors has been changed from an initial configuration to a modified configuration, wherein the physical configuration is changed by removing at least one first sensor from the plurality of sensors, or adding at least one second sensor to the plurality of sensors;
   receive inertial data from the at least one inertial sensor during operation of the UAV, the operation of the UAV including the UAV being powered on pre-flight and/or effecting flight of the UAV;
   receive image data from the at least two image sensors during the operation of the UAV; and
   estimate one or more extrinsic parameters based on the inertial data and the image data in response to the physical configuration having been changed to the modified configuration, wherein the one or more extrinsic parameters are estimated using an iterative optimization algorithm during the operation of the UAV, and wherein the one or more extrinsic parameters comprise spatial relationships between the plurality of sensors in the modified configuration.

10. The system of claim 9, wherein the spatial relationships comprise relative positions and relative orientations of the at least two image sensors that are determined with respect to the at least one inertial sensor.

11. The system of claim 9, wherein the physical configuration is changed further by changing at least one of a position or an orientation of at least one sensor of the plurality of sensors.

12. The system of claim 9, wherein the physical configuration is changed prior to or during the operation of the UAV.

13. The system of claim 9, wherein the inertial data comprises one or more measurements indicative of a three-dimensional acceleration and a three-dimensional angular velocity of the UAV, and wherein the image data comprises one or more images of an environment around the UAV.

14. The system of claim 9, wherein the iterative optimization algorithm comprises iteratively linearizing and solving a nonlinear objective function so as to estimate the one or more extrinsic parameters of the plurality of sensors.

15. The system of claim 9, wherein the iterative optimization algorithm comprises calculating a maximum a posteriori probability (MAP) estimate of the one or more extrinsic parameters based on the initial configuration, the inertial data, and the image data.

16. The system of claim 9, wherein the one or more processors are further configured to determine a state of the UAV based on the estimated one or more extrinsic parameters of the plurality of sensors.

* * * * *